United States Patent [19]
Kizu et al.

[11] Patent Number: 5,809,222
[45] Date of Patent: Sep. 15, 1998

[54] METHOD AND APPARATUS FOR CONTROLLING CONTINUOUS DATA SERVER USING MORE THAN ONE CENTRAL CONTROL DEVICES

[75] Inventors: Toshiki Kizu; Tatsunori Kanai; Hiroshi Yao; Seiji Maeda; Hisako Tanaka, all of Tokyo, Japan

[73] Assignee: Kabushiki Kaisha Toshiba, Kawasaki, Japan

[21] Appl. No.: 718,096

[22] Filed: Sep. 11, 1996

[30] Foreign Application Priority Data

Sep. 11, 1995 [JP] Japan ................................ 7-232512
Apr. 15, 1996 [JP] Japan ................................ 8-092305

[51] Int. Cl.$^6$ .................................................. G06F 11/20
[52] U.S. Cl. .............................. 395/182.02; 395/184.01
[58] Field of Search ..................... 395/182.02, 185.08, 395/200.05, 183.19, 184.01, 185.02, 200.54; 364/132, 143, 187

[56] References Cited

U.S. PATENT DOCUMENTS

| | | | |
|---|---|---|---|
| 4,610,013 | 9/1986 | Long et al. | 371/9 |
| 4,700,292 | 10/1987 | Campanini | 364/200 |
| 4,775,976 | 10/1988 | Yokoyama | 371/9 |
| 5,021,938 | 6/1991 | Hayakawa | 364/132 |
| 5,086,384 | 2/1992 | Fukada | 364/187 |
| 5,187,794 | 2/1993 | Hall | 395/800 |
| 5,418,937 | 5/1995 | Inoue | 395/185.08 |
| 5,461,608 | 10/1995 | Yoshiyama | 370/16.1 |
| 5,473,599 | 12/1995 | Li et al. | 395/182.02 |
| 5,488,693 | 1/1996 | Houck et al. | 395/200.05 |
| 5,553,239 | 9/1996 | Heath et al. | 395/187.01 |
| 5,555,548 | 9/1996 | Iwai et al. | 375/356 |

*Primary Examiner*—Robert W. Beausoliel, Jr.
*Assistant Examiner*—Scott T. Baderman
*Attorney, Agent, or Firm*—Foley & Lardner

[57] ABSTRACT

A method and an apparatus for controlling a continuous data server, capable of dealing with a fault in the control device without affecting operations of the continuous data server, by using a plurality of control devices. One control devices is operated as a master control device for actually controlling operations of the continuous data server, while at least one control device other than the master control device is operated as a slave control device for monitoring the master control device and taking over a function of the master control device when a fault is detected in the master control device.

55 Claims, 61 Drawing Sheets

FIG.5

| CENTRAL CONTROL DEVICE ID |
|---|
| NUMBER OF EXTERNAL REQUESTS |
| EXTERNAL REQUEST |
| ⋮ |
| EXTERNAL REQUEST |

FIG.6

| CENTRAL CONTROL DEVICE ID |
|---|
| TIMESTAMP |
| CONTROL COMMAND |
| ⋮ |
| CONTROL COMMAND |

FIG.21

| CENTRAL CONTROL DEVICE ID |
|---|
| TIMESTAMP |
| PERIOD FOR USING CONTROL COMMANDS |
| CONTROL COMMAND |
| ⋮ |
| CONTROL COMMAND |

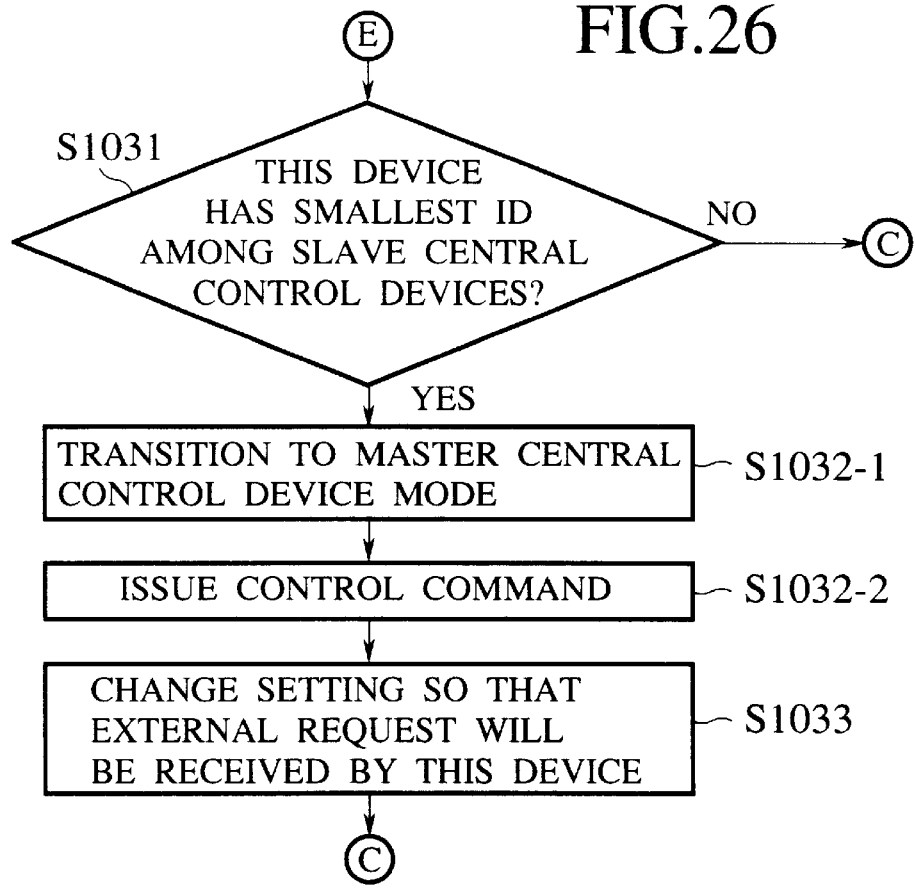
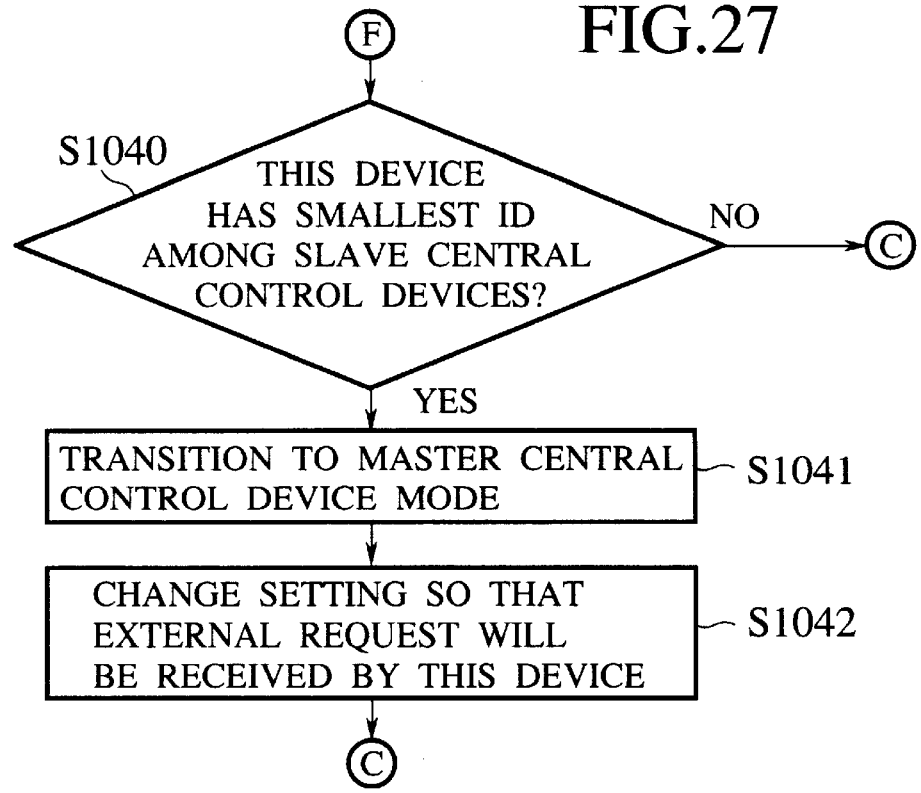

FIG.43

| ID |
|---|
| PERIOD WITHIN WHICH EXTERNAL REQUESTS ARE VALID |
| EXTERNAL REQUEST |
| ⋮ |
| EXTERNAL REQUEST |
| END OF EXTERNAL REQUESTS |

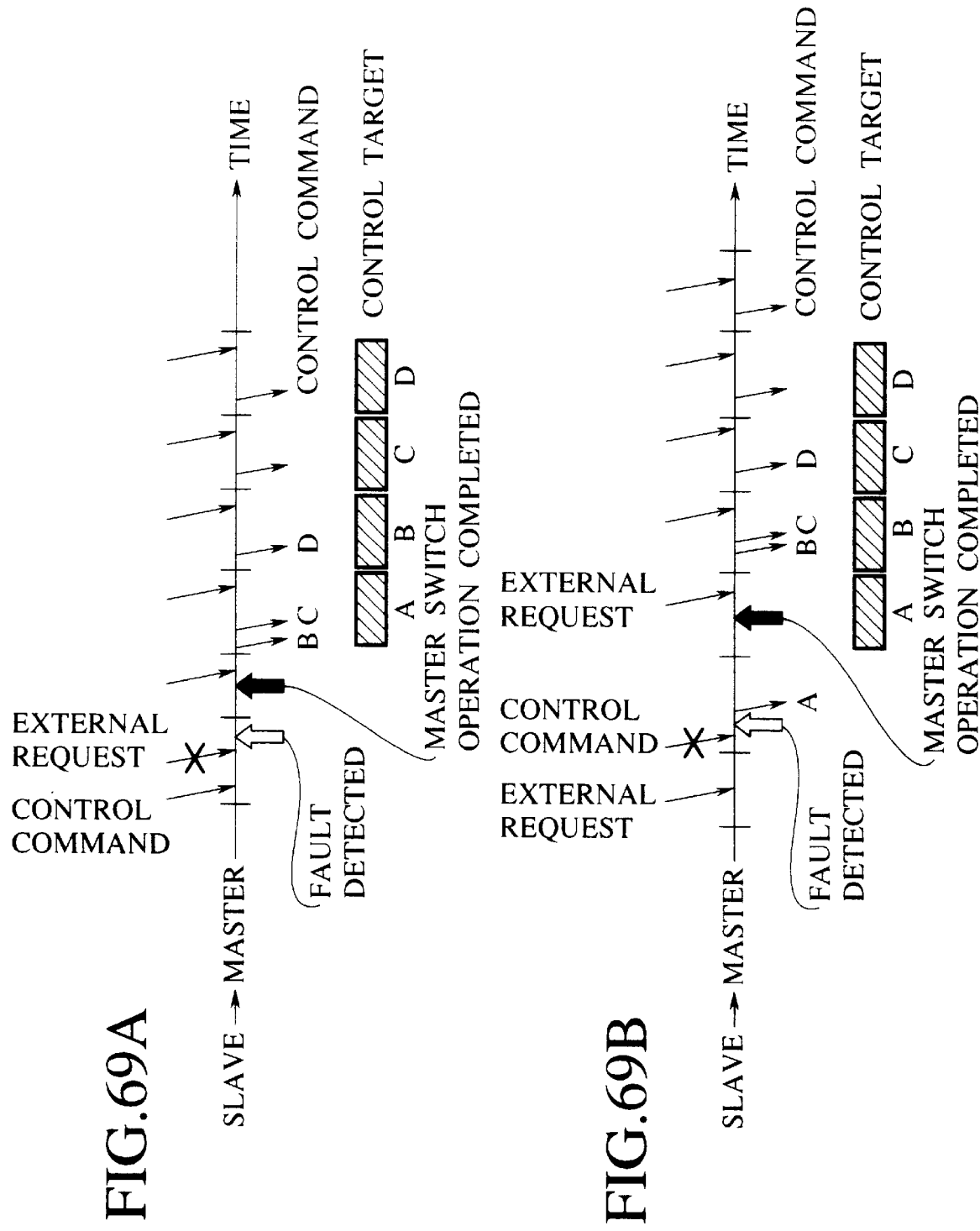

METHOD AND APPARATUS FOR CONTROLLING CONTINUOUS DATA SERVER USING MORE THAN ONE CENTRAL CONTROL DEVICES

BACKGROUND OF THE INVENTION

1. Field of the Invention

The present invention relates to a method and an apparatus for controlling a continuous data server which realizes services of continuous data such as video data and speech data by responding to a plurality of access requests for the continuous data simultaneously.

2. Description of the Background Art

A continuous data server apparatus for handling continuous data such as video data and speech data has functions for reading out the continuous data stored in memory devices, and transferring the data continuously in real time while synchronizing in time with terminal devices. Such a continuous data server apparatus is used in fields such as a video-on-demand in which video data for a plurality of movies, etc. are stored and an arbitrary movie is transferred according to a request from a terminal, and an on-line shopping in which information on commercial products is provided in video data through a network.

In such applications, the continuous data server apparatus will receive requests from a plurality of users at random, and therefore the continuous data server apparatus is required to have a capability to transfer respectively different continuous data to many different users simultaneously.

Now, some examples of such a conventional continuous data server apparatus will be described in detail.

An exemplary conventional continuous data server apparatus has a configuration as shown in FIG. 70.

In this conventional continuous data server apparatus of FIG. 70, an access request for the continuous data issued by a user or an application program will be sent through an inter-process communication, a communication via a network, etc. This access request is then notified from one of communication control devices 706 through a bus 720 to a central control device 710, and admitted by the central control device 710.

The central control device 710 then notifies the reading of the requested continuous data to relevant data memory control devices 704, and these data memory control devices 704 read out the specified continuous data from data memory devices 702 and write them into a buffer memory device 708. The central control device 710 then commands the transfer of the data on the buffer memory device 708 to one of the communication control devices 706, and this communication control device 706 transfers the continuous data toward a transfer destination specified in the access request.

The central control device 710 basically comprises a CPU and a memory device, similarly as an electronic computer. The central control device 710 may be equipped with a communication control function for the purpose of notifying the access request, so that the access request from a user or an application program is notified by the communication control function of the central control device 710 rather than by the communication control device 706.

The data memory devices 702 for storing the continuous data are usually provided in forms of disk devices. For this disk device, a magnetic disk device is used in most cases, but there is also a case of using an optical disk or a magneto-optical disk device, etc. Apart from the disk device, there is also a case of using a semiconductor memory device such as RAM or EEPROM for the data memory devices 702.

Now, the conventional continuous data server apparatus such as that shown in FIG. 70 has only one central control device 710, so that there is a fatal drawback in that the operations of the continuous data server apparatus itself are stopped when a fault occurs in the central control device 710.

SUMMARY OF THE INVENTION

It is therefore an object of the present invention to provide a method and an apparatus for controlling a continuous data server, capable of dealing with a fault in the control device without affecting operations of the continuous data server, by using a plurality of control devices.

According to one aspect of the present invention there is provided a method for controlling a continuous data server, comprising the steps of: operating one control devices as a master control device for actually controlling operations of the continuous data server which transfers continuous data stored in data memory to a communication path according to external requests; and operating at least one control device other than the master control device as a slave control device for monitoring the master control device and taking over a function of the master control device when a fault is detected in the master control device.

According to another aspect of the present invention there is provided an apparatus for controlling a continuous data server, comprising: one control devices operating as a master control device for actually controlling operations of the continuous data server which transfers continuous data stored in data memory to a communication path according to external requests; and at least one control device other than the master control device operating as a slave control device for monitoring the master control device and taking over a function of the master control device when a fault is detected in the master control device.

Other features and advantages of the present invention will become apparent from the following description taken in conjunction with the accompanying drawings.

BRIEF DESCRIPTION OF THE DRAWINGS

FIG. 5 is a diagram showing an exemplary configuration of external request data that can be used in the central control device of FIG. 2.

FIG. 6 is a diagram showing an exemplary configuration of a control command that can be used in the central control device of FIG. 2.

FIG. 21 is a diagram showing an exemplary format of control commands that can be used by the central control device in the continuous data server apparatus of FIG. 1.

FIG. 22 to FIG. 27 are a flow chart for the operations of a master central control device and slave central control devices in the continuous data server apparatus of FIG. 1 according to the embodiment II.

FIG. 43 is a diagram showing an exemplary format of external requests that can be used by the central control device in the continuous data server apparatus of FIG. 1.

FIGS. 69A and 69B are timing charts illustrating two other exemplary cases of operations in the continuous data server apparatus of FIG. 1.

DETAILED DESCRIPTION OF THE PREFERRED EMBODIMENTS

In the following various embodiments of a method and an apparatus for controlling a continuous data server according to the present invention will be described with references to the drawings.

Figure 1:
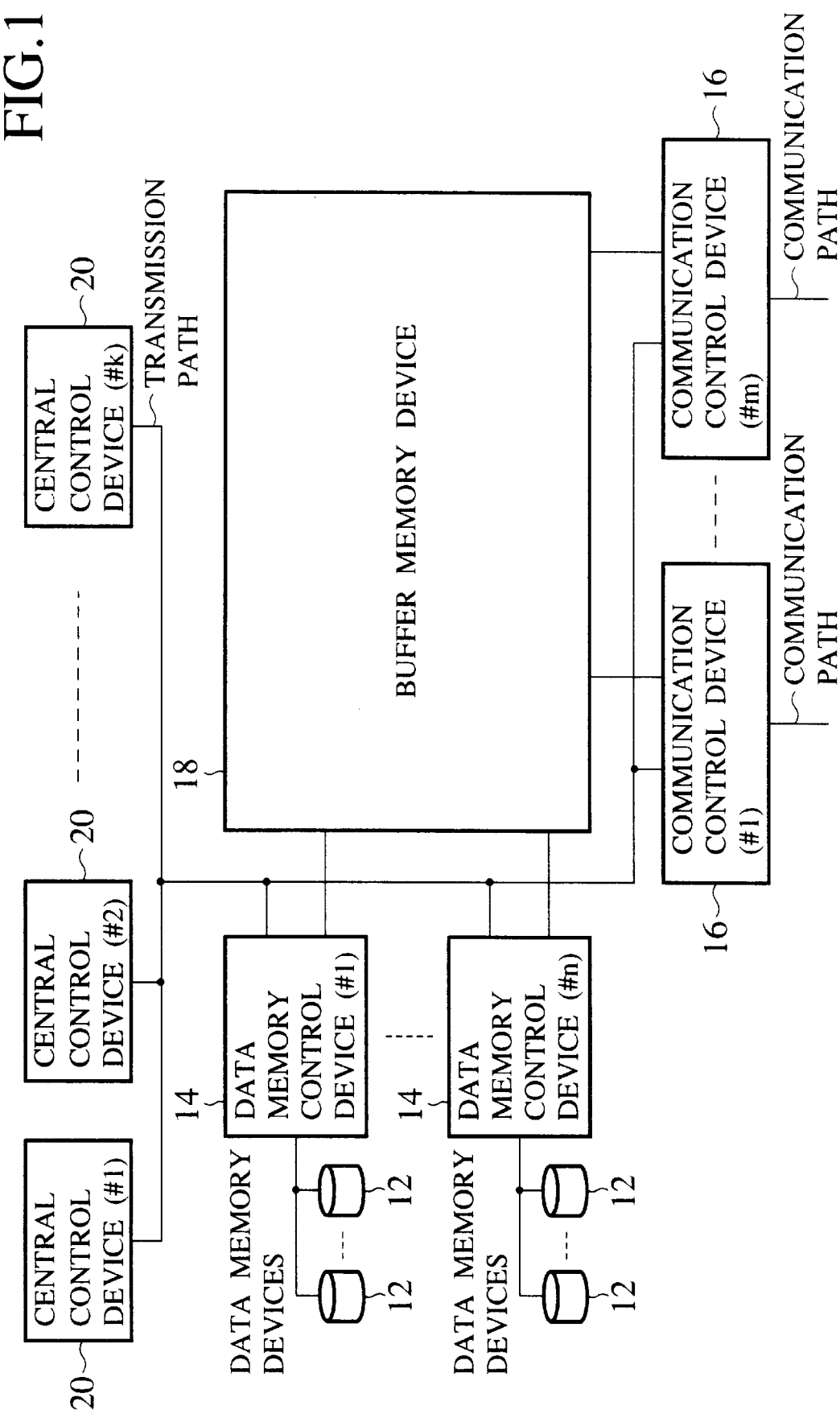
FIG. 1 is a block diagram of a continuous data server apparatus incorporating a plurality of central control devices according to the present invention.
Figure 2:
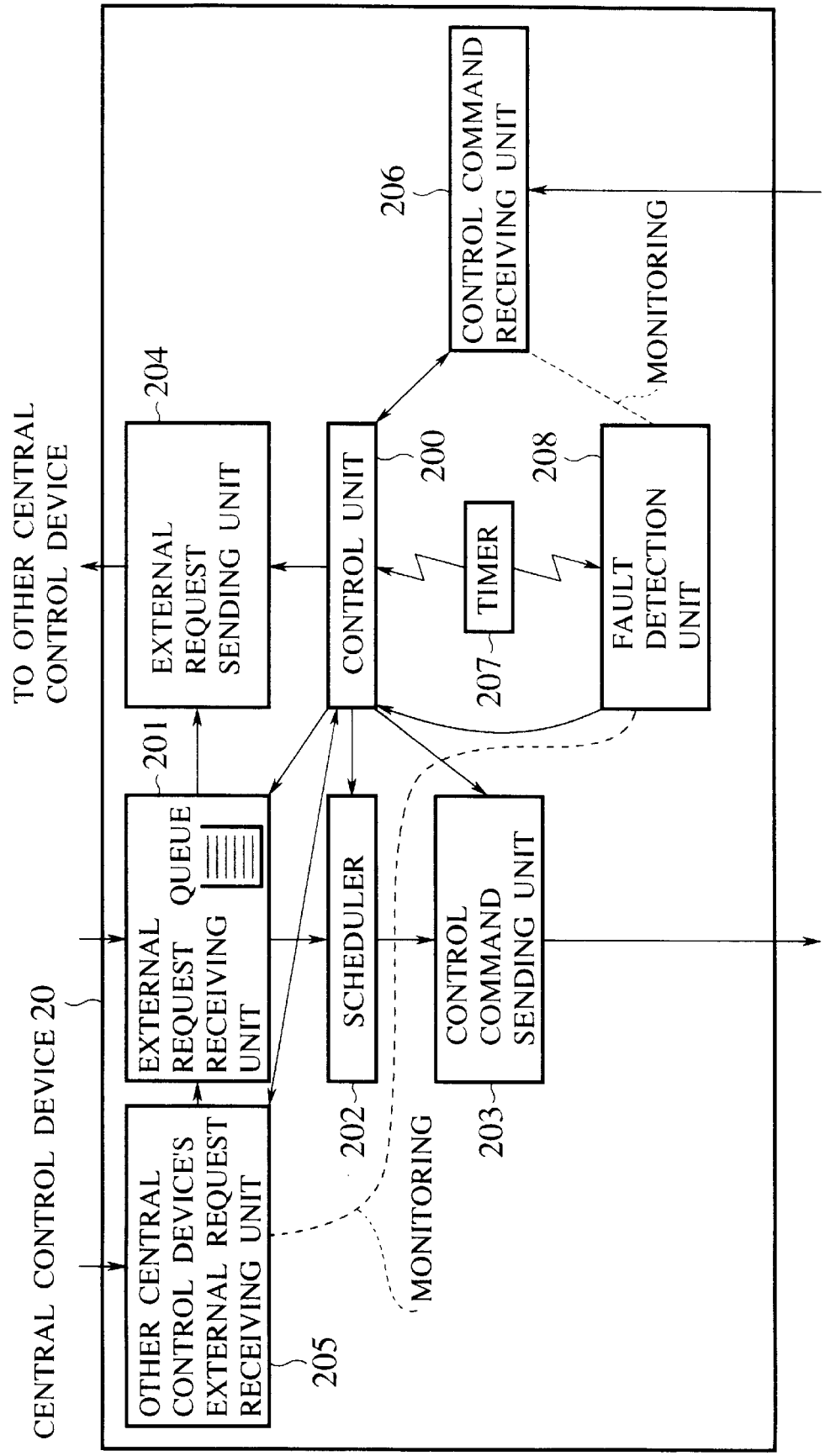
FIG. 2 is a block diagram of a central control device in the continuous data server apparatus of FIG. 1 according to the embodiments I, II, III and IV of the present invention.
Figure 42:
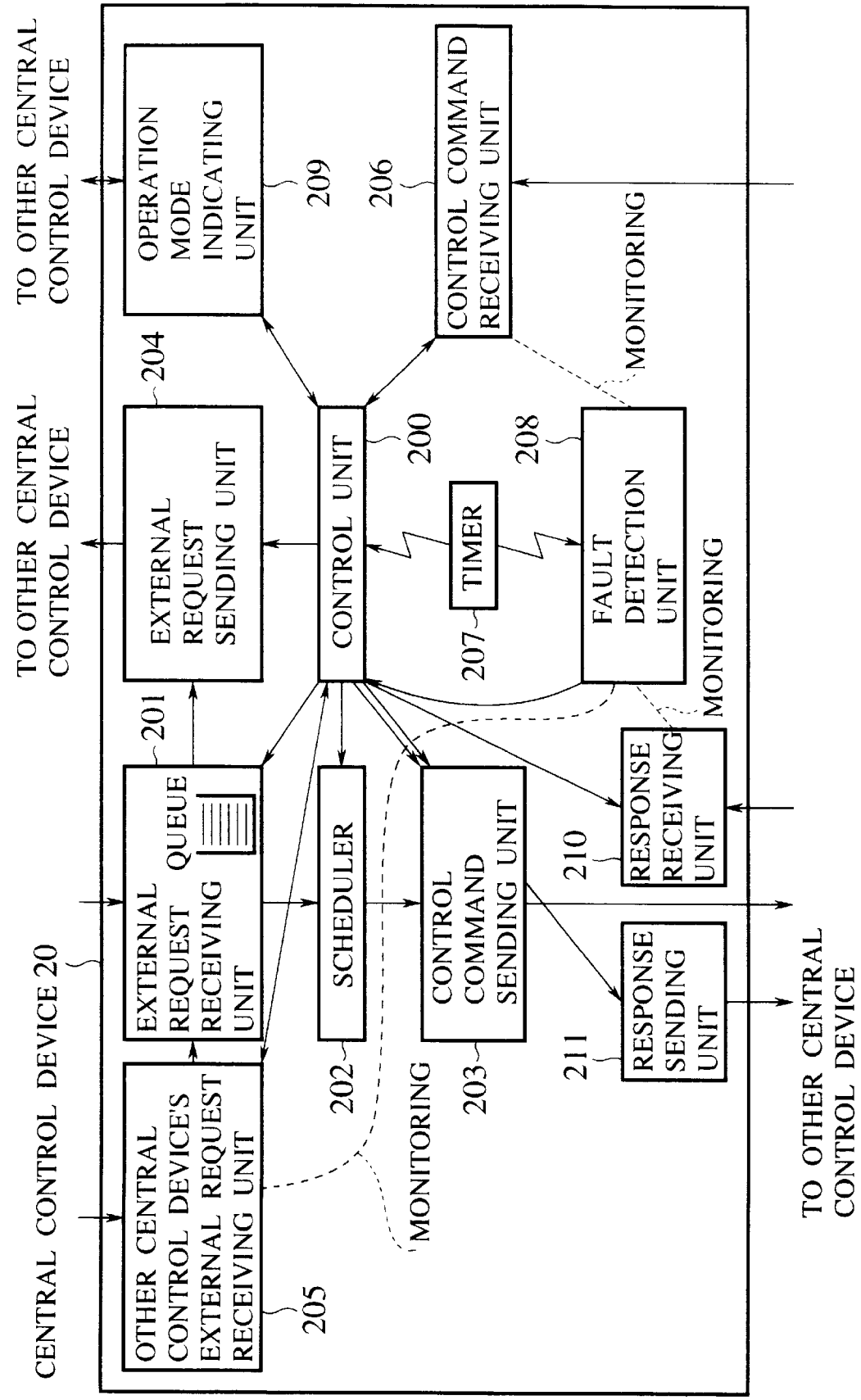
FIG. 42 is a block diagram of a central control device in the continuous data server apparatus of FIG. 1 according to the embodiments V and VI of the present invention.

The embodiment I and the embodiment IV are directed to a continuous data server apparatus in which one or more data memory control device with one or more data memory device for storing continuous data connected thereto, one or more communication control device for transferring continuous data, a plurality of central control devices for controlling each data memory control device and each communication control device are connected through one or more transmission path (FIG. 1), where each central control device is provided at least with an other central control device's external request receiving unit, an external request receiving unit, an external request sending unit, a scheduler, a control command sending unit, a control command receiving unit, a timer, a fault detection unit, and a control unit for coordinating controls of these elements (FIG. 2, FIG. 42).

One central control device in such a configuration is set as a master central control device, while the remaining central control devices are set as slave central control devices, so that even when a fault occurs in one central control device, it is possible to prevent a stopping of the operations of the continuous data server apparatus by switching the control from that one central control device to the other central control device, and therefore it is possible to realize a highly reliable continuous data server apparatus.

Figure 62:
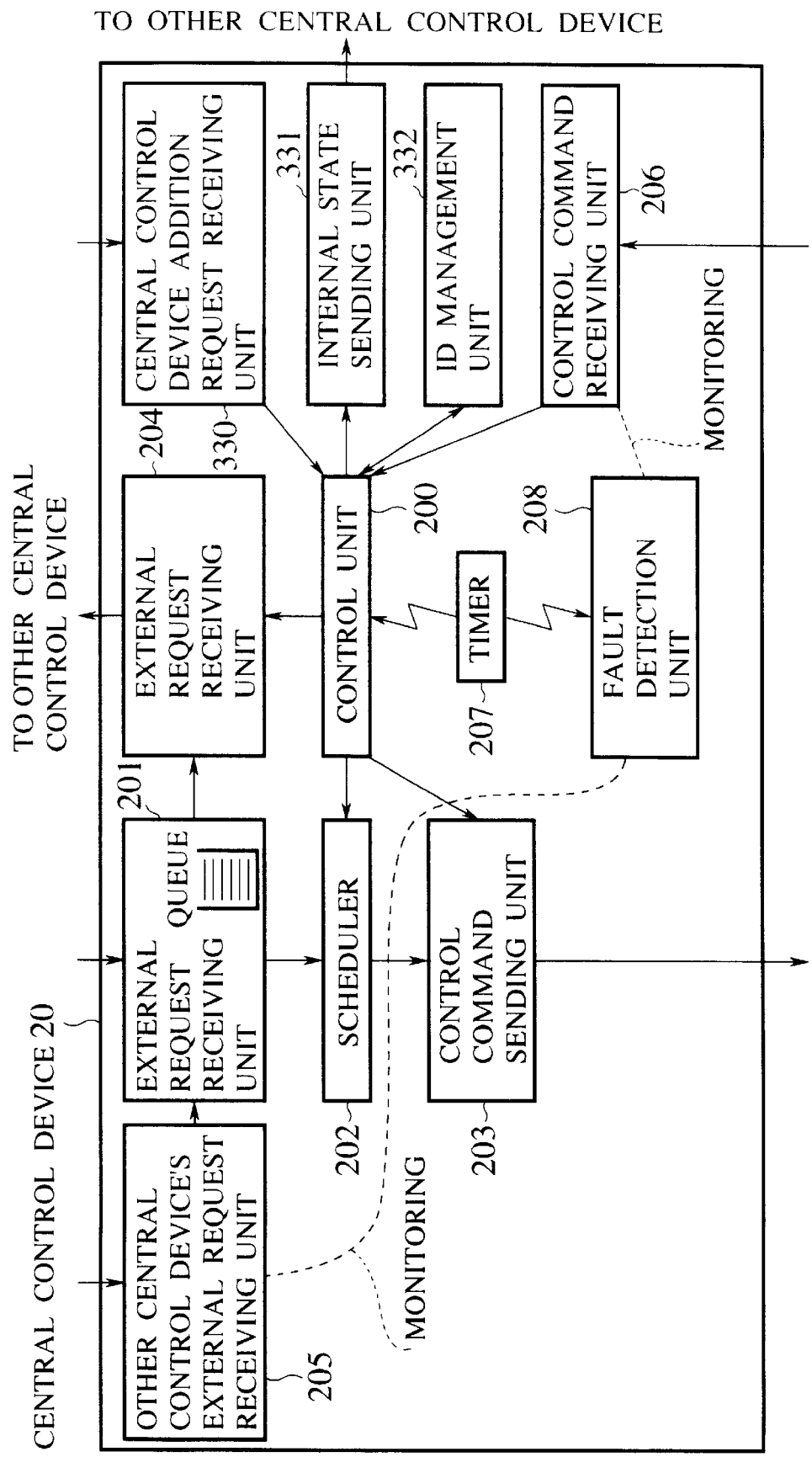
FIG. 62 is a block diagram of a central control device in the continuous data server apparatus of FIG. 1 according to the embodiment VII of the present invention.

Also, in the embodiment VII, the central control device is formed by an other central control device's external request receiving unit, an external request receiving unit, an external request sending unit, a scheduler, a control command sending unit, a control command receiving unit, a timer, a fault detection unit, a central control device addition request receiving unit, an internal state sending unit, an ID management unit, and a control unit for coordinating controls of these elements (FIG. 62).

In the continuous data server apparatus which has one master central control device and a plurality of slave central control devices in such a configuration, by issuing a central control addition request to the master central control device to obtain an internal state of the master central control device, it is possible to set the internal state of the central control device to be added identical to the internal state of the other central control device, so that it becomes possible to add a central control device to the continuous data server apparatus without stopping the operations of the continuous data server apparatus.

Now the embodiment I to the embodiment VII will be described in further detail.

First, a basic configuration of the continuous data server apparatus according to the present invention will be described.

FIG. 1 shows a configuration of the continuous data server apparatus according to the present invention.

This continuous data server apparatus of FIG. 1 has n (n is an integer not less than 1) sets of data memory control devices 14, a prescribed number of data memory devices 12 connected to each data memory control device 14, m (m is an integer not less than 1) sets of communication control device 16, a buffer memory device 18 connected with each data memory control device 14 and each communication control device 16, and k (k is an integer greater than 1) sets of central control devices 20 connected with each data memory control device 14 and each communication control device 16 through one or more transmission path. Here, among a plurality of central control devices 20, one is set as a master central control device while the others are set as slave central control devices.

The data memory devices 12 are used for storing the continuous data such as video data and speech data, which are usually provided in forms of disk devices such as magnetic disk devices, optical disk devices, magnetooptical disk devices, etc. Apart from the disk device, it is also possible to use a semiconductor memory device such as RAM or EEPROM.

Each data memory control device 14 has a prescribed number of data memory devices 12 connected thereto, and is controlled by the central control device 20 to read out the continuous data stored in the data memory devices 12 and writes the read out continuous data into specified addresses of a specified buffer memory device 18.

The buffer memory device 18 is used for temporarily storing the continuous data transferred from the data memory control devices 14.

Each communication control device 16 is controlled by the central control device 20 to read out the continuous data from specified addresses of a specified buffer memory device 18 and transfers the read out continuous data to a communication path such as a network. Here, one or more transfer destinations may be involved.

The central control device 20 for coordinating the control of the entire system is constructed from a CPU, a memory device, and a communication device similarly as a usual electronic computer, and realizes its function by executing a program describing the control of the entire system on a CPU.

In order to control the entire system, the central control device 20 manages, or is capable of knowing, all information within the system such as a specification of each continuous data stored in the system such as their bit rates, an arrangement state of each continuous data over the data memory devices 12, communication paths which are available for connection from each communication control device 16, etc.

The central control device 20 receives an access request for the continuous data from a user or an application program which is transmitted by means of a communication through a network, an inter-process communication, a procedure call, etc. Then, the central control device 20 selects the data memory control devices 14 and the communication control devices 16 to be used in responding to that request, and commands "which continuous data stored in which data memory devices 12 are to be transferred to which addresses of the buffer memory device 18" to the data memory control devices 14 and "which continuous data at which addresses in the buffer memory device 18 are to be transmitted to where (which receiver)" to the communication control devices 16.

In each one of the embodiment I to the embodiment VII described below, the continuous data server apparatus is supposed to have this basic configuration of FIG. 1.

Now, the major similarities and differences among the embodiment I to the embodiment VI described below will be briefly summarized.

In the embodiment I to the embodiment IV, the slave central control device detects a fault according to a transmission state of control commands and output information from the master central control device, whereas in the embodiment V and the embodiment VI, a fault is detected according to a transmission state of output information from the master central control device.

The embodiment I and the embodiment II assume that a transmission path connecting the central control devices is reliable. On the other hand, the embodiment III to the embodiment IV assume and deal with a possibility for a case where control commands or external requests or both of them are not transmitted from the master to some slave alone at some period due to a problem in transmission.

The embodiments I, III and VI are directed to a case where control commands to be transmitted from the central control device to the control targets including the data memory control devices and the communication control devices at one period are for determining the operations of these control targets in a next period of that one period. On the other hand, the embodiments II, IV and V are directed to a case where stationary control commands to be transmitted from the central control device to the control targets including the data memory control devices and the communication control devices at one period are for determining the operations of these control targets in a next next period of that one period.

(Embodiment I)

Now, the embodiment I of the present invention will be described in detail. The embodiment I actually comes in two forms, one of which is referred to as an embodiment I-1 while the other one of which is referred to as an embodiment I-2 in the following.

This embodiment I is directed to a case in which a transmission path connecting the central control devices is assumed to be reliable, both the external request and the control command are used for a fault detection, and the operations of the control targets in a next period are determined by the control commands.

In short, in this embodiment I, when a fault in the master is detected, a prescribed one of the slaves is changed into the master at that period where the fault in the master is detected, and carries out a procedure to send the control commands to be sent, notify the change of the master to the other central control devices, and changes setting so that the external requests will be received by this device.

First, the embodiment I-1 will be described.

FIG. 2 shows a configuration of the central control device 20 in the continuous data server apparatus of this embodiment I-1.

This central control device 20 of FIG. 2 has: an external request receiving unit 201 for receiving requests from external; an external request sending unit 204 for sending received external requests to the other central control devices 20; other central control device's external request receiving unit 205 for receiving data from the external request sending unit 204 of the other central control device 20; a scheduler 202 for determining the control command for the data memory control device 14 regarding the reading of the continuous data from the data memory devices 12 and the control command for the communication control device 16 regarding the operation to read out the continuous data from the buffer memory device 18 and send this continuous data to the communication path; a control command sending unit 203 for sending the control commands for the data memory control devices 14 and the communication control devices 16; a control command receiving unit 206 for receiving the control commands sent from the other central control devices 20; a timer 207 for enabling the time management; a fault detection unit 208 for detecting a fault in the other central control devices 20; and a control unit 200 for controlling all these elements.

The scheduler 202 determines the operations of the data memory control devices 14 and the communication control devices which are the control targets. The requests from the external stored in the external request receiving unit 201 are input information of the scheduler 202, and the control commands for the data memory control devices 14 and the communication control devices 16 are output information of the scheduler 202.

Figure 7:
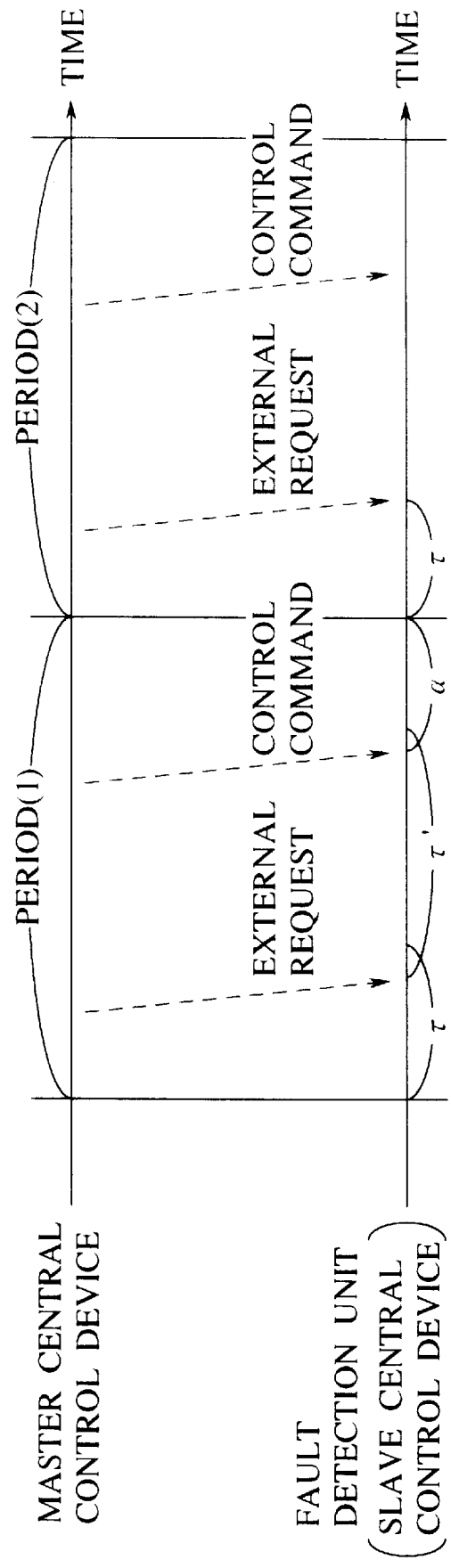
FIG. 7 is a timing diagram for the operations of the central control devices in the continuous data server apparatus of FIG. 1 according to the embodiment I-1.

In the embodiment I-1, the control commands produced by the scheduler 202 at a period 1 shown in FIG. 7 are used by the data memory control devices 14 and the communication control devices 16 at a period 2 shown in FIG. 7. Namely, the control commands issued at the period 1 determine the operations of the control targets at the period 2.

For a plurality of central control devices 20, unique IDs are assigned in advance, so that they can be distinguished from each other. Also, among these plurality of central control devices 20, one is operated as the master central control device 20 while the remaining ones are operated as the slave central control devices 20.

Time used in the central control devices 20 are synchronized in advance. This synchronization of time can be realized by utilizing the NTP protocol, or by providing a common clock to be referred by all the central control devices 20, for example.

The control commands for the data memory control devices 14 and the communication control devices 16 are issued only by the master central control device 20, and the slave central control devices 20 are kept in a hot standby state. When the receiving of the external requests becomes impossible or the sending of the control commands to the data memory control devices 14 and the communication control devices 16 becomes impossible for some reason such as a fault in the master central control device 20, the operation is continued by changing one of the slave central control devices 20 into the master central control device 20.

A detection of a fault in the master central control device 20 is carried out by the slave central control device 20. Here, when the slave central control device 20 cannot receive the external requests or the control commands which are supposed to be sent from the master central control device 20, it is judged that a fault occurred in the master central control device 20. When it is judged that a fault occurred in the master central control device 20, the slave central control device 20 which detected the fault takes over the role of the master central control device 20 by start receiving the external requests and issuing the control commands for the data memory control devices 14 and the communication control devices 16.

Next, the operation of the master central control device 20 in this embodiment I-1 will be described.

The external request receiving unit 201 has a queue for storing received requests, and continually receives requests from external and stored the received external requests in the queue, independently from the other parts of the master central control device 20. The external requests stored in the queue are sent to the other slave central control devices 20 and given to the scheduler 202 according to a command from the control unit 200. Note that when there is no received external request in one period, an empty external request is outputted in order to explicitly notify an absence of external request.

Figure 3:
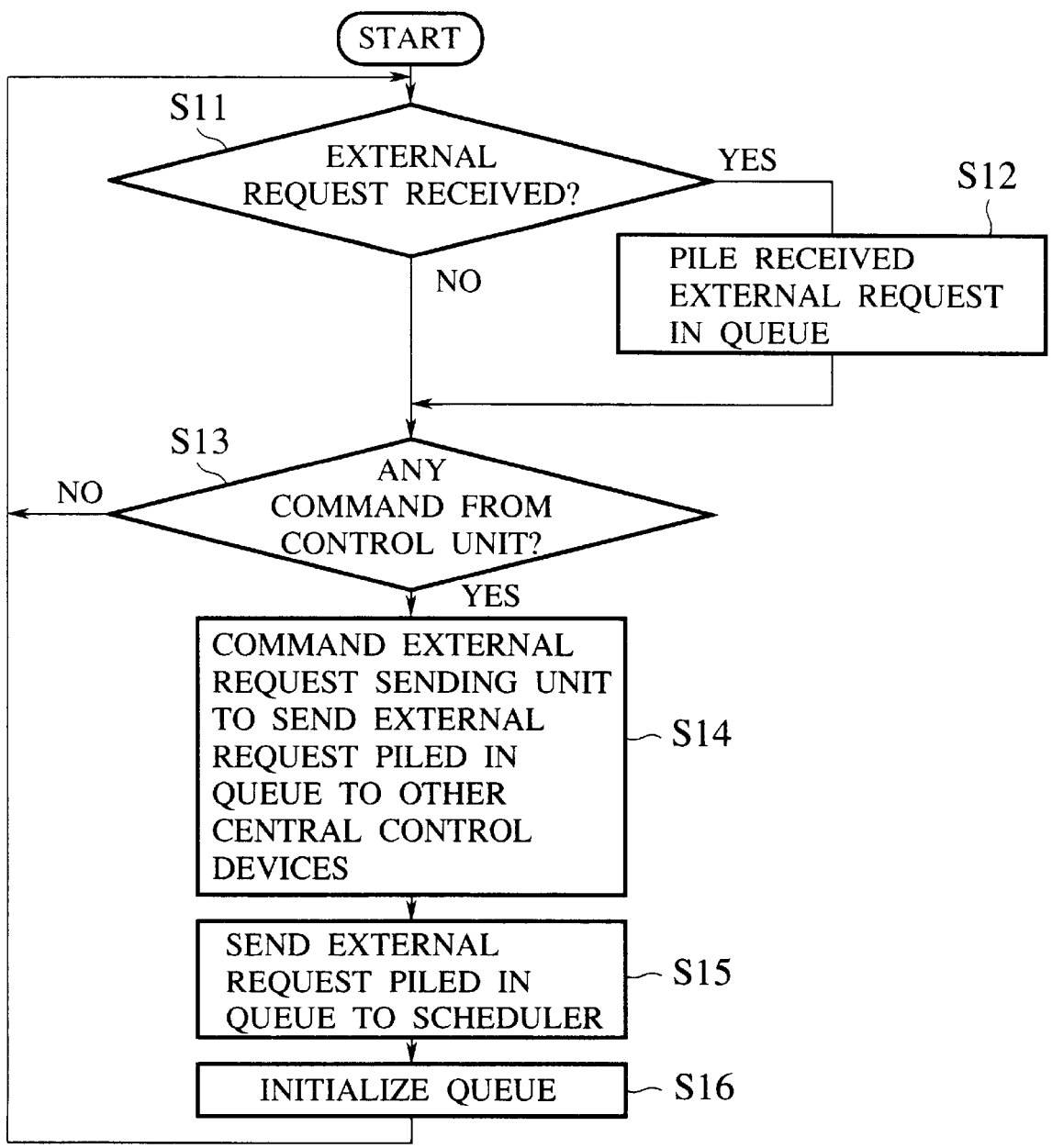
FIG. 3 is a flow chart for the operation of an external request receiving unit in the central control device of FIG. 2 operating as a master central control device according to the embodiment I-1.

FIG. 3 shows a flow chart for the operation of the external request receiving unit 201.

Until a command from the control unit 200 is received, a request from external is awaited, and when an external request is received (step S11 YES), the received external request is stored in the queue (step S12).

When a command from the control unit 200 is received (step S13 YES), the external request sending unit 204 is commanded to send the external requests piled in the queue to the other slave central control devices 20 (step S14), while the external requests stored in the queue are given to the scheduler 202 (step S15). Finally, the queue is initialized (step S16), and the operation returns to the step S11.

The external request sending unit 204 sends the external requests stored in the queue of the external request receiving unit 201 to all the other slave central control devices 20. Here, the sending of the external requests can be carried out for each slave central control device 20 separately, or for all the slave central control devices 20 at once by using the broadcast function of UDP, for example.

The control command receiving unit 206 receives the control commands issued by the other central control devices 20, and notifies the receiving of the control commands to the control unit 200. Here, a number of control commands issued by one operation determination processing by the scheduler 202 can be one or plural, and in a case of issuing a plurality of control commands, the notification to the control unit 200 is made after all the control commands are received.

The timer 207 sends a notice to the control unit 200 by means such as an interruption when a prescribed time is reached, so as to start the operation of the central control device 20. A setting of a time in the timer 207 is carried out by the control unit 200.

The control unit 200 carries out the control of the master central control device 20 as a whole.

Figure 4:
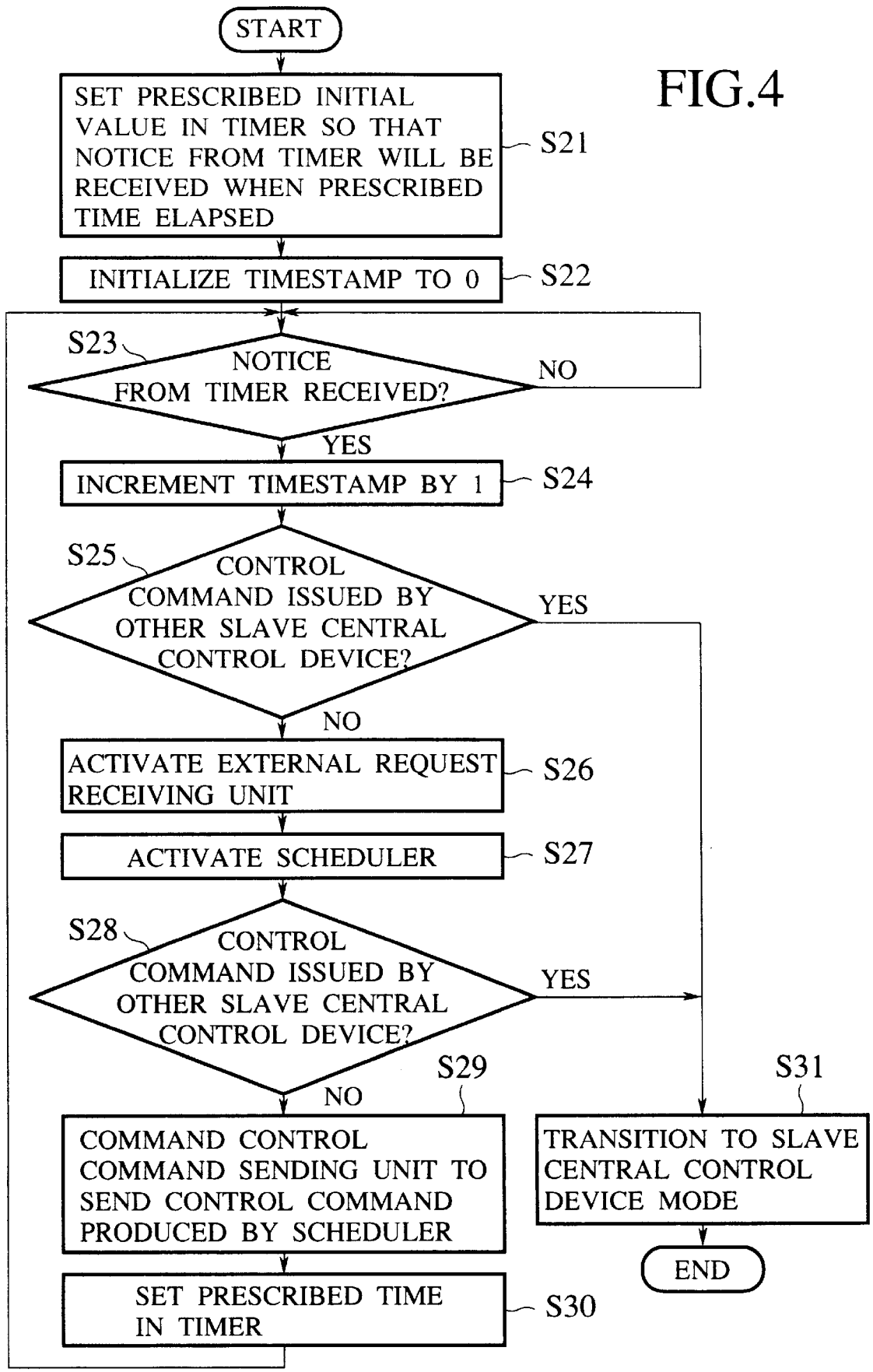
FIG. 4 is a flow chart for the operation of a control unit in the central control device of FIG. 2 operating as a master central control device according to the embodiment I-1.

FIG. 4 shows a flow chart for the operation of the control unit 200.

At a time of initialization, the control unit 200 sets the timer 207 so that a notice from the timer 207 will be received when a prescribed time is reached (step S21), and initializes a timestamp to 0 (step S22).

When a prescribed time is reached, the notice from the timer 207 is received (step S23 YES), a value of the timestamp is incremented by 1 (step S24), and whether the control command is issued by the other slave central control device 20 or not is checked (step S25). In a case where the control command is issued by the other slave central control device 20 (step S25 YES), even if the master central control device 20 is normally operating, a transition to the slave central control device mode is made by this control unit 200 (step S31) and the sending of the external requests to the other slave central control devices 20 is stopped. In a case where the control command is not issued by the other slave central control device 20 (step S25 NO), the external request receiving unit 201 is activated (step S26) to send the external requests stored in the queue of the external request receiving unit 201 to the other slave central control devices 20 while giving these external requests to the scheduler 202, and the scheduler 202 is activated (step S27).

Next, whether the control command is issued by the other slave central control device 20 or not is checked again (step S28). In a case where the control command is not issued by the other slave central control device 20 (step S28 NO), the control command sending unit 203 is commanded send the control command produced by the scheduler 202 to the data memory control devices 14 and the communication control devices 16 (step S29), and the timer 207 is set again so that a notice from the timer 207 will be received when a next prescribed time is reached (step S30). In a case where the control command is issued by the other slave central control device 20 (step S28 YES), a transition to the slave central control device mode is made by this control unit 200 (step S31) similarly as in the above, and the issuing of the control commands for the data memory control devices 14 and the communication control devices 16 is stopped.

In the above procedure, a prescribed time to be set in the timer 207 should be a time which provides enough margin for handing over the processing to the slave central control device 20.

FIG. 5 shows an exemplary configuration of the external request data to be sent to the slave central control device 20 on standby. This external request data of FIG. 5 contains an ID of the master central control device 20 and a number of external requests in addition to the external requests themselves. Here, when there is no received external request in one period, a number of external requests is to be set equal to 0 in this format of FIG. 5.

FIG. 6 shows an exemplary configuration of the control command for the data memory control devices 14 and the communication control devices 16. This control command of FIG. 6 has an ID of the central control device 20 and a uniquely determined timestamp attached in addition to the control commands themselves.

Next, the operation of the slave central control device 20 will be described. Here, the configuration of the slave central control device 20 is obviously identical to that of the master central control device 20.

The timer 207 sends a notice to the fault detection unit 208 by means such as an interruption when a prescribed time is reached, so as to activate the fault detection unit 208. A setting of an activation time of the fault detection unit 208 in the timer 207 is carried out by the fault detection unit 208.

The other central control device's external request receiving unit 205 receives the external request sent from the master central control device 20, and stores this external request in the queue of the external request receiving unit 201, while notifying the received time to the fault detection unit 208. The control command receiving unit 206 monitors the control command for the data memory control devices 14 and the communication control device 16 sent by the master central control device 20, and after confirming the sending of the control command from the master central control device 20, notifies the issue of the control command to the control unit 200.

The external request receiving unit 201 gives the external requests piled in the queue to the scheduler 202 according to a command from the control unit 200 similarly as in a case of the master central control device 20, but the sending of the external requests to the other central control devices 20 is not carried out.

The control command receiving unit 206 receives the control commands issued by the other central control device 20, and notifies the receiving of the control commands to the control unit 200. Here, a number of control commands issued by the other central control device 20 can be one or plural, and in a case of issuing a plurality of control commands, the notification to the control unit 200 is made after all the control commands are received.

Figure 8:
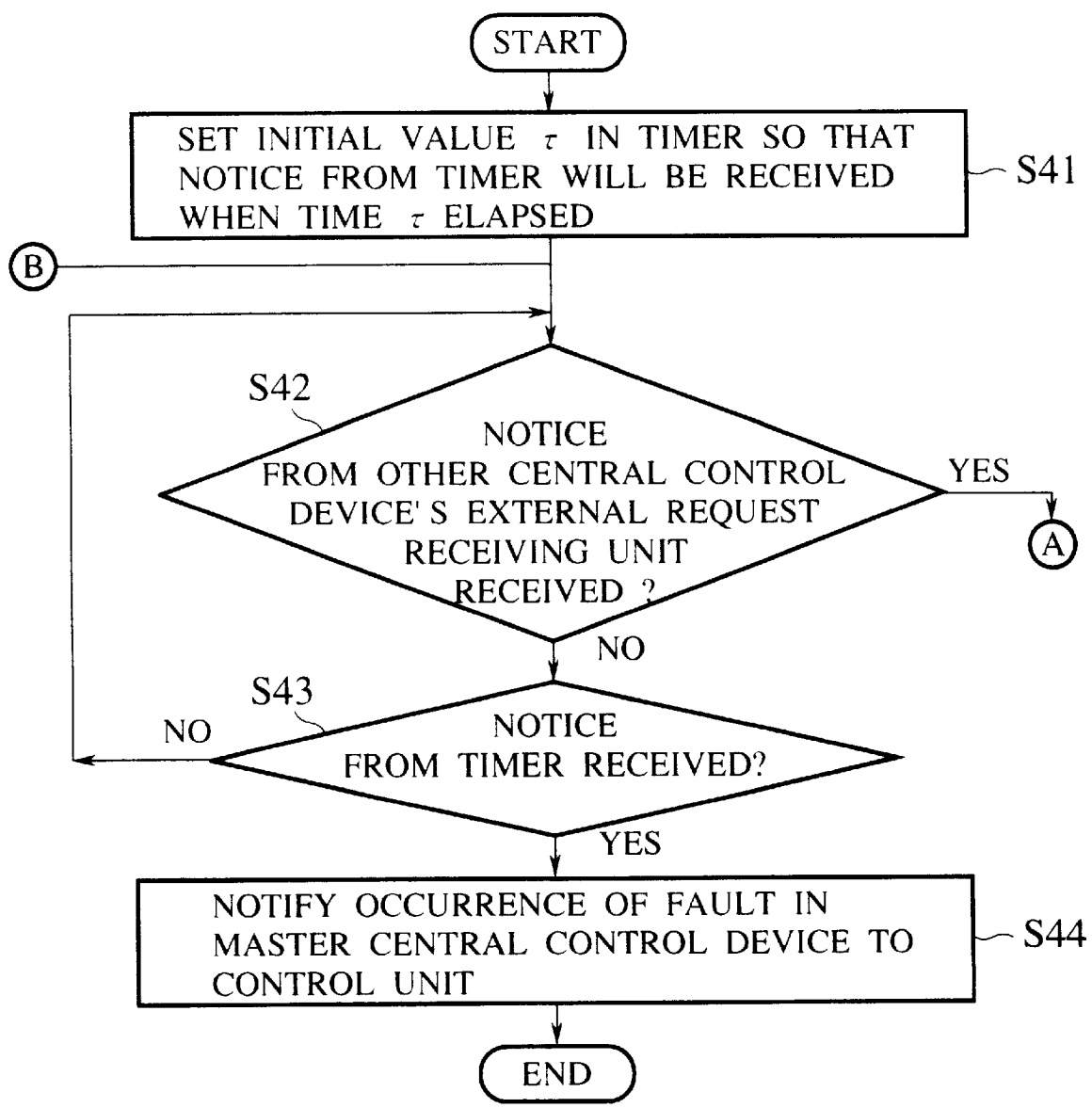
FIG. 8 and FIG. 9 are a flow chart for the operation of a fault detection unit in the central control device of FIG. 2 operating as a slave central control device according to the embodiment I-1.
Figure 9:
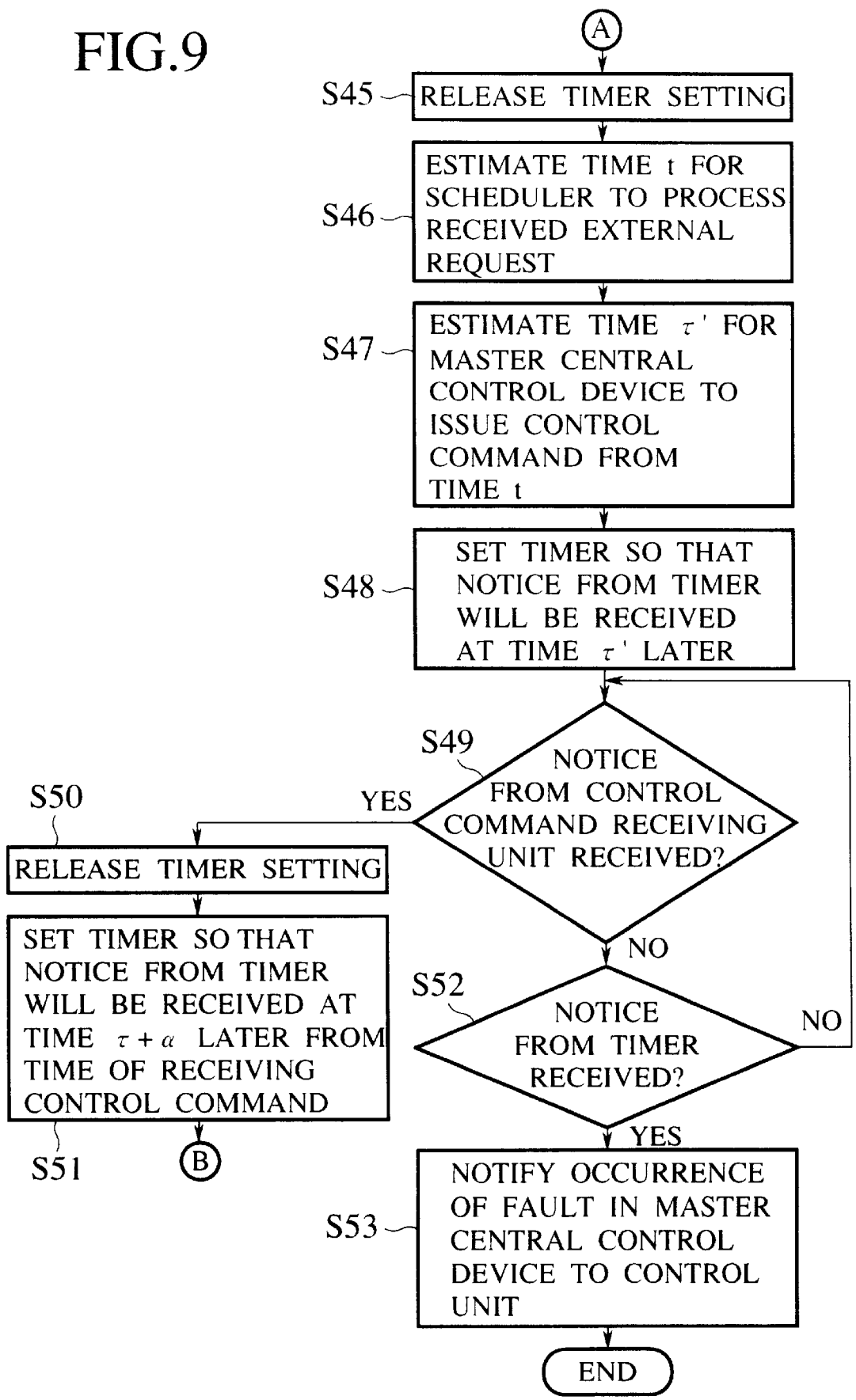

The fault detection unit 208 detects a fault in the master central control device 20 by monitoring the other central control device's external request receiving unit 205 and the control command receiving unit 206. FIG. 7 shows a conceptual diagram for the operation of the fault detection unit 208, while FIG. 8 and FIG. 9 show a flow chart for the operation of the fault detection unit 208.

The fault detection unit 208 uses the timer 207 on the central control device 20 by setting a prescribed setting time τ as an initial value in the timer 207 so that a notice from the timer 207 will be received at time τ later (step S41). This time τ is a time obtained by adding a prescribed margin to a time at which the external requests are sent by the master central control device 20. For a prescribed margin, a sum of a delay due to a communication overhead, an error part of the clock synchronization with respect to the master central control device 20, etc. can be used.

A notice indicating the receiving of data from the other central control device's external request receiving unit 205 is awaited, and when this notice is received (step S42 YES), the setting of the timer 207 is released (step S45). Then, a time t at which the received external request is processed by the scheduler 202 is estimated (step S46), and a time τ' until the master central control device 20 issues the control command is estimated according to the estimated time t by including a prescribed margin (step S47), and the timer 207 is set so that a notice from the timer 207 will be received when time τ' elapsed (step S48).

For a prescribed margin, a sum of a delay due to a communication overhead, an error part of the clock synchronization with respect to the master central control device 20, etc. can be used.

On the other hand, when a notice from the timer 207 is received (step S43 YES) before the notice indicating the receiving of data from the other central control device's external request receiving unit 205 is received, it is judged that a fault occurred in the master central control device 20, and an occurrence of the fault in the master central control device is notified to the control unit 200 (step S44).

Next, a notice indicating the receiving of the control command from the control command receiving unit 206 is awaited, and when this notice is received (step S49 YES), the setting of the timer 207 is released (step S50), and the timer 207 is set again so that a notice from the timer 207 will be received when a prescribed time ($\tau+\alpha$) elapsed since a time of receiving the control command (step S51). Here, $\alpha$ is a remaining time of the operation period of the master central control device 20. Note that this $\alpha$ is a time that can be different depending on a length of the operation period of the master central control device 20.

On the other hand, when a notice from the timer 207 is received (step S52 YES) before the notice indicating the receiving of the control command from the control command receiving unit 206 is received, it is judged that a fault occurred in the master central control device 20, and an occurrence of the fault in the master central control device is notified to the control unit 200 (step S53).

The control unit 200 carries out the control of the slave central control device 20 as a whole.

Figure 10:
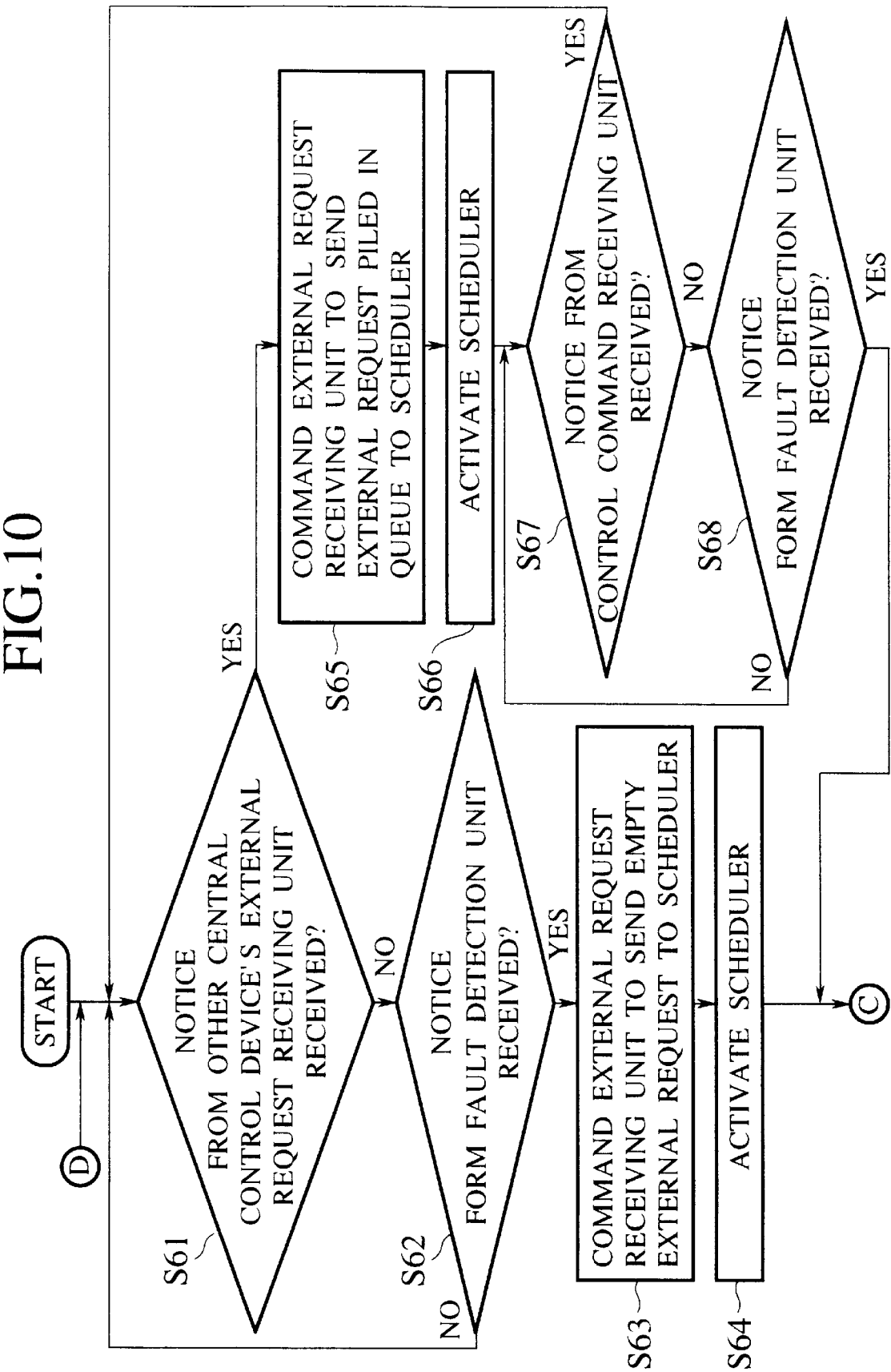
FIG. 10 and FIG. 11 are a flow chart for the operation of a control unit in the central control device of FIG. 2 operating as a slave central control device according to the embodiment I-1.
Figure 11:
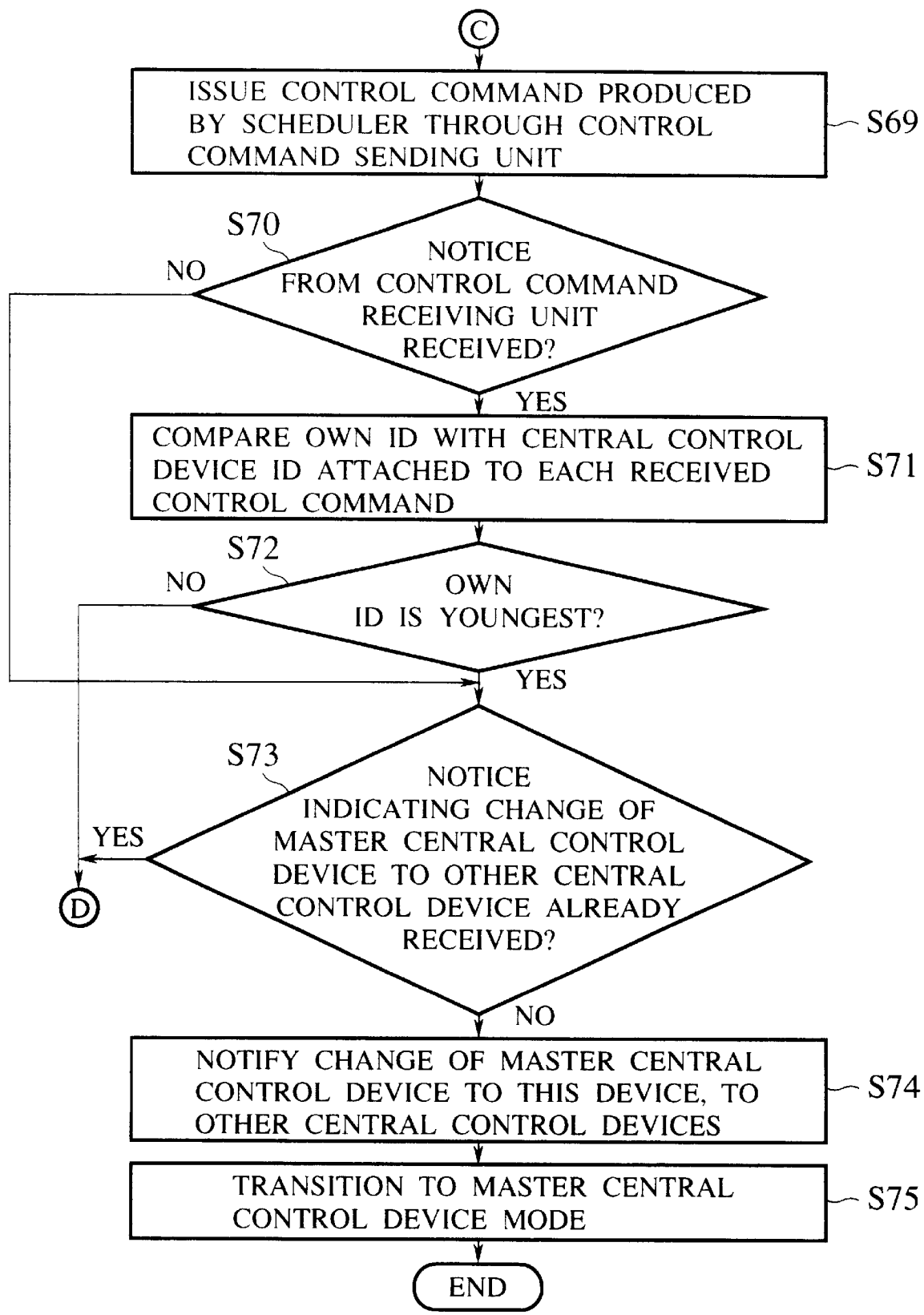

FIG. 10 and FIG. 11 show a flow chart for the operation of the control unit 200.

The control unit 200 is in a waiting state until a notice indicating the receiving of the external request is received from the other central control device's external request receiving unit 205 (step S61) or a notice indicating an occurrence of a fault in the master central control device 20 is received from the fault detection unit 208 (step S62).

When the external request is notified from the other central control device's external request receiving unit 205 (step S61 YES), the external request receiving unit 201 is commanded to give the external requests stored in the queue to the scheduler 202 (step S65), and the scheduler 202 is activated (step S66) to carry out the processing to determine the operation of the control devices, so as to realize the consistency with respect to the internal state of the master central control device 20.

Then, the control unit 200 is in a waiting state until a notice indicating the issue of the control command by the master central control device 20 is received from the control command receiving unit 206 (step S67) or a notice indicating an occurrence of a fault in the master central control device 20 is received from the fault detection unit 208 (step S68).

When the notice from the control command receiving unit 206 is received (step S67 YES), the operation returns to the initial waiting state (steps S61, S62).

When the notice indicating an occurrence of a fault is received (step S68 YES), the control command produced by the scheduler 202 is issued to the data memory control devices 14 and the communication control devices 16 through the control command sending unit 203 (step S69). Then, whether a notice from the control command receiving unit 206 was received or not is checked (step S70), and when this notice was not received (step S70 NO), whether a notice indicating the change of the master central control device to the other central control device was received or not is checked (step S73). When this notice was already received (step S73 NO), the operation returns to the initial waiting state (steps S61, S62) again. When this notice was not received, the change of the master central control device to this slave central control device is notified to the other central control devices 20 (step S74), and a transition to the master central control device mode is made (step S75).

When the notice from the control command receiving unit 206 was received (step S70 YES), there is a possibility for the other central control device 20 to be in a process of making a transition to the master central control device mode, so that the ID of this slave central control device is compared with the ID of the central control device 20 attached to each received control command (step S71), and if the own ID is the youngest one (step S72 YES), whether a notice indicating the change of the master central control device to the other central control device was received or not is checked (step S73). When this notice was already received (step S73 NO), the operation returns to the initial waiting state (steps S61, S62) again. When this notice was not received, the change of the master central control device to this slave central control device is notified to the other central control devices 20 (step S74), and a transition to the master central control device mode is made (step S75). When the own ID is not the youngest one (step S72 NO), the operation returns to the initial waiting state (steps S61, S62) again.

When the notice indicating an occurrence of a fault in the master central control device 20 is received from the fault detection unit 208 before the notice indicating the receiving of the external request is received from the other central control device's external request receiving unit 205 (step S62 YES), the external request receiving unit 201 is commanded to give an empty external request to the scheduler 202 (step S63), and the scheduler 202 is activated (step S64). Then, the control command produced by the scheduler 202 is issued through the control command sending unit 203 (step S69).

Thereafter, whether a notice from the control command receiving unit 206 was received or not is checked (step S70), and when this notice was not received (step S70 NO), whether a notice indicating the change of the master central control device to the other central control device was received or not is checked (step S73). When this notice was already received (step S73 NO), the operation returns to the initial waiting state (steps S61, S62) again. When this notice was not received, the change of the master central control device to this slave central control device is notified to the other central control devices 20 (step S74), and a transition to the master central control device mode is made (step S75).

When the notice from the control command receiving unit 206 was received (step S70 YES), there is a possibility for the other central control device 20 to be in a process of making a transition to the master central control device mode, so that the ID of this slave central control device is compared with the ID of the central control device 20 attached to each received control command (step S71), and if the own ID is the youngest one (step S72 YES), whether a notice indicating the change of the master central control device to the other central control device was received or not is checked (step S73). When this notice was already received (step S73 NO), the operation returns to the initial waiting state (steps S61, S62) again. When this notice was not received, the change of the master central control device to this slave central control device is notified to the other central control devices 20 (step S74), and a transition to the master central control device mode is made (step S75). When the own ID is not the youngest one (step S72 NO), the operation returns to the initial waiting state (steps S61, S62) again.

When the slave central control device 20 makes a transition to the master central control device mode, the setting is changed so that the external request will be received by this central control device, and the transition to the master central control device mode is made by executing the operation procedure shown in FIG. 4.

In this manner, only one slave central control device can be changed into the master central control device.

According to this embodiment I-1, the master central control device 20 periodically repeats the same processing as shown in FIG. 4, but the time for executing the processing to be carried out within the period is determined, and this time can be set up by providing enough margin to hand over the processing to the other slave central control device 20, while the internal state of every slave central control device 20 coincides with the internal state of the master central control device 20 within this period, so that when the fault detection unit 208 of the slave central control device 20 detects a fault in the master central control device 20, it is possible to hand over the processing to be carried out within that period by instantaneously changing one of the slave central control devices 20 into the master central control device 20, and therefore the continuity of the continuous data service can be guaranteed.

(1) Note that, in the above embodiment I-1, in a case where a fault occurs in the master central control device 20, when a plurality of slave central control devices 20 tries to make a transition to the master central control device 20, there is a possibility for sending the identical command to the data memory control devices 14 and the communication control devices 16 more than once. In this regard, each of the data memory control devices 14 and the communication control devices 16 can be operated in such a manner that the timestamp attached to the control command is checked, and when more than one control commands with the same timestamp are received, only the first one is executed as a command while the rest is ignored.

(2) Also, in the above embodiment I-1, the issuing of the control command is carried out by the master central control device 20 alone, but it is also possible to adopt a scheme in which the control command is also issued from the slave central control device 20 in addition to the master central control device 20. In this scheme, when the transmission path connecting the central control devices 20 with the data memory control devices 14 and the communication control devices 16 has a low reliability, it is possible to reduce a probability for the control command transmission failure, by sending more than one control commands.

Figure 12:
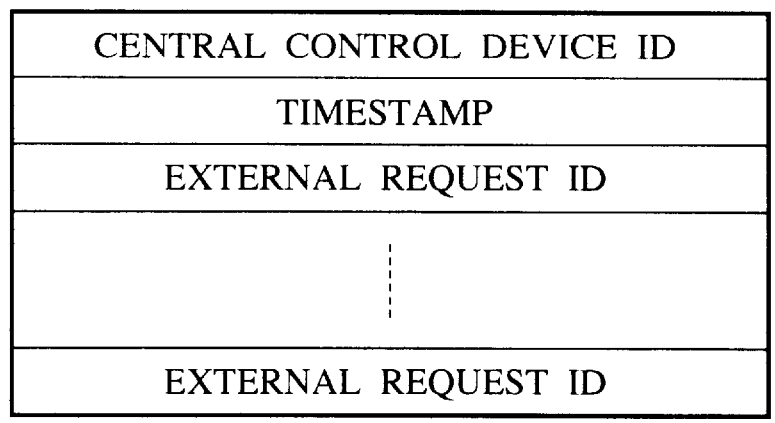
FIG. 12 is a diagram showing an exemplary configuration of a list of external requests that can be used in the central control device of FIG. 2.
Figure 13:
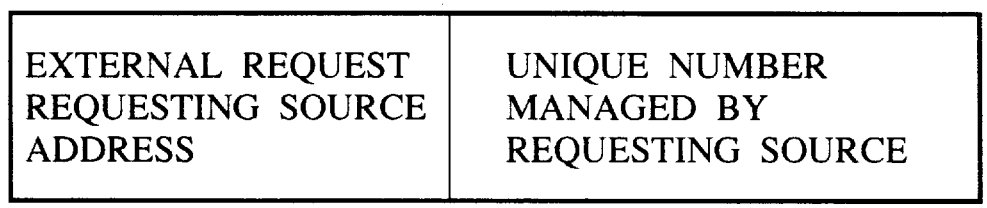
FIG. 13 is a diagram showing an example of an ID that can be used in the central control device of FIG. 2.

(3) Also, in the above embodiment I-1, the external requests are received by the master central control device 20 alone, but it is also possible to adopt a scheme in which the external requests are received by all the central control devices 20. In this case, the consistency of the internal states among the central control devices 20 can be maintained by sending a list of external requests from the master central control device 20 to the slave central control devices 20. An exemplary configuration of a list of external requests to be sent in this case is shown in FIG. 12. In this example of FIG. 12, a uniquely defined ID is assigned to each external request, and a list of IDs is sent. An example of the ID that can be used here is shown in FIG. 13, where the ID is given by a combination of the address of the requesting source of the external request and a uniquely defined number managed by the requesting source.

(4) Also, in the embodiment I-1, there are cases in which the responses or requests arrive from the data memory control devices 14 and the communication control device 16. In such cases, similarly as in a case of receiving the external request, it is possible to make the internal states of all of the master central control device 20 and the slave central control devices 20 identical to each other, by providing a response receiving unit and a response sending unit in each central control device 20 and sending a response or request received by the response receiving unit of the master central control device 20 to the other slave central control devices 20 by using the response sending unit.

Note that the remarks (1) to (4) described here are equally applicable to the embodiments I-2 and II to VI described below.

Figure 14:
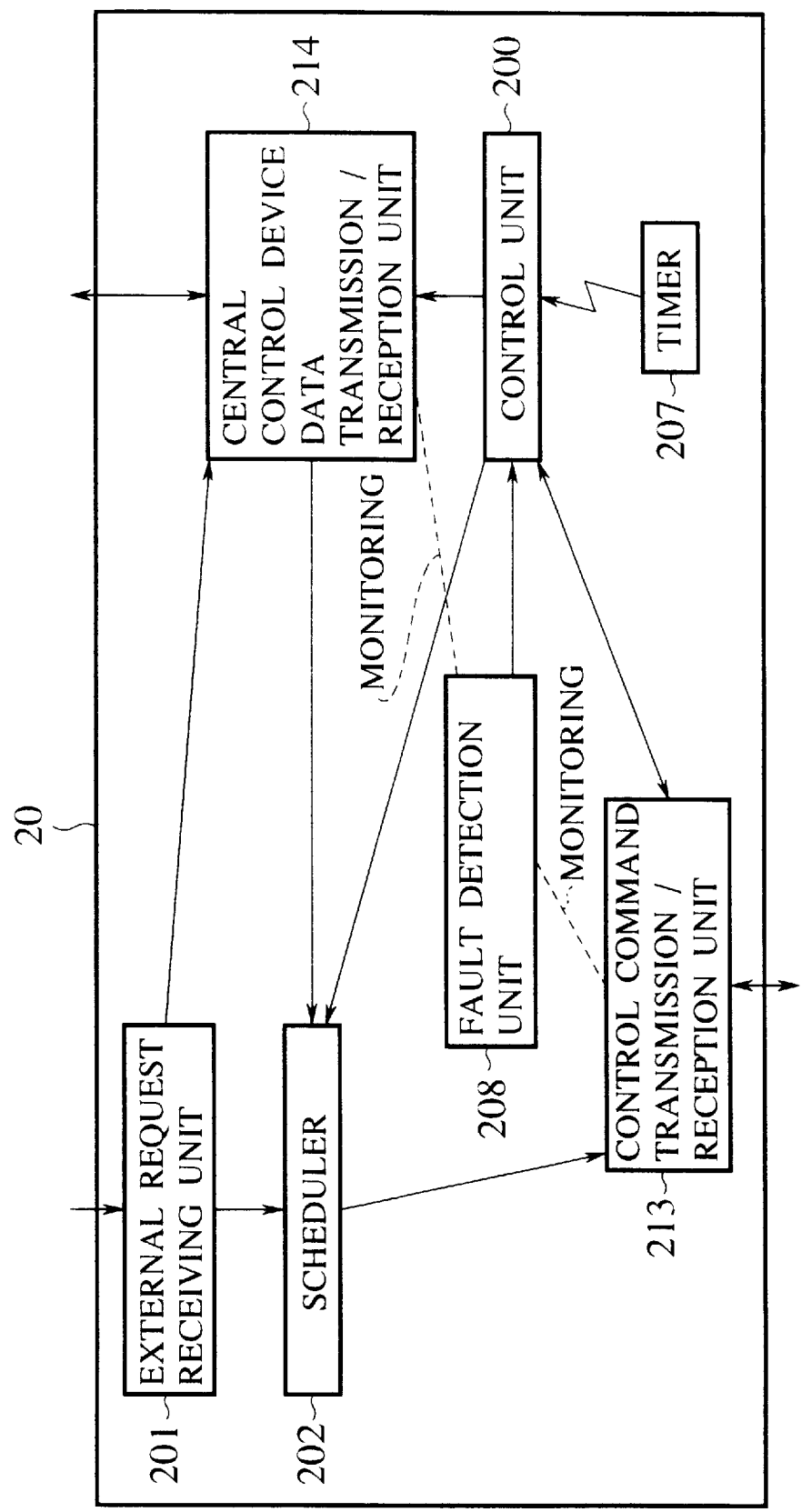
FIG. 14 is a block diagram showing one possible modification in a configuration of the central control device of FIG. 2.

As a possible modified configuration of the central control device 20, it is possible to use a configuration shown in FIG. 14, where the other central control device's external request receiving unit 205 and the external request sending unit 204 of FIG. 2 are unified into an other control device data transmission/reception unit 214, while the control command sending unit 203 and the control command receiving unit 206 of FIG. 2 are unified into a control command transmission/reception unit 213.

Figure 15:
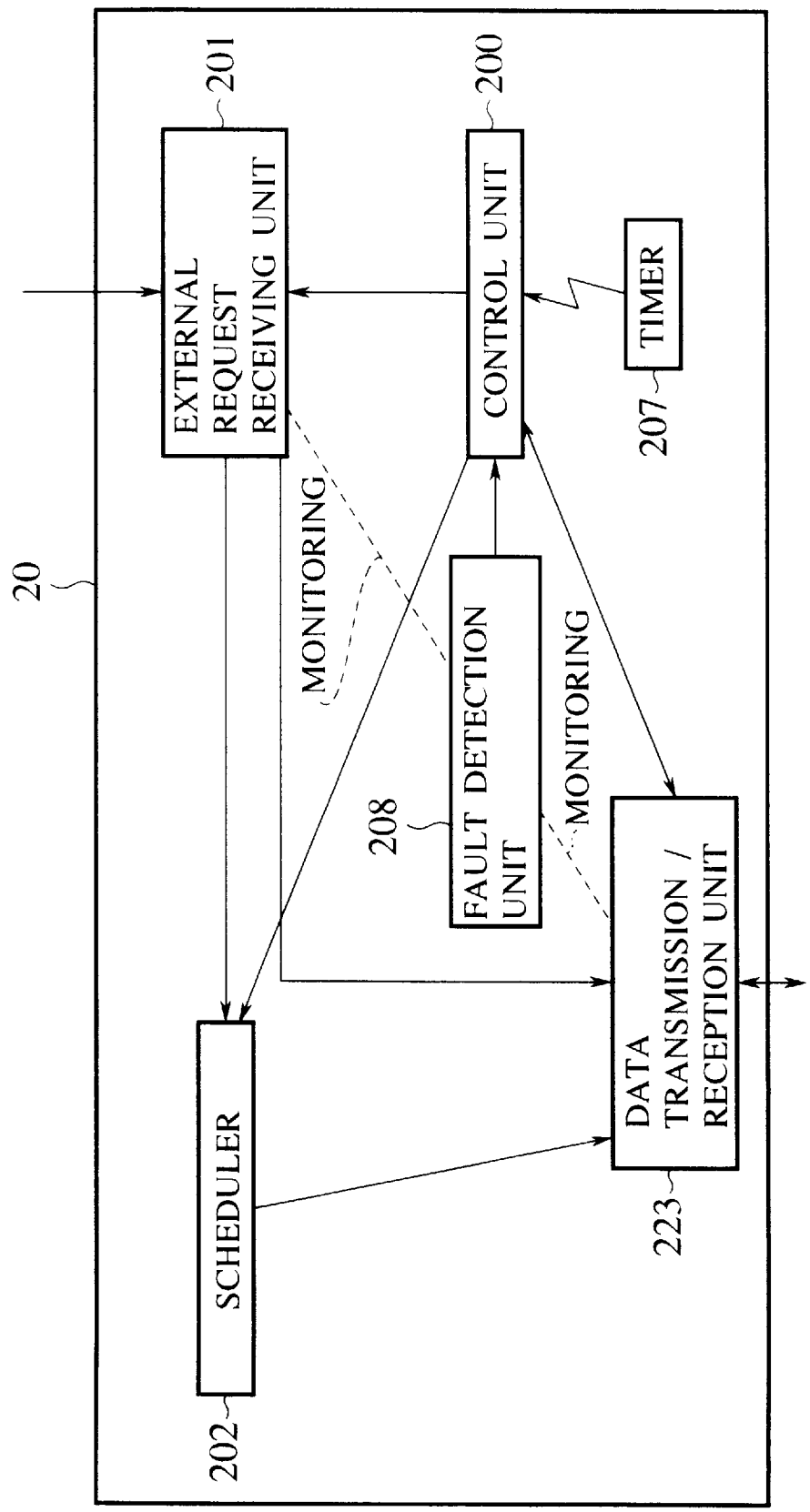
FIG. 15 is a block diagram showing another possible modification in a configuration of the central control device of FIG. 2.

Moreover, it is also possible to use a configuration shown in FIG. 15 in which the other control device data transmission/reception unit 214 and the control command transmission/reception unit 213 of FIG. 14 are further unified into a data transmission/reception unit 223 for handling all data input/output.

Note that the same remarks concerning the modified configurations also apply to the embodiments I-2 and II to IV described below.

Next, the embodiment I-2 will be described.

In this embodiment I-2, the configuration of the central control device 20 is the same as that shown in FIG. 2 described above.

Namely, the central control device 20 has: an external request receiving unit 201 for receiving requests from external; an external request sending unit 204 for sending received external requests to the other central control devices 20; other central control device's external request receiving unit 205 for receiving data from the external request sending unit 204 of the other central control device 20; a scheduler 202 for determining the control command for the data memory control device 14 regarding the reading of the continuous data from the data memory devices 12 and the control command for the communication control device 16 regarding the operation to read out the continuous data from the buffer memory device 18 and send this continuous data to the communication path; a control command sending unit 203 for sending the control commands for the data memory control devices 14 and the communication control devices 16; a control command receiving unit 206 for receiving the control commands sent from the other central control devices 20; a timer 207 for enabling the time management; a fault detection unit 208 for detecting a fault in the other central control devices 20; and a control unit 200 for controlling all these elements.

The scheduler 202 determines the operations of the data memory control devices 14 and the communication control devices which are the control targets. The requests from the external stored in the external request receiving unit 201 are input information of the scheduler 202, and the control commands for the data memory control devices 14 and the communication control devices 16 are output information of the scheduler 202.

Figure 17:
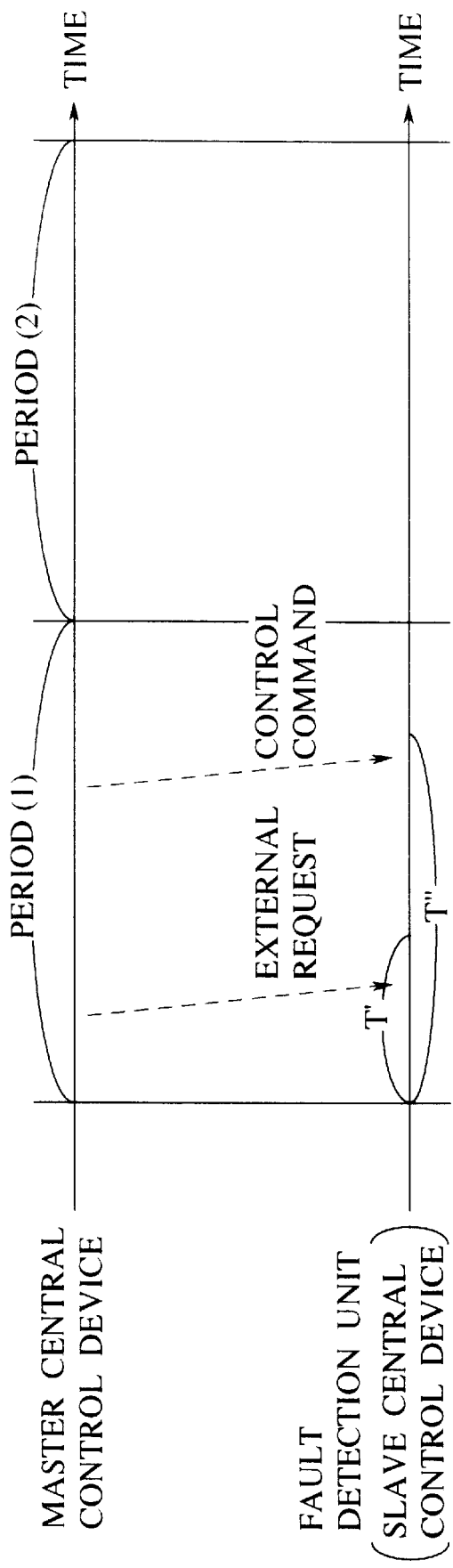
FIG. 17 is a timing diagram for the operations by the central control devices in the continuous data server apparatus of FIG. 1 according to the embodiment I-2.

In the embodiment I-2, the control commands produced by the scheduler 202 at a period 1 shown in FIG. 17 are used by the data memory control devices 14 and the communication control devices 16 at a period 2 shown in FIG. 17. Namely, the control commands issued at the period 1 determine the operations of the control targets at the period 2.

For a plurality of central control devices 20, unique IDs are assigned in advance, so that they can be distinguished from each other. Also, among these plurality of central control devices 20, one is operated as the master central control device 20 while the remaining ones are operated as the slave central control devices 20.

Time used in the central control devices 20 are synchronized in advance. This synchronization of time can be realized by utilizing the NTP protocol, or by providing a common clock to be referred by all the central control devices 20, for example. In this embodiment I-2, all the central control devices 20 are operated in synchronization at a certain time period T.

The control commands for the data memory control devices 14 and the communication control devices 16 are issued only by the master central control device 20, and the slave central control devices 20 are kept in a hot standby state. When the receiving of the external requests becomes impossible or the sending of the control commands to the data memory control devices 14 and the communication control devices 16 becomes impossible for some reason such as a fault in the master central control device 20, the operation is continued by changing one of the slave central control devices 20 into the master central control device 20.

A detection of a fault in the master central control device 20 is carried out by the slave central control device 20. Here, when the slave central control device 20 cannot receive the external requests or the control commands which are supposed to be sent from the master central control device 20, it is judged that a fault occurred in the master central control device 20. When it is judged that a fault occurred in the master central control device 20, the slave central control device 20 which detected the fault takes over the role of the master central control device 20 by start receiving the external requests and issuing the control commands for the data memory control devices 14 and the communication control devices 16.

Next, the operation of the master central control device 20 in this embodiment I-2 will be described.

The external request receiving unit 201 has a queue for storing received requests, and continually receives requests from external and stored the received external requests in the queue, independently from the other parts of the master central control device 20. The external requests stored in the queue are sent to the other slave central control devices 20 and given to the scheduler 202 according to a command from the control unit 200. Note that when there is no received external request in one period, an empty external request is outputted in order to explicitly notify an absence of external request.

The flow chart for the operation of the external request receiving unit 201 in this embodiment I-2 is the same as that shown in FIG. 3 described above.

Namely, until a command from the control unit 200 is received, a request from external is awaited, and when an external request is received (step S11 YES), the received external request is stored in the queue (step S12).

When a command from the control unit 200 is received (step S13 YES), the external request sending unit 204 is commanded to send the external requests piled in the queue to the other slave central control devices 20 (step S14), while the external requests stored in the queue are given to the scheduler 202 (step S15). Finally, the queue is initialized (step S16), and the operation returns to the step S11.

The external request sending unit 204 sends the external requests stored in the queue of the external request receiving unit 201 to all the other slave central control devices 20. Here, the sending of the external requests can be carried out for each slave central control device 20 separately, or for all the slave central control devices 20 at once by using the broadcast function of UDP, for example.

The control command receiving unit 206 receives the control commands issued by the other central control devices 20, and notifies the receiving of the control commands to the control unit 200. Here, a number of control commands issued by one operation determination processing by the scheduler 202 can be one or plural, and in a case of issuing a plurality of control commands, the notification to the control unit 200 is made after all the control commands are received.

The timer 207 sends a notice to the control unit 200 by means such as an interruption at each prescribed constant period T, so as to start the operation of the central control device 20. A setting of a time in the timer 207 is carried out by the control unit 200. The same prescribed period T is commonly used by all the central control devices 20. Also, a time at which a notice from the timer 207 occurs is also set to be the same at all the central control devices 20.

The control unit 200 carries out the control of the master central control device 20 as a whole.

Figure 16:
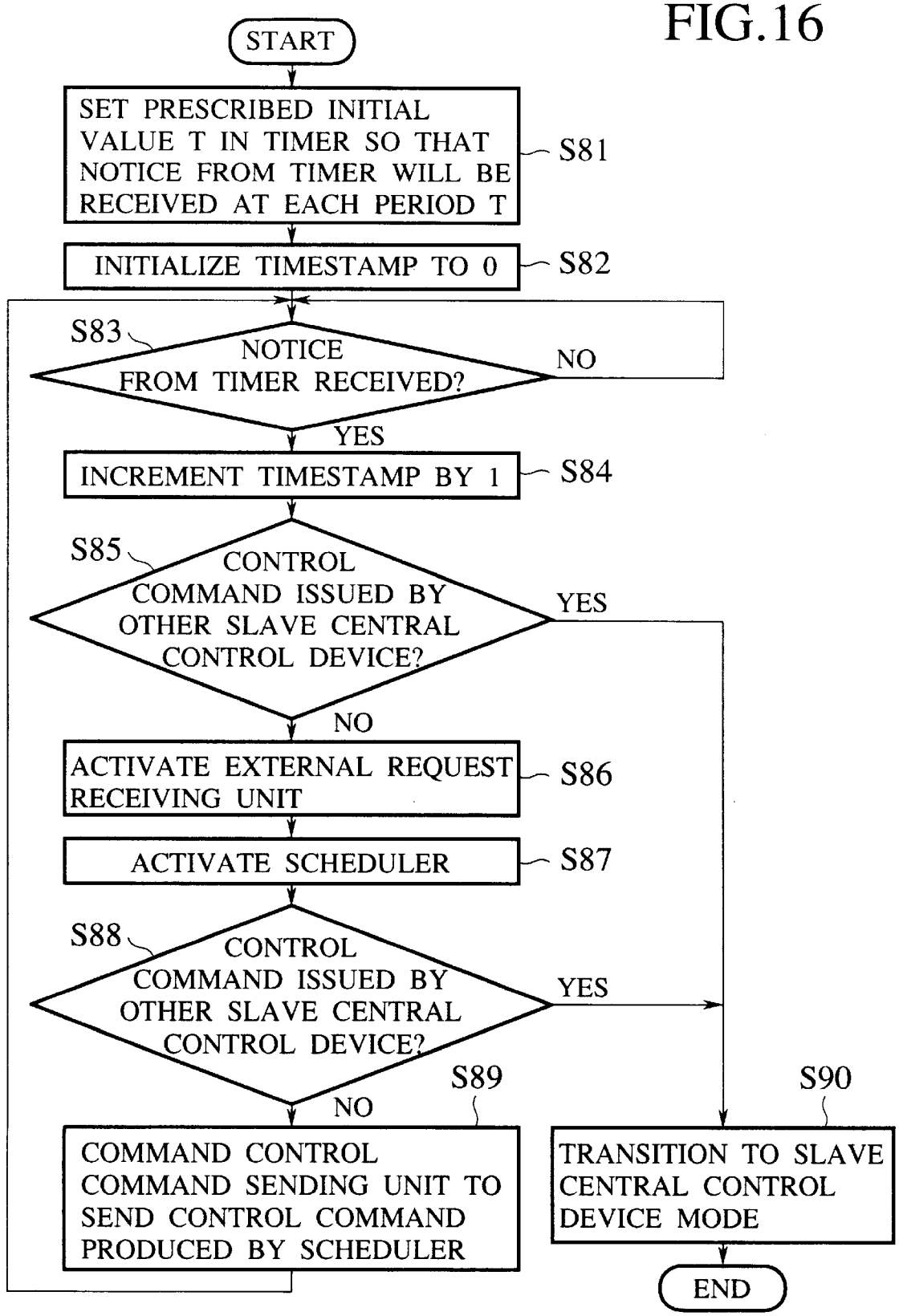
FIG. 16 is a flow chart for the operation of a control unit in the central control device of FIG. 2 operating as a master central control device according to the embodiment I-2.

FIG. 16 shows a flow chart for the operation of the control unit 200.

At a time of initialization, the control unit 200 sets the timer 207 so that a notice from the timer 207 will be received at each prescribed period T (step S81), and initializes a timestamp to 0 (step S82).

When the notice from the timer 207 is received (step S83 YES), a value of the timestamp is incremented by 1 (step S84), and whether the control command is issued by the other slave central control device 20 or not is checked (step S85). In a case where the control command is issued by the other slave central control device 20 (step S85 YES), even if the master central control device 20 is normally operating, a transition to the slave central control device mode is made by this control unit 200 (step S90) and the sending of the external requests to the other slave central control devices 20 is stopped. In a case where the control command is not issued by the other slave central control device 20 (step S85 NO), the external request receiving unit 201 is activated (step S86) to send the external requests stored in the queue of the external request receiving unit 201 to the other slave central control devices 20 while giving these external requests to the scheduler 202, and the scheduler 202 is activated (step S87).

Next, whether the control command is issued by the other slave central control device 20 or not is checked again (step S88). In a case where the control command is not issued by the other slave central control device 20 (step S88 NO), the control command sending unit 203 is commanded send the control command produced by the scheduler 202 to the data memory control devices 14 and the communication control devices 16 (step S89). In a case where the control command is issued by the other slave central control device 20 (step S88 YES), a transition to the slave central control device mode is made by this control unit 200 (step S90) similarly as in the above, and the issuing of the control commands for the data memory control devices 14 and the communication control devices 16 is stopped.

An exemplary configuration of the external request data to be sent to the slave central control device 20 on standby is the same as that shown in FIG. 5 described above. This external request data of FIG. 5 contains an ID of the master central control device 20 and a number of external requests in addition to the external requests themselves. Here, when there is no received external request in one period, a number of external requests is to be set equal to 0 in this format of FIG. 5.

An exemplary configuration of the control command for the data memory control devices 14 and the communication control devices 16 is the same as that shown in FIG. 6 described above. This control command of FIG. 6 has an ID of the central control device 20 and a uniquely determined timestamp attached in addition to the control commands themselves. The timestamp used here is a positive integer which is incremented one by one at each period T of the timer 207.

Next, the operation of the slave central control device 20 will be described. Here, the configuration of the slave central control device 20 is obviously identical to that of the master central control device 20.

The timer 207 sends a notice to the fault detection unit 208 by means such as an interruption at each prescribed period T of the timer 207 of the master central control device 20, so as to activate the fault detection unit 208. A setting of an activation time of the fault detection unit 208 is carried out by the fault detection unit 208.

The other central control device's external request receiving unit 205 receives the external request sent from the master central control device 20, and stores this external request in the queue of the external request receiving unit 201, while notifying the received time to the fault detection unit 208. The control command receiving unit 206 monitors the control command for the data memory control devices 14 and the communication control device 16 sent by the master central control device 20, and after confirming the sending of the control command from the master central control device 20, notifies the issue of the control command to the control unit 200.

The external request receiving unit 201 gives the external requests piled in the queue to the scheduler 202 according to a command from the control unit 200 similarly as in a case of the master central control device 20, but the sending of the external requests to the other central control devices 20 is not carried out.

The control command receiving unit 206 receives the control commands issued by the other central control device 20, and notifies the receiving of the control commands to the control unit 200. Here, a number of control commands issued by the other central control device 20 can be one or plural, and in a case of issuing a plurality of control commands, the notification to the control unit 200 is made after all the control commands are received.

Figure 18:
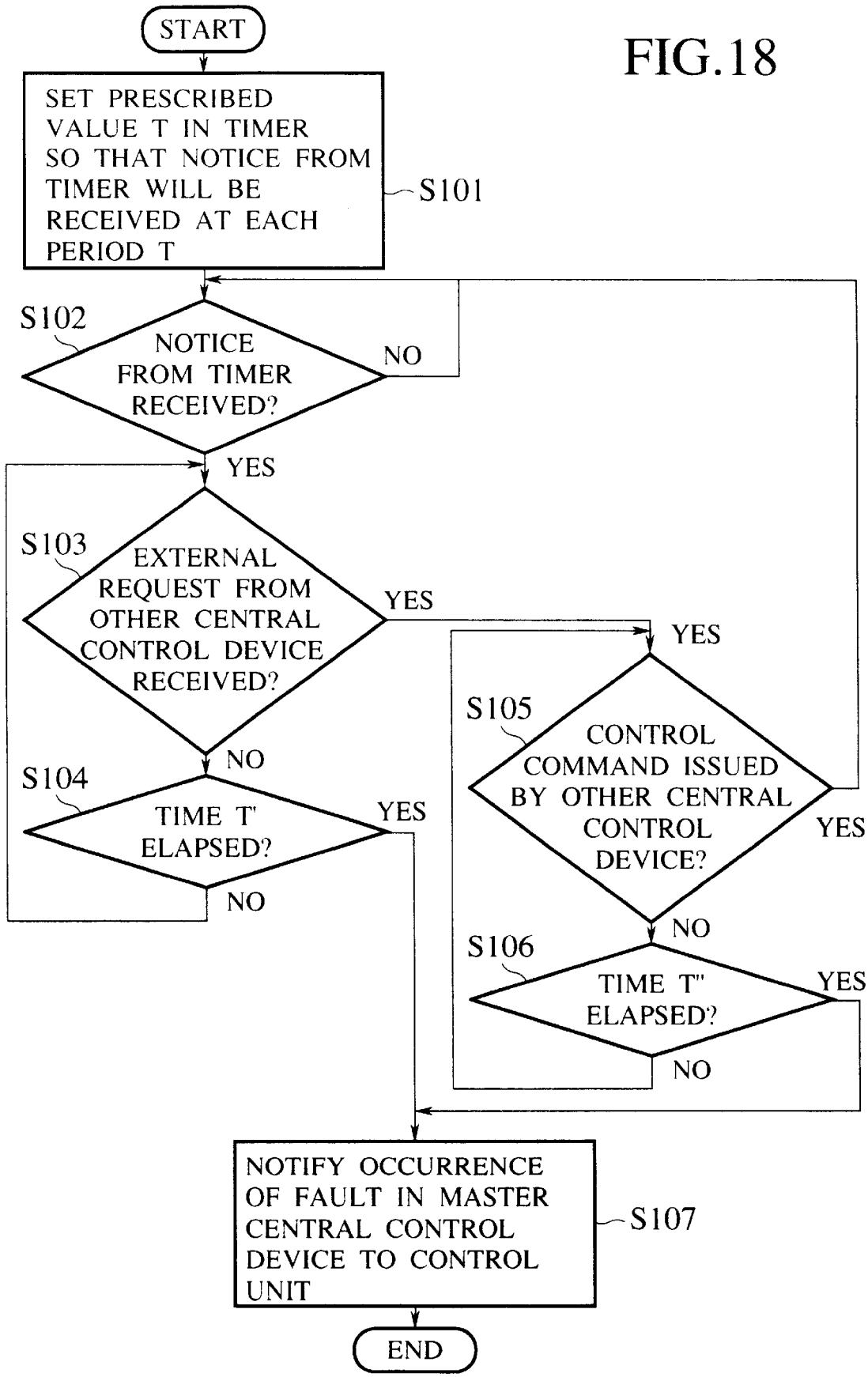
FIG. 18 is a flow chart for the operation of a fault detection unit in the central control device of FIG. 2 operating as a slave central control device according to the embodiment I-2.

The fault detection unit 208 detects a fault in the master central control device 20 by monitoring the other central control device's external request receiving unit 205 and the control command receiving unit 206. FIG. 17 shows a conceptual diagram for the operation of the fault detection unit 208, while FIG. 18 shows a flow chart for the operation of the fault detection unit 208.

The fault detection unit 208 uses the timer 207 on the central control device 20 by setting a prescribed setting time T as an initial value in the timer 207 so that a notice from the timer 207 will be received at time T later (step S101).

When a notice from the timer 207 is received and the execution of the fault detection unit 208 is started (step S102), a notice indicating the receiving of data from the other central control device's external request receiving unit 205 is awaited during a prescribed time T' (steps S103, S104). When this notice is not received during the time T' (step S104 YES), it is judged that a fault occurred in the master central control device 20, and an occurrence of the fault in the master central control device is notified to the control unit 200 (step S107).

When this notice is received during the time T' (step S103 YES), the issue of the control command by the master central control device 20 is awaited until a prescribed time T" elapses since the fault detection unit 208 is activated (steps S105, S106). When the control command is issued by the master central control device 20 during the time T" (step S105 YES), the notice from the timer 207 is awaited again (step S102). When the control command is not issued during the time T" (step S106 YES), it is judged that a fault occurred in the master central control device 20, and an occurrence of the fault in the master central control device is notified to the control unit 200 (step S107).

The time T' is set to be a time for allowing a generation of the control command before the time T", and the time T" is set to be a time for allowing a sending of the control command before a next notice from the timer 207 comes.

The control unit 200 carries out the control of the slave central control device 20 as a whole. A flow chart for the operation of the control unit 200 is the same as that shown in FIG. 10 and FIG. 11 described above.

Namely, the control unit 200 is in a waiting state until a notice indicating the receiving of the external request is received from the other central control device's external request receiving unit 205 (step S61) or a notice indicating an occurrence of a fault in the master central control device 20 is received from the fault detection unit 208 step S62).

When the external request is notified from the other central control device's external request receiving unit 205 (step S61 YES), the external request receiving unit 201 is commanded to give the external requests stored in the queue to the scheduler 202 (step S65), and the scheduler 202 is activated (step S66) to carry out the processing to determine the operation of the control devices, so as to realize the consistency with respect to the internal state of the master central control device 20.

Then, the control unit 200 is in a waiting state until a notice indicating the issue of the control command by the master central control device 20 is received from the control command receiving unit 206 (step S67) or a notice indicating an occurrence of a fault in the master central control device 20 is received from the fault detection unit 208 (step S68).

When the notice from the control command receiving unit 206 is received (step S67 YES), the operation returns to the initial waiting state (steps S61, S62).

When the notice indicating an occurrence of a fault is received (step S68 YES), the control command produced by the scheduler 202 is issued to the data memory control devices 14 and the communication control devices 16 through the control command sending unit 203 (step S69). Then, whether a notice from the control command receiving unit 206 was received or not is checked (step S70), and when this notice was not received (step S70 NO), whether a notice indicating the change of the master central control device to the other central control device was received or not is checked (step S73). When this notice was already received (step S73 NO), the operation returns to the initial waiting state (steps S61, S62) again. When this notice was not received, the change of the master central control device to this slave central control device is notified to the other central control devices 20 (step S74), and a transition to the master central control device mode is made (step S75).

When the notice from the control command receiving unit 206 was received (step S70 YES), there is a possibility for the other central control device 20 to be in a process of making a transition to the master central control device mode, so that the ID of this slave central control device is compared with the ID of the central control device 20 attached to each received control command (step S71), and if the own ID is the youngest one (step S72 YES), whether a notice indicating the change of the master central control device to the other central control device was received or not is checked (step S73). When this notice was already received (step S73 NO), the operation returns to the initial waiting state (steps S61, S62) again. When this notice was not received, the change of the master central control device to this slave central control device is notified to the other central control devices 20 (step S74), and a transition to the master central control device mode is made (step S75). When the own ID is not the youngest one (step S72 NO), the operation returns to the initial waiting state (steps S61, S62) again.

When the notice indicating an occurrence of a fault in the master central control device 20 is received from the fault detection unit 208 before the notice indicating the receiving of the external request is received from the other central control device's external request receiving unit 205 (step S62 YES), the external request receiving unit 201 is commanded to give an empty external request to the scheduler 202 (step S63), and the scheduler 202 is activated (step S64). Then, the control command produced by the scheduler 202 is issued through the control command sending unit 203 (step S69).

Thereafter, whether a notice from the control command receiving unit 206 was received or not is checked (step S70), and when this notice was not received (step S70 NO), whether a notice indicating the change of the master central control device to the other central control device was received or not is checked (step S73). When this notice was already received (step S73 NO), the operation returns to the initial waiting state (steps S61, S62) again. When this notice was not received, the change of the master central control device to this slave central control device is notified to the other central control devices 20 (step S74), and a transition to the master central control device mode is made (step S75).

When the notice from the control command receiving unit 206 was received (step S70 YES), there is a possibility for the other central control device 20 to be in a process of making a transition to the master central control device mode, so that the ID of this slave central control device is compared with the ID of the central control device 20 attached to each received control command (step S71), and if the own ID is the youngest one (step S72 YES), whether a notice indicating the change of the master central control device to the other central control device was received or not is checked (step S73). When this notice was already received (step S73 NO), the operation returns to the initial waiting state (steps S61, S62) again. When this notice was not received, the change of the master central control device to this slave central control device is notified to the other central control devices 20 (step S74), and a transition to the master central control device mode is made (step S75). When the own ID is not the youngest one (step S72 NO), the operation returns to the initial waiting state (steps S61, S62) again.

When the slave central control device 20 makes a transition to the master central control device mode, the setting is changed so that the external request will be received by this central control device, and the transition to the master central control device mode is made by executing the operation procedure shown in FIG. 16.

In this manner, only one slave central control device can be changed into the master central control device.

According to this embodiment I-2, the master central control device 20 periodically repeats the same processing as shown in FIG. 16, but the time for executing the processing to be carried out within the period is determined, and this time can be set up by providing enough margin to hand over the processing to the other slave central control device 20, while the internal state of every slave central control device 20 coincides with the internal state of the master central control device 20 within this period, so that when the fault detection unit 208 of the slave central control device 20 detects a fault in the master central control device 20, it is possible to hand over the processing to be carried out within that period by instantaneously changing one of the slave central control devices 20 into the master central control device 20, and therefore the continuity of the continuous data service can be guaranteed.

Figure 19:
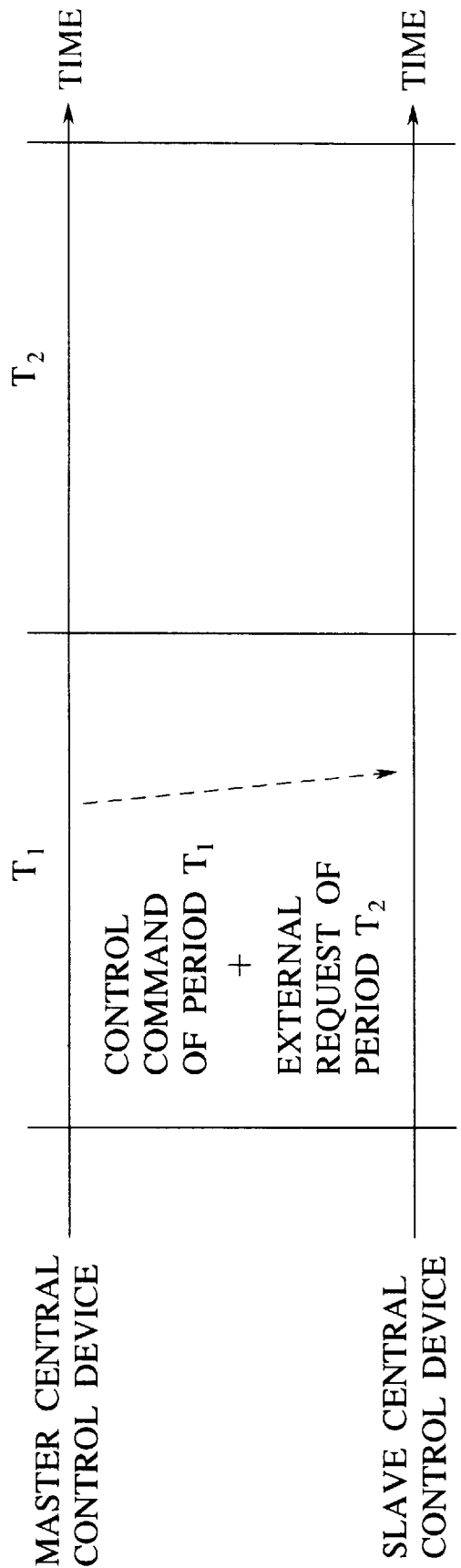
FIG. 19 is a timing diagram for modified operations by the central control devices in the continuous data server apparatus of FIG. 1 according to the embodiment I.

Note that in the embodiment I described above, the master central control device issues the received external request and the control command during the period T, but it is also possible to adopt a scheme for simultaneously sending the control command of this period and the external request to be processed at the next period, as shown in FIG. 19.

Note also that, in the embodiment I described above, both a case in which the period length is not constant and a case in which the period length is constant as shown in FIG. 7 and FIG. 17 respectively are described, but in the following embodiments, only a case in which the period length is constant as in FIG. 17 will be described. Each of the following embodiments can be easily adapted to a case in which the period length is not constant as in FIG. 7, by the similar manner as required in changing the embodiment I-2 into the embodiment I-1 described above.

Also, in the embodiment I described above, the sending of the external request, the prescribed processing, and the sending of the control command are carried out at timings within a period shown in FIG. 17, but in the following embodiments, the sending of the external request, the prescribed processing, and the sending of the control command are carried out at timings within a period shown in FIG. 20.

Namely, in the embodiment I described above, the periodical operation in a sequence of: sending/receiving of external request→prescribed processing→sending of control command→sending/receiving of external command→prescribed processing→sending of control command, and so on is segmented into periods, where each period contains a sequence of: sending/receiving of external request→prescribed processing→sending of control command. In contrast, the following embodiments will be described by segmenting the periodic operation into periods, where each period contains a sequence of: sending of control command→sending/receiving of external request→prescribed processing. Note however that a manner of segmenting the periodic operation as used in the embodiment I can be applied to any of the following embodiments, and no essential difference will be introduced by a manner of segmenting the periodic operation.

Also, in the embodiment I described above, the operations of the master central control device and the slave central control device are described separately, but in the following embodiments, the operations of the master central control device and the slave central control device will be described together.

(Embodiment II)

Now, the embodiment II of the present invention will be described in detail.

This embodiment II is directed to a case in which a transmission path connecting the central control devices is assumed to be reliable, both the external request and the control command are used for a fault detection, and the operations of the control targets in a next next period are determined by the control commands in stationary states.

In short, in this embodiment II, when a fault in the master is detected, a prescribed one of the slaves is changed into the master and issues control commands to be sent, by a next period of a period where the fault in the master is detected.

Figure 68A:
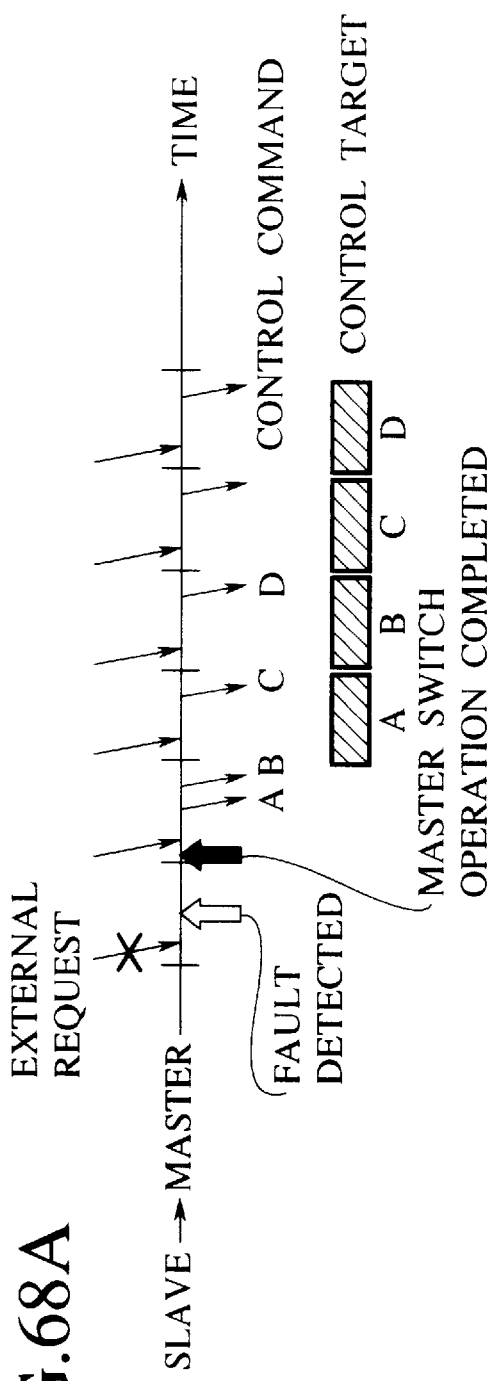
FIGS. 68A and 68B are timing charts illustrating two exemplary cases of operations in the continuous data server apparatus of FIG. 1.
Figure 68B:
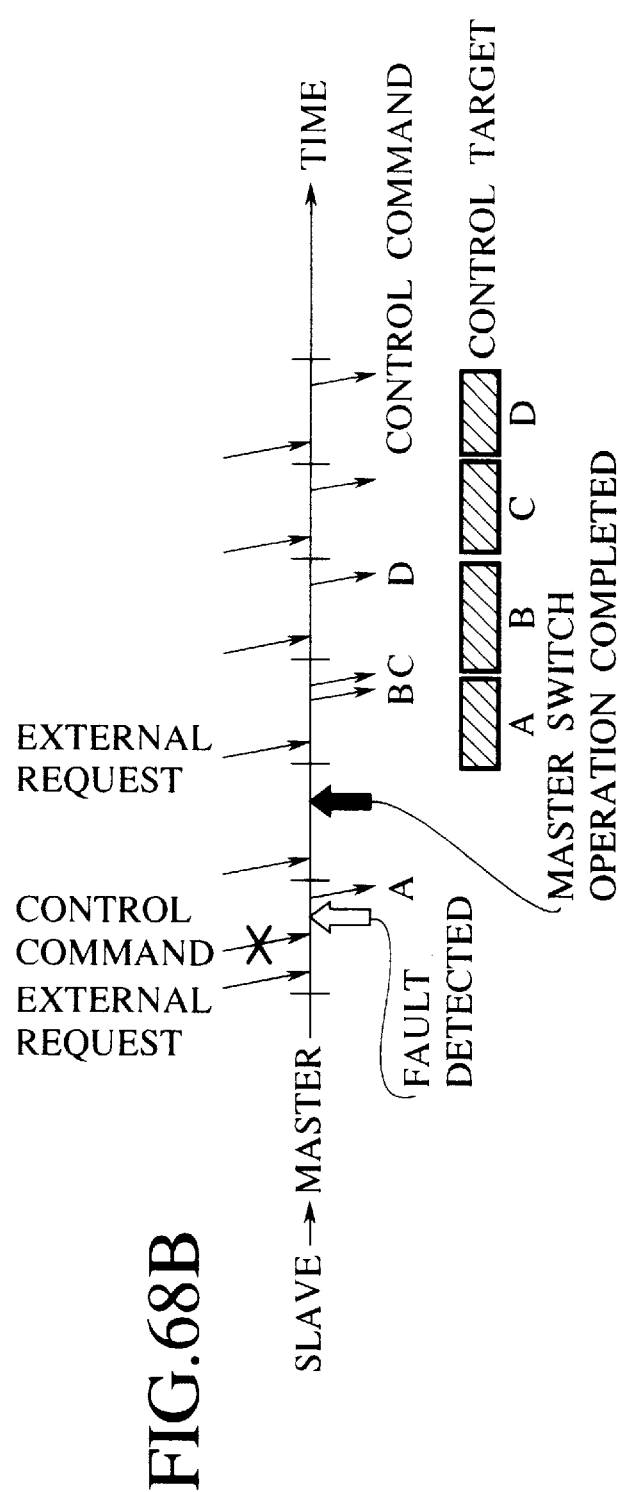
Figure 70:
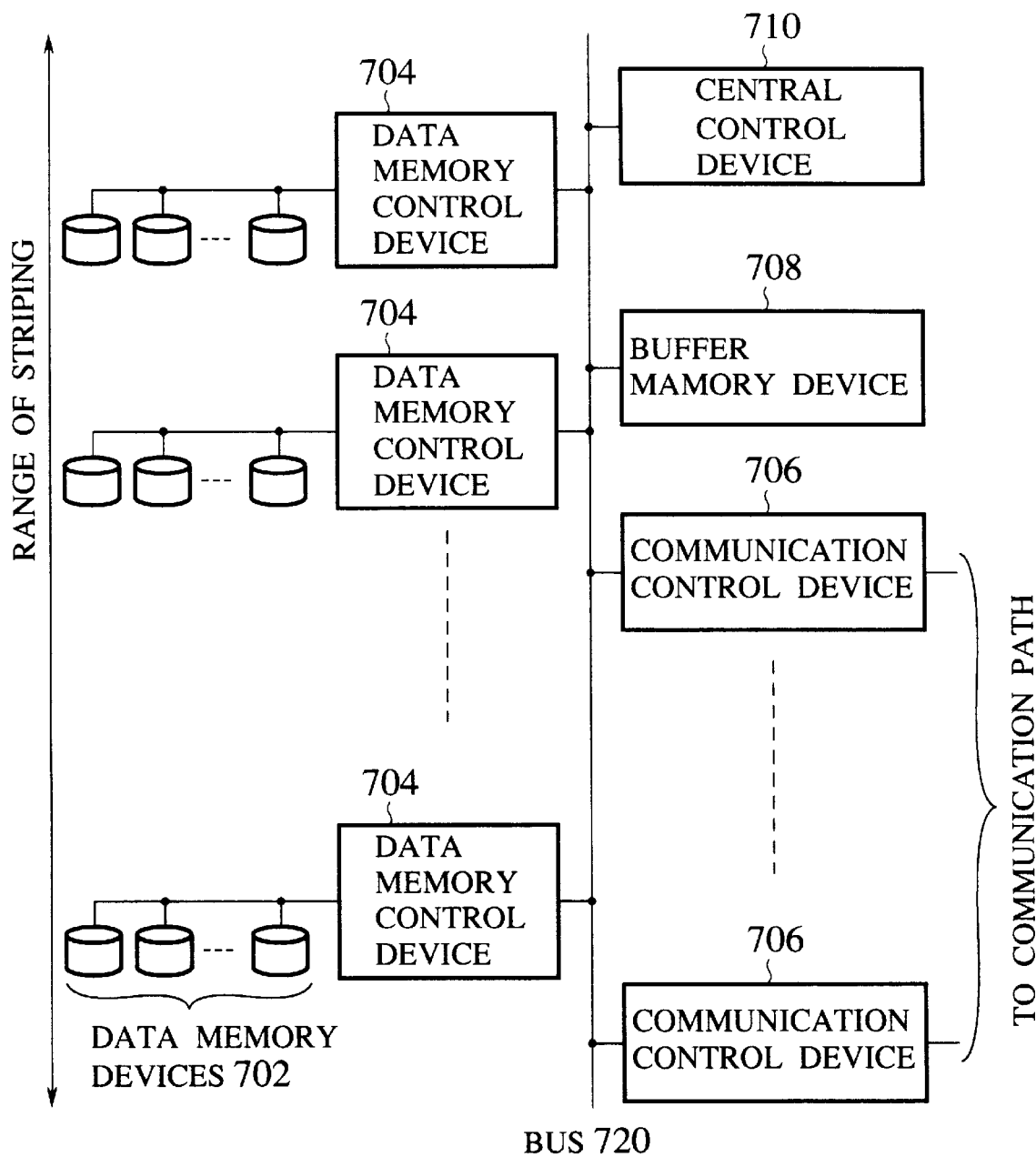
FIG. 70 is a block diagram of one example of a conventional continuous data server apparatus.

As mentioned above, in this embodiment II, the control commands in stationary states determine the operations of the control targets in a next next period (as illustrated by control commands B, C and D in FIG. 68A, control commands A, C and D in FIG. 68B, control commands C and D in FIG. 69A, and control commands A, C and D in FIG. 69B).

However, when a transition to the master central control device mode is made without receiving the external request, the control commands are transmitted to the control targets by applying a prescribed processing for a case of no external request, so that there can be a case in which this transmission takes place at a next period for a stationary transmission (as illustrated by a control command A in FIG. 68A and a control command B in FIG. 69A). Also, when a transition to the master central control device mode is made without receiving the control command, the control commands which are not yet received can be transmitted to the control targets immediately, but when the subsequent master switch operation takes a long time, there can be a case in which the control command to be issued at a next period is delayed into a next next period (as illustrated by the control command B in FIG. 68B and the control command B in FIG. 69B). According to this embodiment II, even in such cases, the control commands are transmitted for surely by an immediately preceding period of a period at which the control targets uses the transmitted control commands.

In this embodiment II, the configuration of the central control device 20 is the same as that shown in FIG. 2 described above.

Namely, the central control device 20 has: an external request receiving unit 201 for receiving requests from external; an external request sending unit 204 for sending received external requests to the other central control devices 20; other central control device's external request receiving unit 205 for receiving data from the external request sending unit 204 of the other central control device 20; a scheduler 202 for determining the control command for the data memory control device 14 regarding the reading of the continuous data from the data memory devices 12 and the control command for the communication control device 16 regarding the operation to read out the continuous data from the buffer memory device 18 and send this continuous data to the communication path; a control command sending unit 203 for sending the control commands for the data memory control devices 14 and the communication control devices 16; a control command receiving unit 206 for receiving the control commands sent from the other central control devices 20; a timer 207 for enabling the time management; a fault detection unit 208 for detecting a fault in the other central control devices 20; and a control unit 200 for controlling all these elements.

The scheduler 202 determines the operations of the data memory control devices 14 and the communication control devices which are the control targets. The requests from the external stored in the external request receiving unit 201 are input information of the scheduler 202, and the control commands for the data memory control devices 14 and the communication control devices 16 are output information of the scheduler 202. The scheduler 202 has a function to produce the control commands for two periods according to the input information. The control commands for how many periods should be produced is specified by the control unit 200, and the scheduler 202 produces the control commands for a necessary number of periods accordingly.

Figure 20:
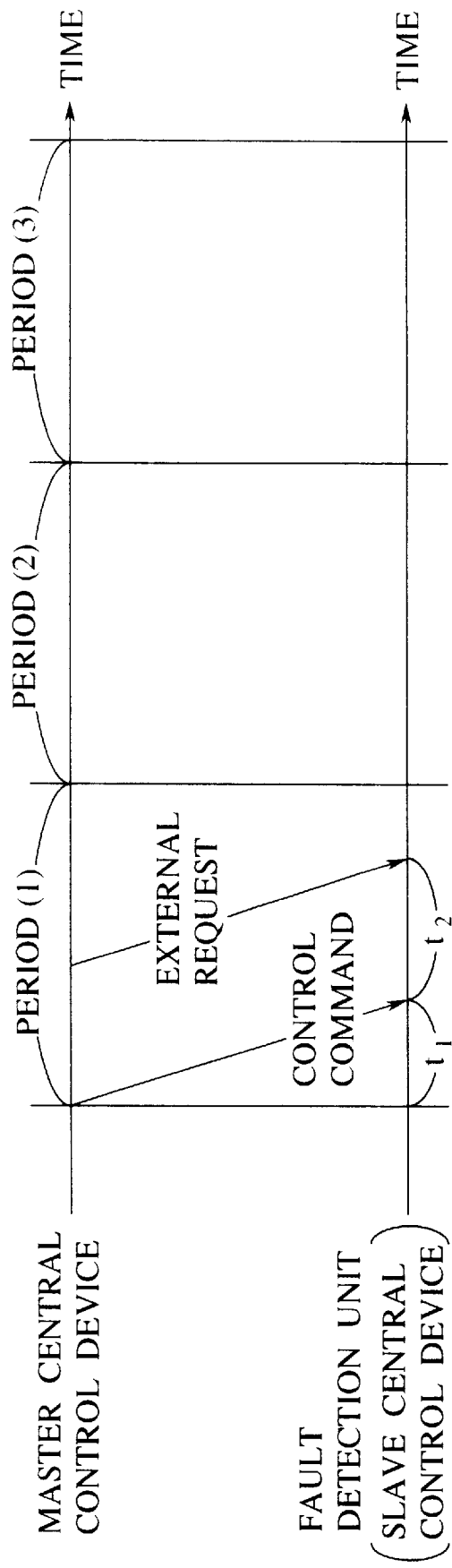
FIG. 20 is a timing diagram for the operations by the central control devices in the continuous data server apparatus of FIG. 1 according to the embodiments II to VII.
Figure 22:
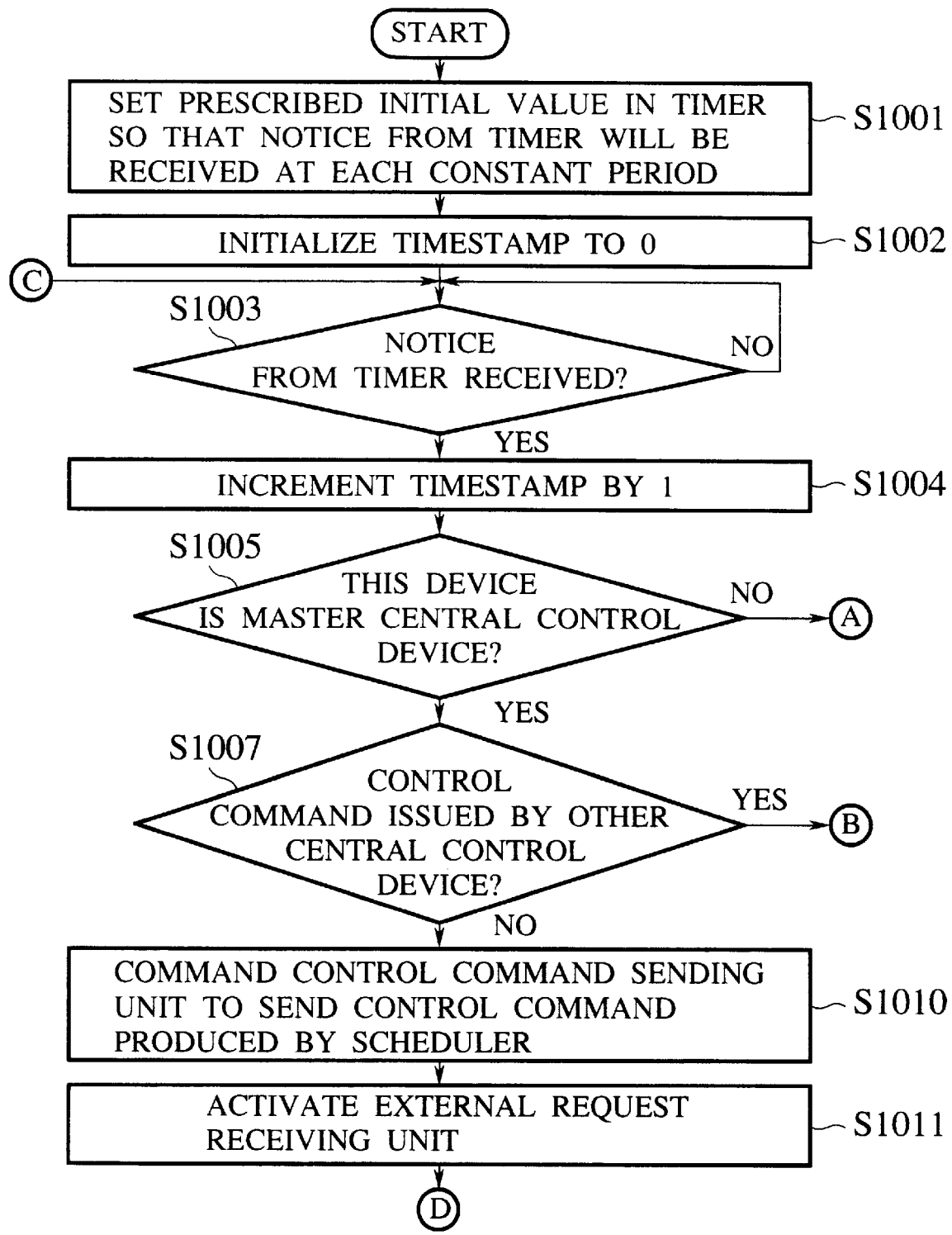
Figure 23:
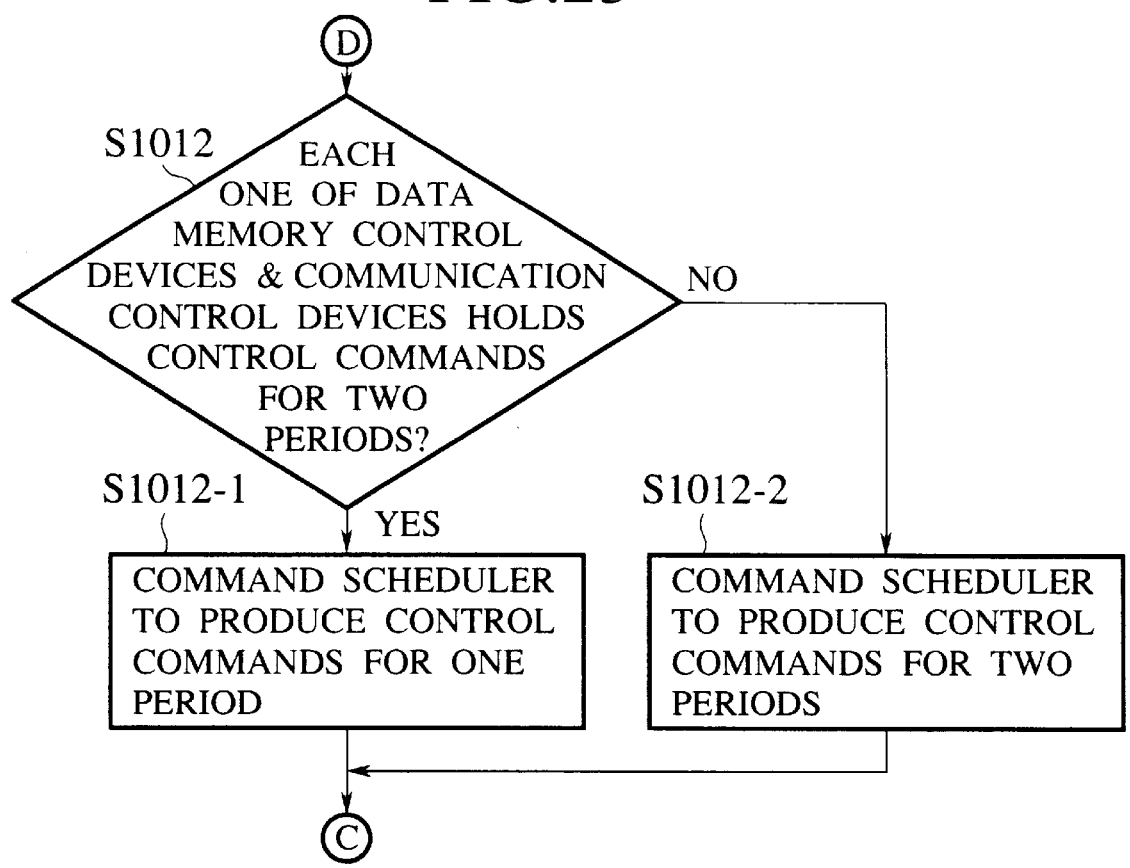
Figure 24:
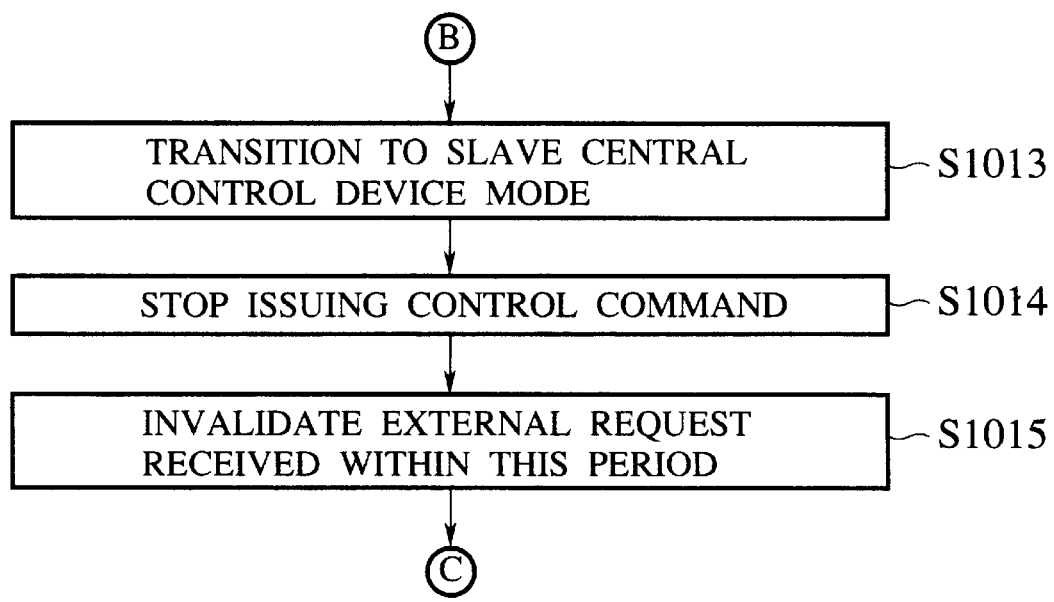
Figure 25:
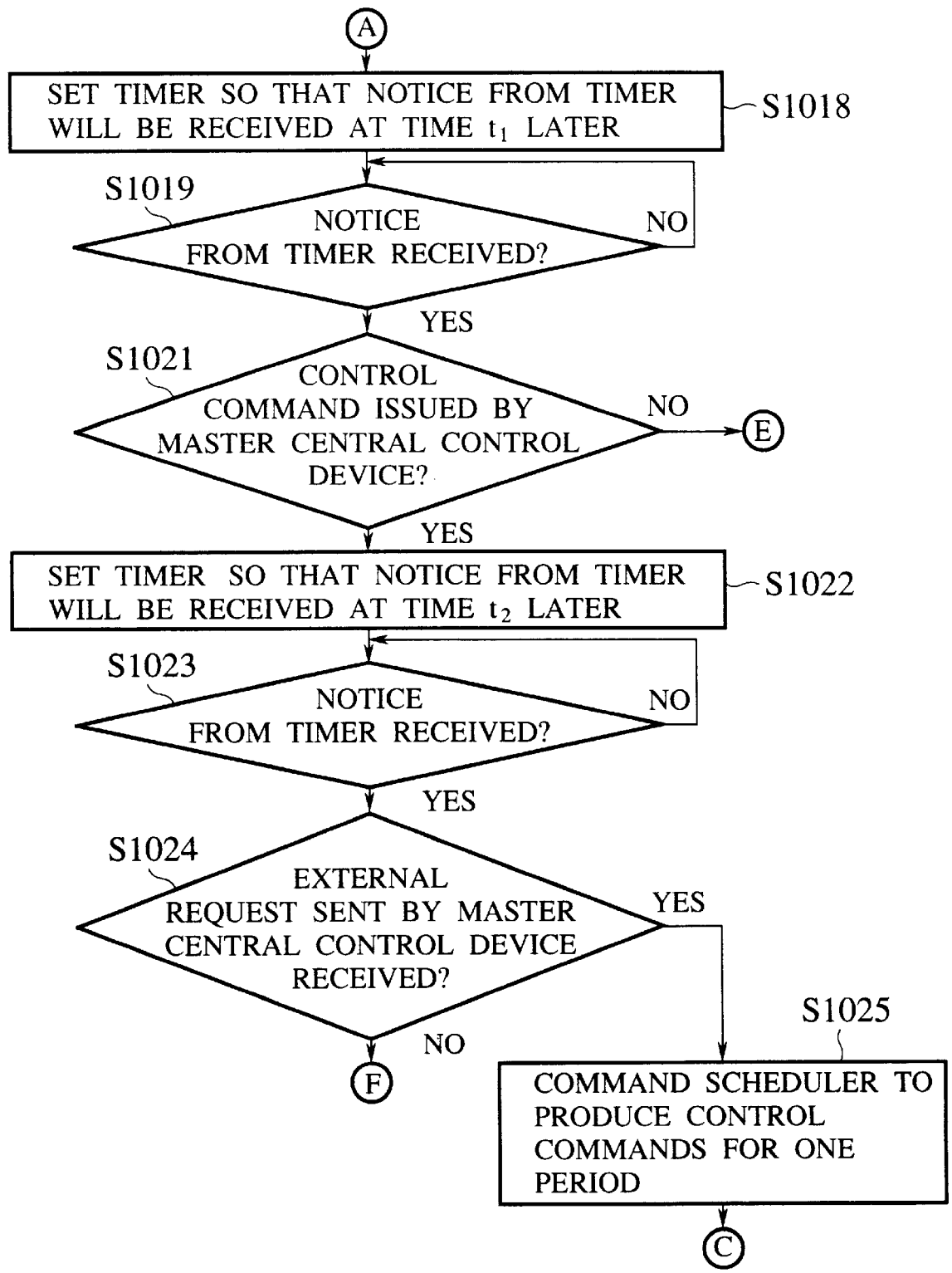
Figure 28:
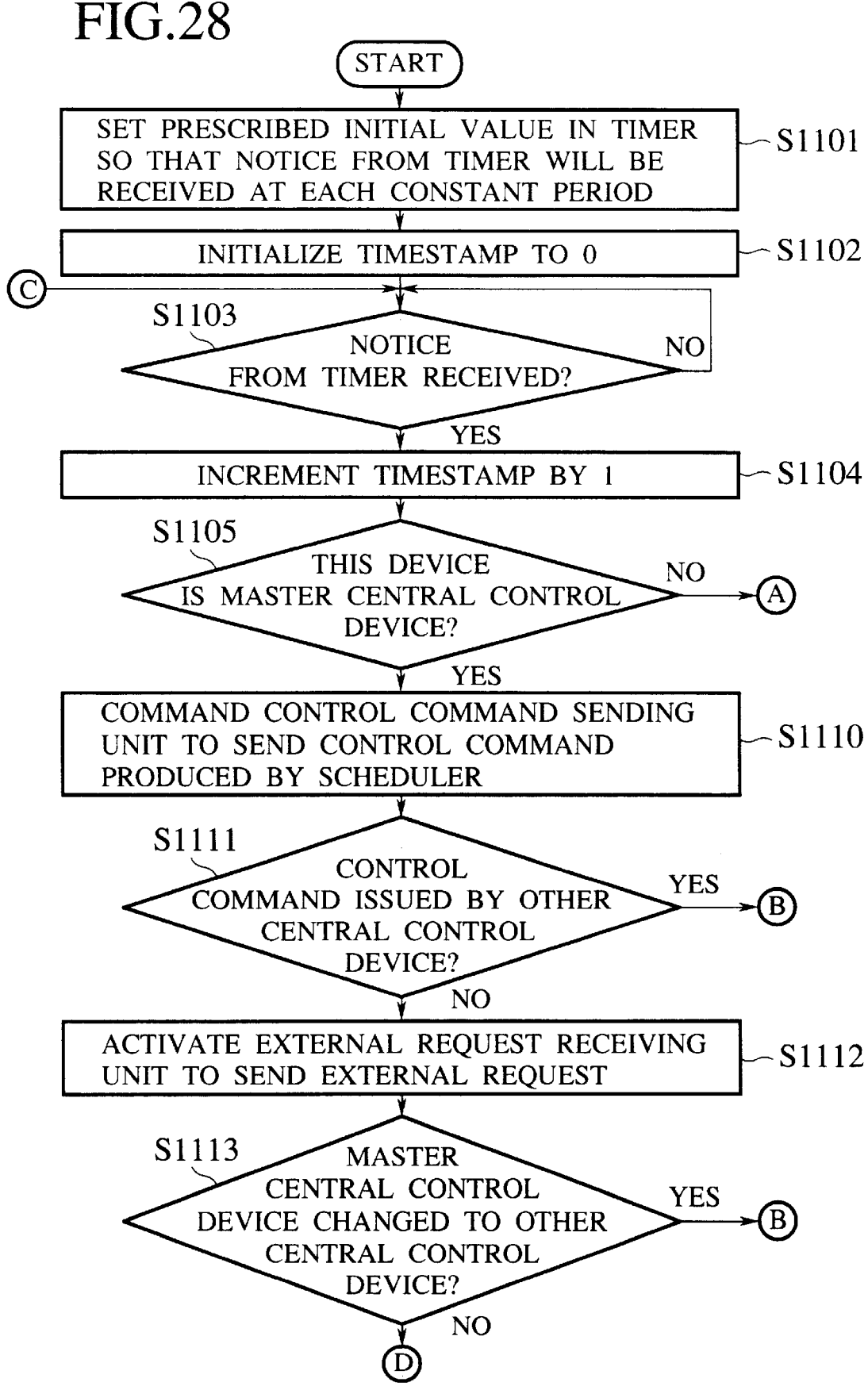
FIG. 28 to FIG. 34 are a flow chart for the operations of a master central control device and slave central control devices in the continuous data server apparatus of FIG. 1 according to the embodiment III.
Figure 29:
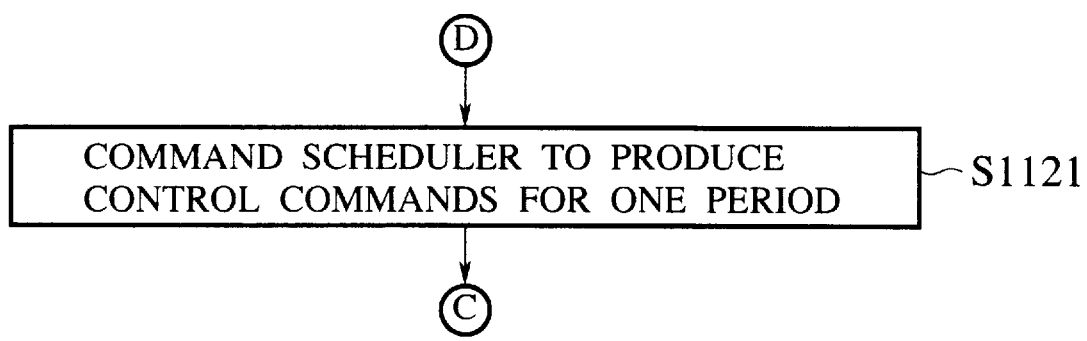
Figure 30:
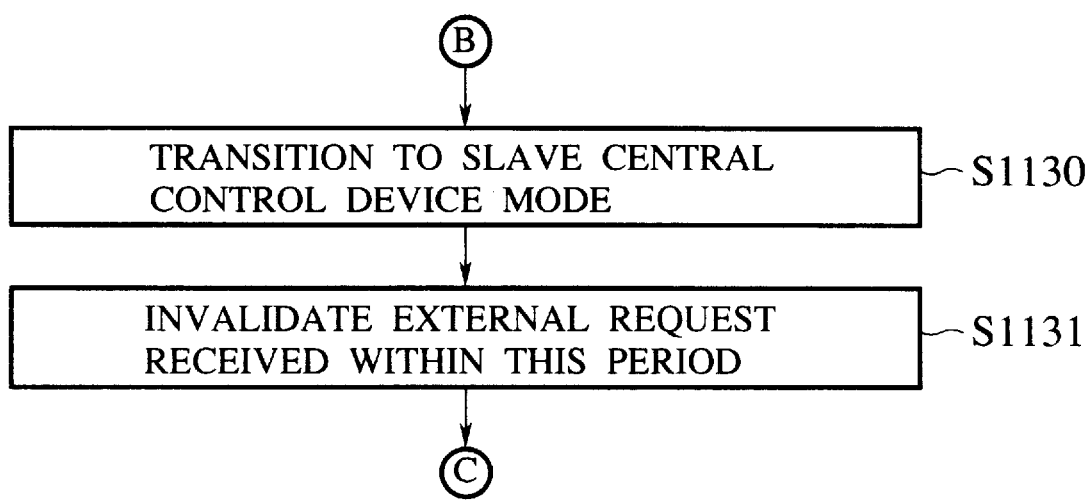
Figure 31:
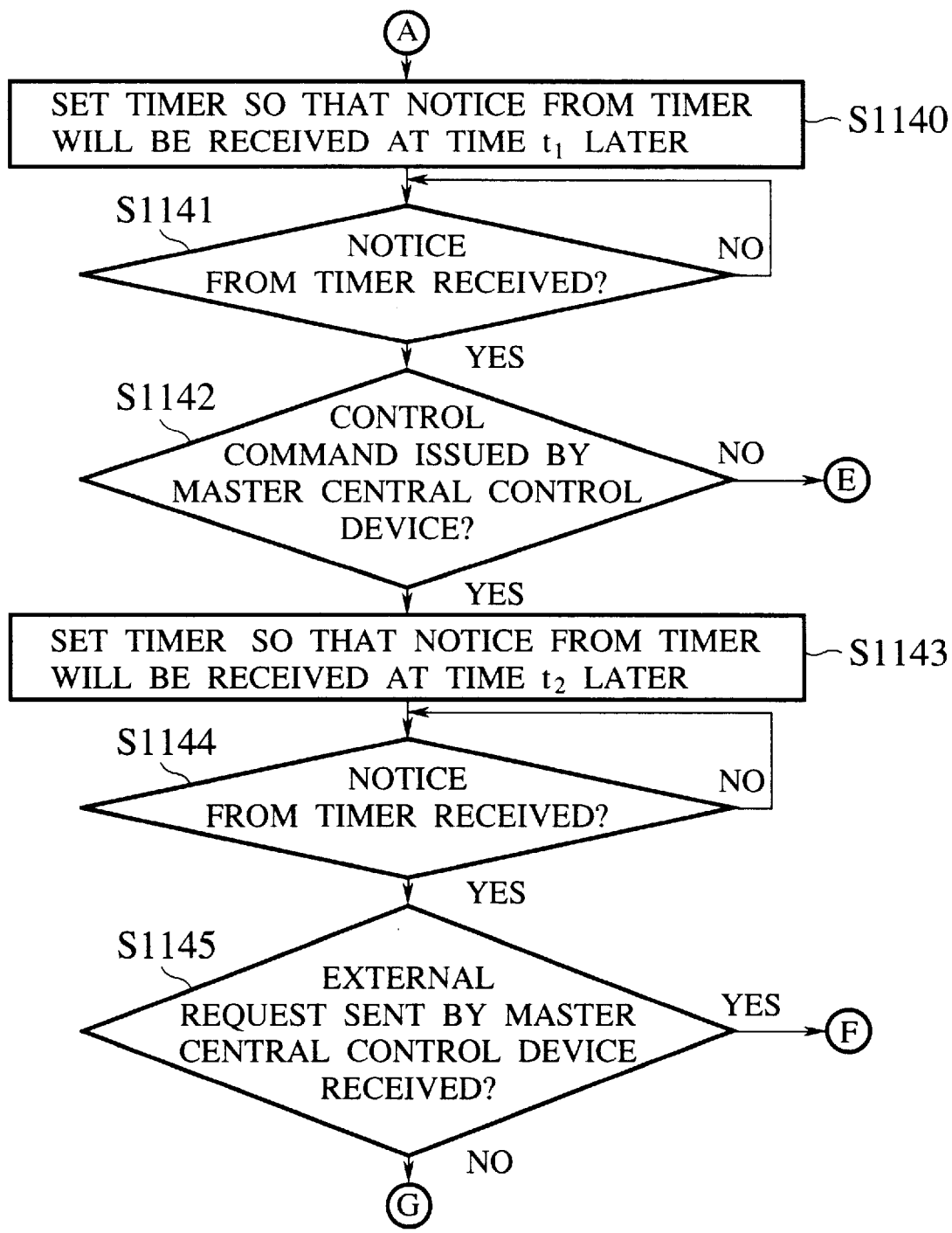
Figure 32:
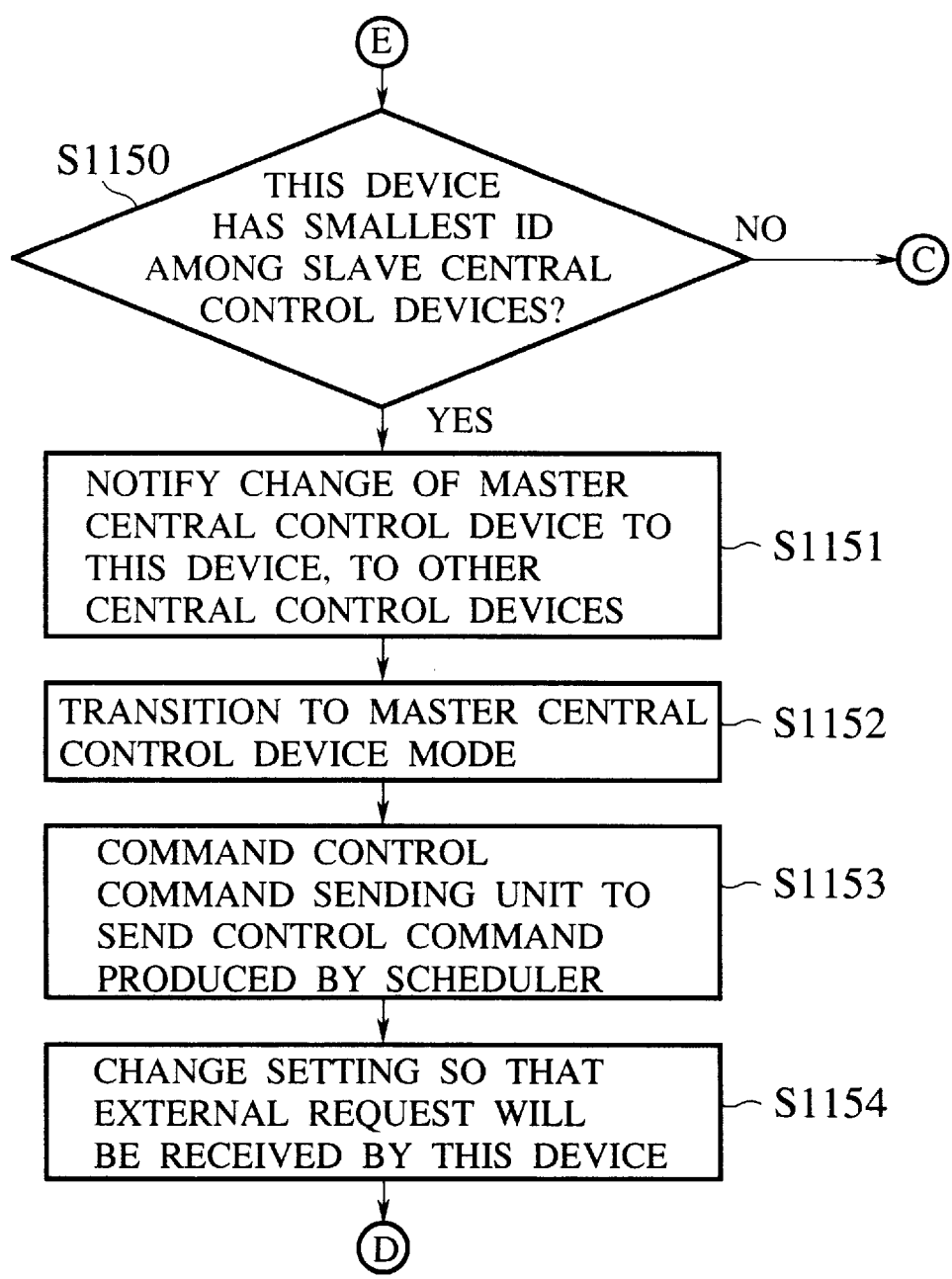
Figure 33:
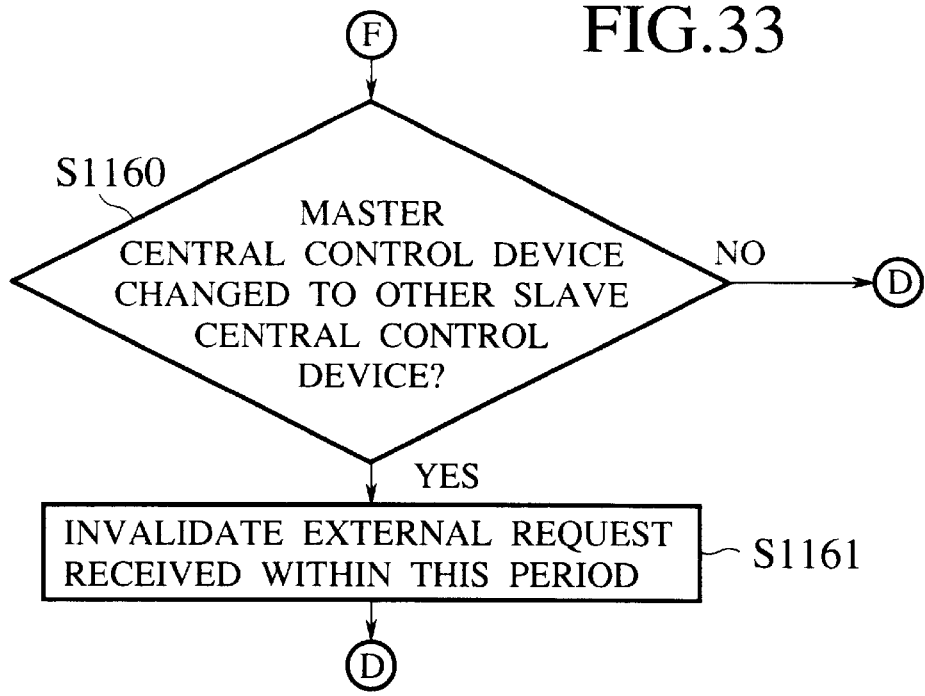
Figure 34:
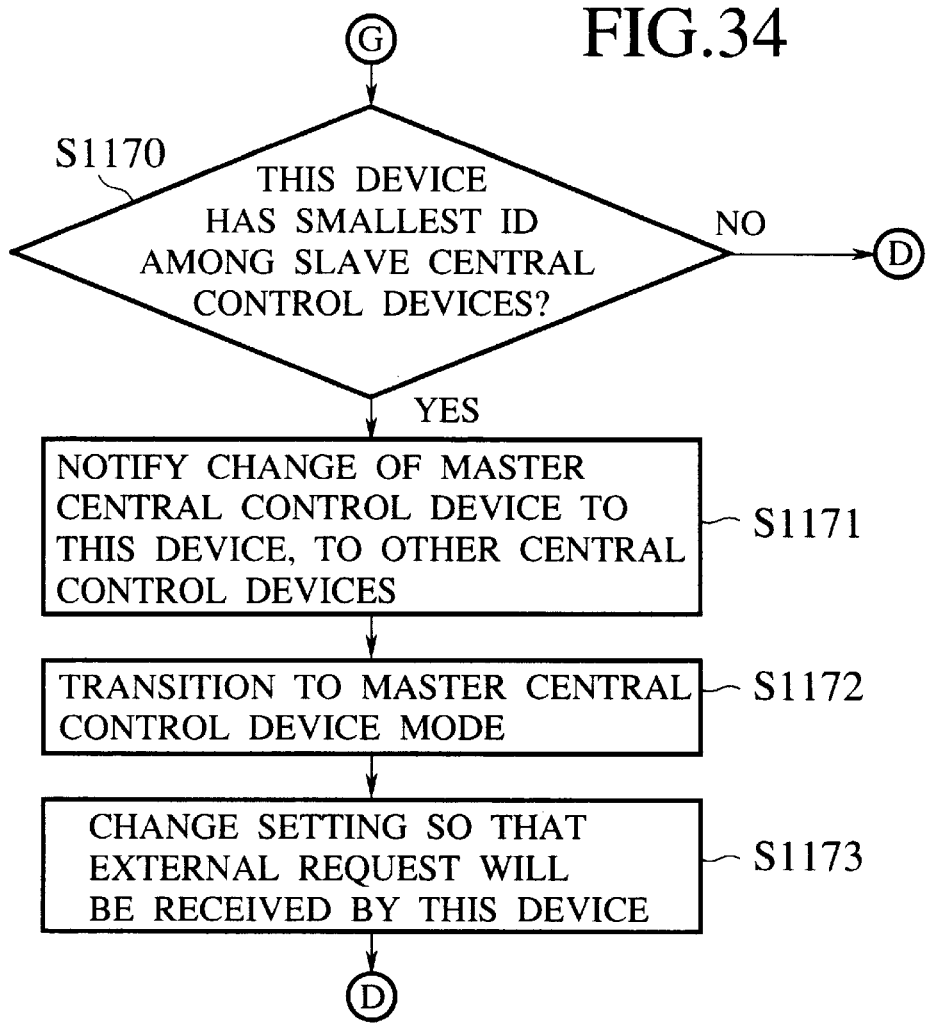
Figure 35:
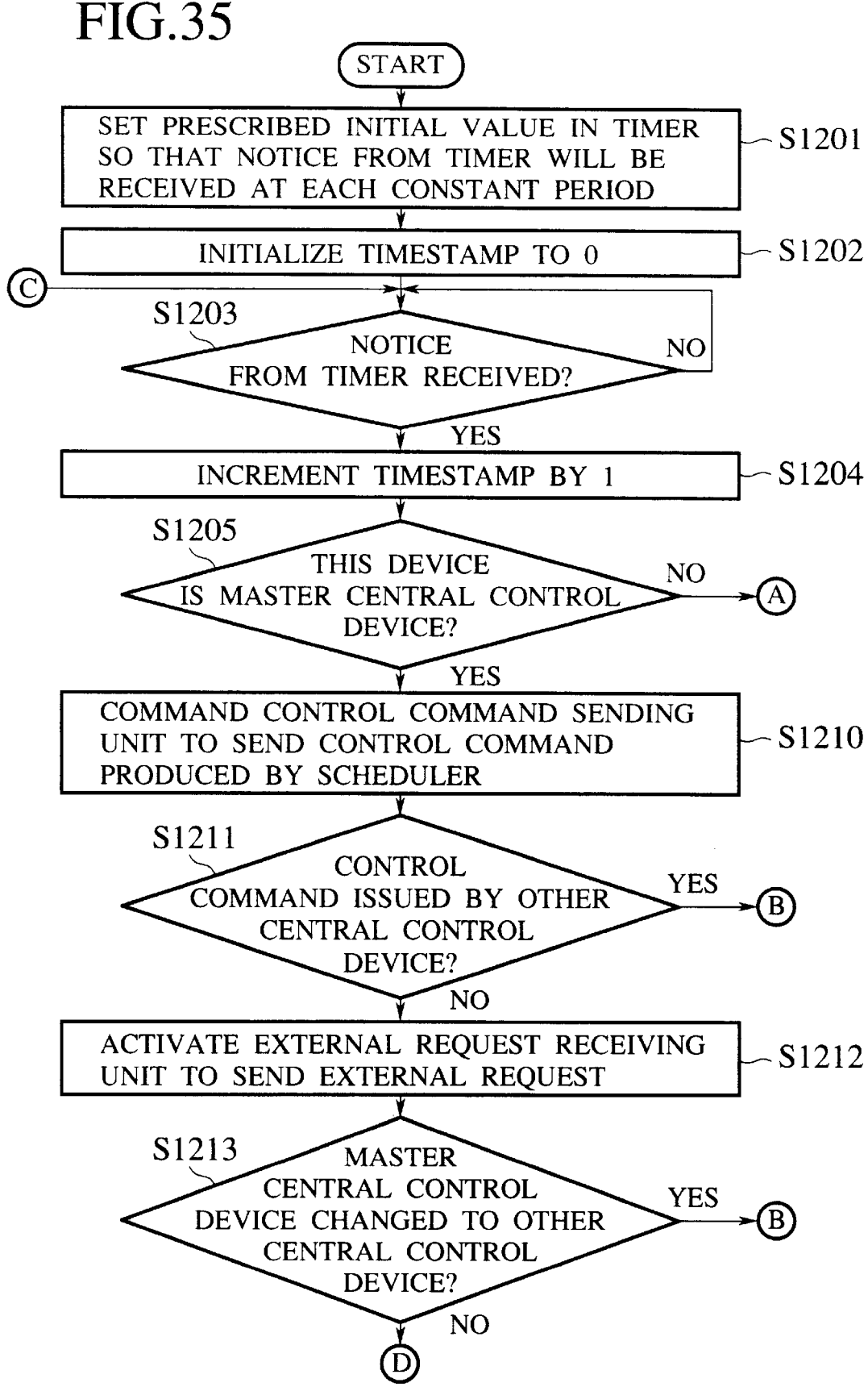
FIG. 35 to FIG. 41 are a flow chart for the operations of a master central control device and slave central control devices in the continuous data server apparatus of FIG. 1 according to the embodiment IV.
Figure 36:
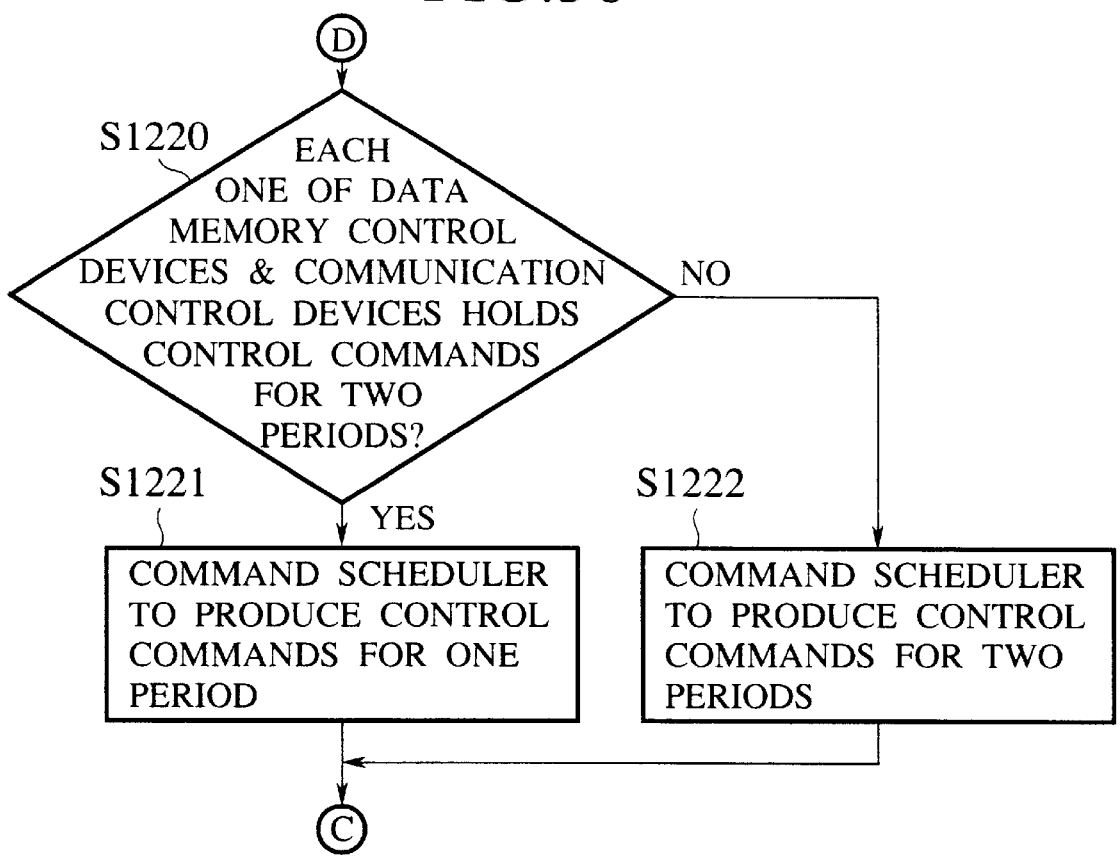
Figure 37:
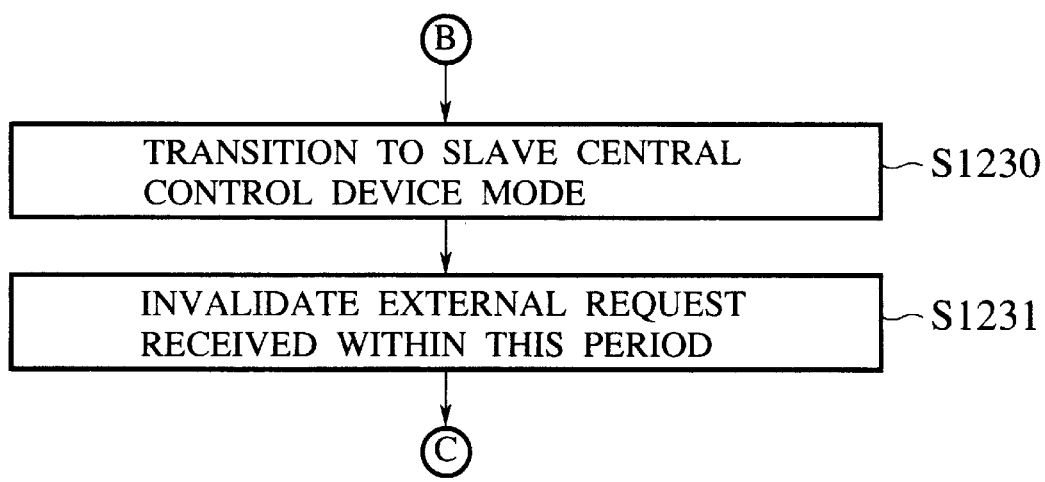
Figure 38:
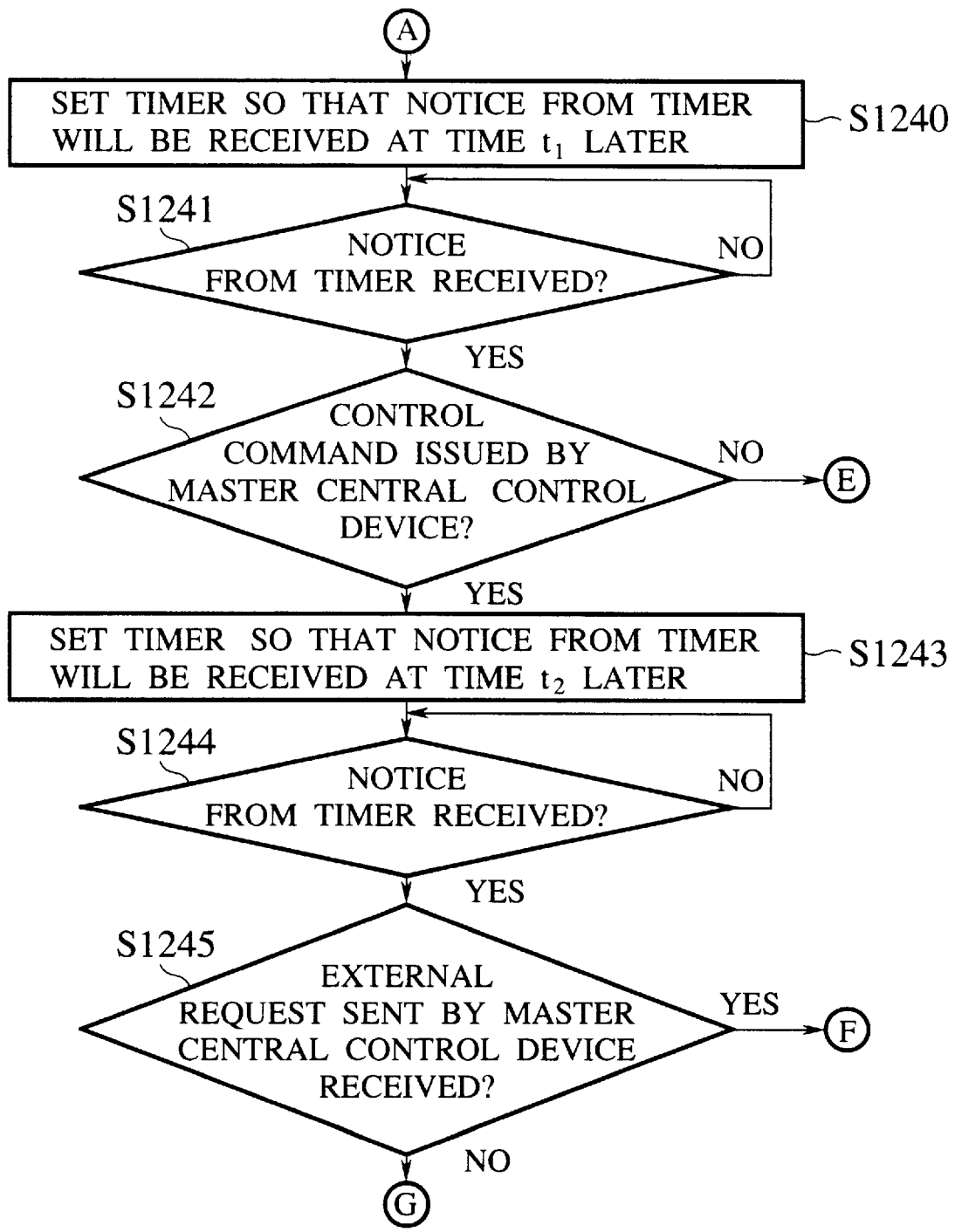
Figure 39:
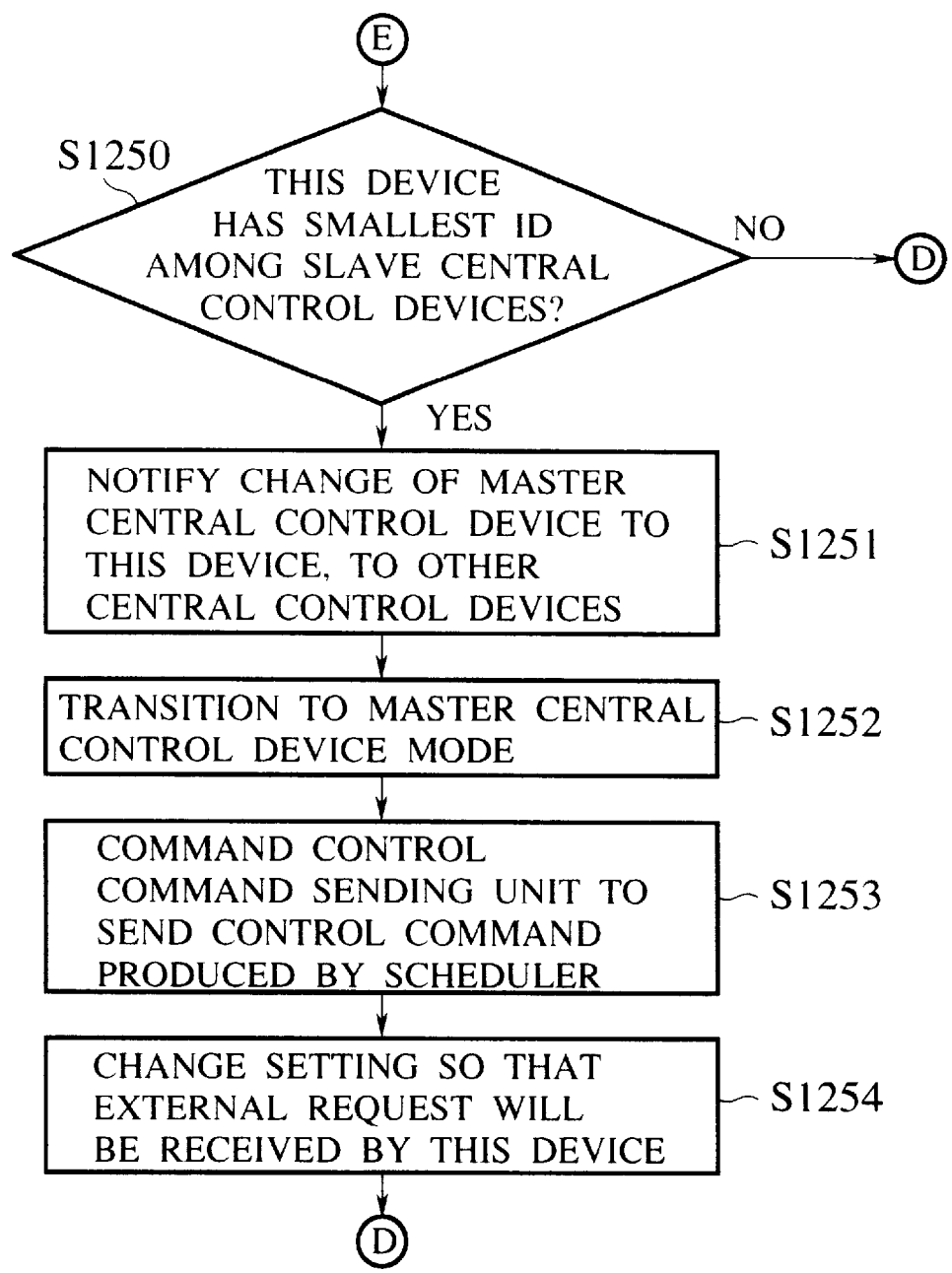
Figure 40:
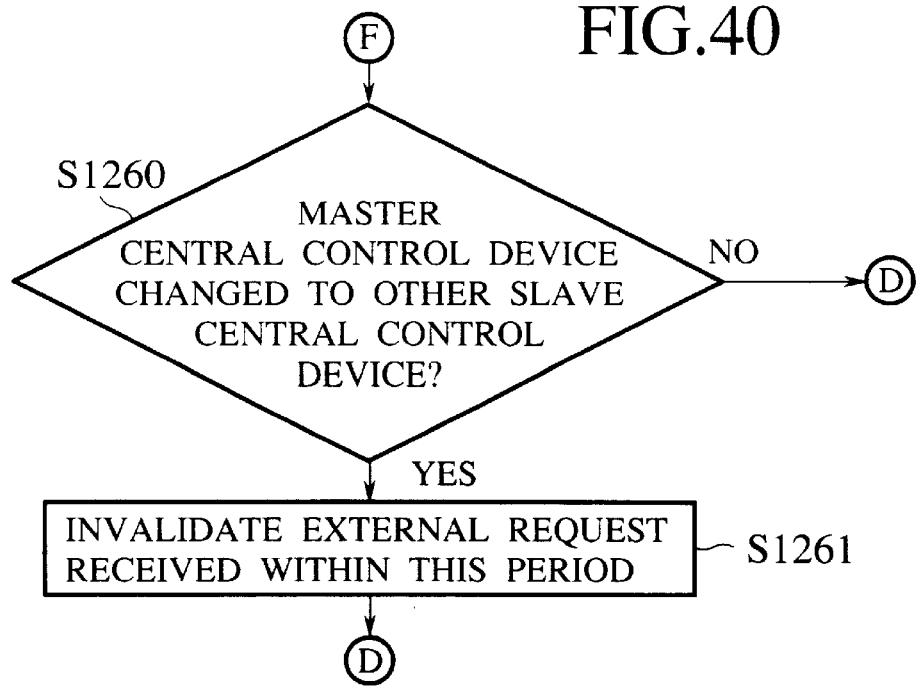
Figure 41:
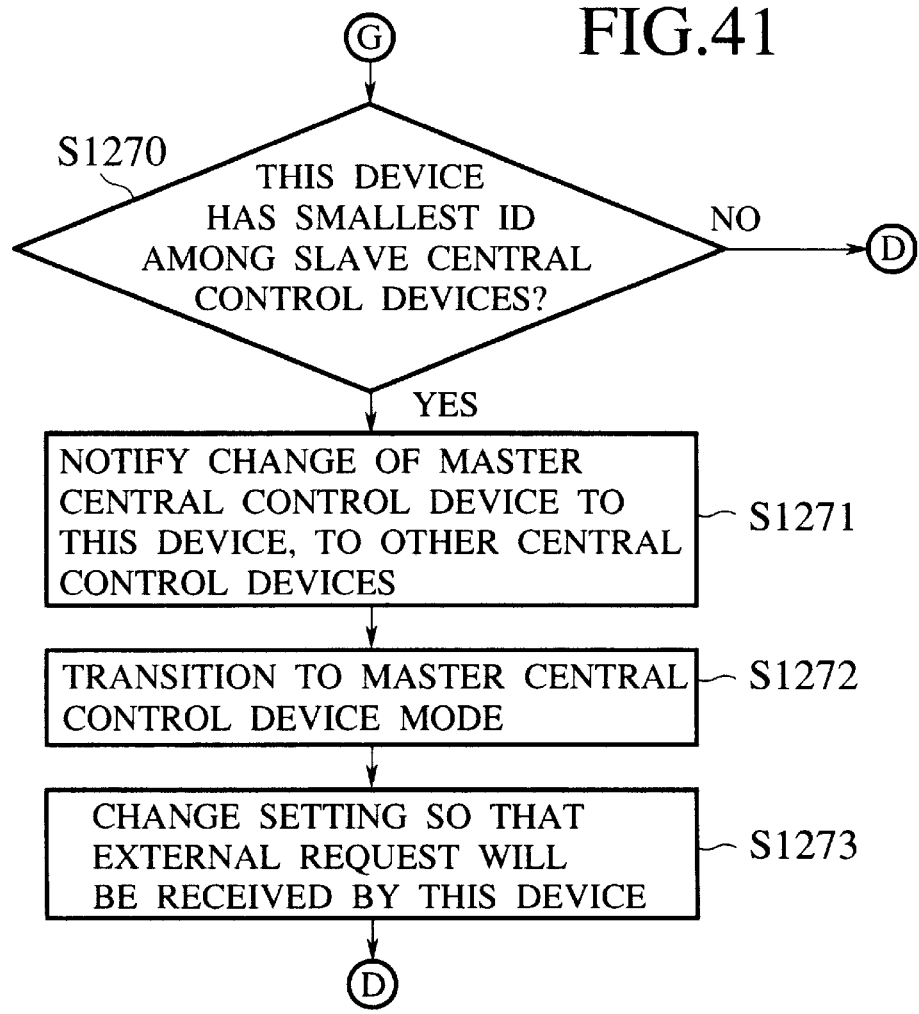

FIG. 20 shows timings at which the control commands produced by the scheduler 202 are used by the data memory control devices 14 and the communication control devices 16. In the embodiment II, when the control commands for one period are produced at a period 1, these control commands are used at a period 3, and when the control commands for two periods are produced at a period 1, these control commands are used at a period 2 and a period 3.

The control command sending unit 203 sends the control commands produced by the scheduler 202 for the data memory control devices 14 and the communication control devices 16 which are the control targets according to the command from the control unit 200. FIG. 21 shows an exemplary format for the control commands. Each control target executes the control command received at a period indicated by "period for using control commands". This is because, at a time of activation and at a time of fault occurrence, there are cases in which the output information for determining the operations at a next period and the output information for determining the operations at a next next period are transmitted within the same period. The control target can recognize a period for using the transmitted output information according to the information of "period for using control commands".

For a plurality of central control devices 20, unique IDs are assigned in advance, so that they can be distinguished from each other. Also, among these plurality of central control devices 20, one is operated as the master central control device 20 while the remaining ones are operated as the slave central control devices 20.

Time used in the central control devices 20 are synchronized in advance. This synchronization of time can be realized by utilizing the NTP protocol, or by providing a common clock to be referred by all the central control devices 20, for example.

The control commands for the data memory control devices 14 and the communication control devices 16 are issued only by the master central control device the 20, and the slave central control devices 20 are kept in a hot standby state. When the receiving of the external requests becomes impossible or the sending of the control commands to the data memory control devices 14 and the communication control devices 16 becomes impossible for some reason such as a fault in the master central control device 20, the operation is continued by changing one of the slave central control devices 20 into the master central control device 20.

A detection of a fault in the master central control device 20 is carried out by the slave central control device 20. Here, when the slave central control device 20 cannot receive the external requests or the control commands which are supposed to be sent from the master central control device 20, it is judged that a fault occurred in the master central control device 20. When it is judged that a fault occurred in the master central control device 20, one of the slave central control devices 20 takes over the role of the master central control device 20 by start receiving the external requests and issuing the control commands for the data memory control devices 14 and the communication control devices 16.

Next, the operation of the master central control device 20 in this embodiment II will be described.

The external request receiving unit 201 has a queue for storing received requests, and continually receives requests from external and stored the received external requests in the queue, independently from the other parts of the master central control device 20. The external requests stored in the queue are sent to the other slave central control devices 20 and given to the scheduler 202 according to a command from the control unit 200.

The external request sending unit 204 sends the external requests stored in the queue of the external request receiving unit 201 to all the other slave central control devices 20 along with a uniquely defined ID. FIG. 5 shows an exemplary format for the external requests. Note that, when there is no external request received in one period, an empty external request is sent. Here, the sending of the external requests can be carried out for each slave central control device 20 separately, or for all the slave central control devices 20 at once by using the broadcast function of UDP, for example.

The control command receiving unit 206 receives the control commands issued by the other central control devices 20, and notifies the receiving of the control commands to the control unit 200. Here, a number of control commands issued by one operation determination processing by the scheduler 202 can be one or plural, and in a case of issuing a plurality of control commands, the notification to the control unit 200 is made after all the control commands are received.

The timer 207 sends a notice to the control unit 200 by means such as an interruption when a prescribed time is reached, so as to start the operation of the central control device 20. A setting of a time in the timer 207 is carried out by the control unit 200.

The control unit 200 carries out the control of the master central control device 20 as a whole.

Next, the operation of the slave central control device 20 will be described. Here, the configuration of the slave central control device 20 is obviously identical to that of the master central control device 20.

The timer 207 sends a notice to the fault detection unit 208 by means such as an interruption when a prescribed time is reached, so as to activate the fault detection unit 208. A setting of an activation time of the fault detection unit 208 in the timer 207 is carried out by the control unit 200.

The external request receiving unit 201 gives the external requests piled in the queue to the scheduler 202 according to a command from the control unit 200 similarly as in a case of the master central control device 20, but the sending of the external requests to the other central control devices 20 is not carried out.

The other central control device's external request receiving unit 205 receives the external request sent from the master central control device 20, and stores this external request in the queue of the external request receiving unit 201, while notifying the received time to the fault detection unit 208.

The control command receiving unit 206 monitors the control command for the data memory control devices 14 and the communication control device 16 sent by the master central control device 20, and after confirming the sending of the control command from the master central control device 20, notifies the issue of the control command to the fault detection unit 208.

The fault detection unit 208 monitors the other central control device's external request receiving unit 205 and the control command receiving unit 206, and in response to an inquiry from the control unit 200, returns an information as to whether the external request and control commands are received or not.

The control unit 200 carries out the control of the slave central control device 20 as a whole.

FIG. 22 to FIG. 27 show flow charts for the operations of the master central control device 20 and the slave central control devices 20.

A prescribed initial value is set in the timer 207 so that a notice from the timer 207 will be received at each constant period (step S1001), and the timestamp is initialized to 0 (step S1002). Then, whether a notice from the timer 207 is received or not is checked (step S1003), and a value of the timestamp is incremented by 1 when a notice from the timer 207 is received (step S1004).

Next, whether this central control device is the master central control device or not is checked (step S1005) and when it is the master central control device (step S1005 YES), whether the control command is issued by the other slave central control device or not is checked (step S1007). When the control command is not issued by the other slave central control device (step S1007 NO), the control command sending unit 203 is commanded to send the control command produced by the scheduler 202 (step S1010), and the external request receiving unit 201 is activated (step S1011). When each one of the data memory control devices 14 and the communication control devices 16 already holds the control commands for two periods (step S1012 YES), the scheduler 202 is commanded to produce the control commands to be executed at a next next period (step S1012-1), whereas otherwise (step S1012 NO) the scheduler 202 is commanded to produce the control commands to be executed at a next period and the control commands to be executed at a next next period (step S1012-2), and the operation returns to the step S1003.

When the control command is issued by the other slave central control device (step S1007 YES), a transition to the slave central control device mode is made by this central control device (step S1013), and the issuing of the control command is stopped (step S1014). Then, the external request received within this period is invalidated (step S1015), and the operation returns to the step S1003.

When this central control device is the slave central control device (step S1005 NO), the timer 207 is set so that a notice from the timer 207 will be received at a time t1 later (step S1018). Then whether a notice from the timer 207 is received or not is checked (step S1019), and when a notice from the timer 207 is received, whether the control command is issued by the master central control device or not is checked (step S1021). When the control command is issued by the master central control device (step S1021 YES), the timer 207 is set so that a notice from the timer 207 will be received at time t2 later (step S1022). Then whether a notice from the timer 207 is received or not is checked (step S1023), and when a notice from the timer 207 is received, whether the external request is received from the master central control device or not is checked (step S1024). When the external request is received (step S1024 YES), the scheduler 202 is commanded to produce the control commands to be executed at a next next period (step S1025), and the operation returns to the step 1003.

When the control command is not issued by the master central control device (step S1021 NO), it is judged that a fault occurred in the master central control device, and whether this central control device has the smallest ID among the slave central control devices or not is checked (step S1031). When this central control device has the smallest ID (step S1031 YES), a transition to the master central control device mode is made by this central control device (step S1032-1), and the control command is issued (step S1032-2). Then, the setting is changed so that the external request will be received by this central control device (step S1033), and the operation returns to the step S1003. When this central control device does not have the smallest ID (step S1031 NO), the operation returns to the step S1003.

When the external request is not received from the master central control device (step S1024 NO), it is judged that a fault occurred in the master central control device, and whether this central control device has the smallest ID among the slave central control devices or not is checked (step S1040). When this central control device has the smallest ID (step S1040 YES), a transition to the master central control device mode is made by this central control device (step S1041). Then, the setting is changed so that the external request will be received by this central control device (step S1042), and the operation returns to the step S1033. When this central control device does not have the smallest ID (step S1040 NO), the operation returns to the step S1003.

In this manner, only one slave central control device can be changed into the master central control device when a fault occurs in the master central control device 20.

According to this embodiment II, the master central control device 20 periodically repeats the prescribed processing starting from the step S1003 and returning to the step S1003 in the flow charts of FIG. 22 to FIG. 27, but the internal state of every slave central control device 20 coincides with the internal state of the master central control device 20 within this period, so that when the fault detection unit 208 of the slave central control device 20 detects a fault in the master central control device 20, it is possible to hand over the processing to be carried out within that period by changing one of the slave central control devices 20 into the master central control device 20.

In addition, the scheduler of the central control device has a function for issuing the control commands for two consecutive periods with respect to the data memory control devices and the communication control devices, and the control commands are issued so that each one of the data memory control devices and the communication control devices holds the control commands for two periods. Consequently, in this embodiment II, even though the change of the master central control device takes place at a next period of the period at which the fault occurred in the master central control device, as the data memory control devices and the communication control devices can continue their operations by using the control commands held therein, and therefore the continuity of the continuous data service can be guaranteed.

(Embodiment III)

Now, the embodiment III of the present invention will be described in detail.

This embodiment III is directed to a modification of the embodiment I described above, in which a reliability of a transmission path is not guaranteed and a possibility for an occurrence or an error in transmission is assumed and dealt with.

In this embodiment III, the configuration of the central control device 20 is the same as that shown in FIG. 2 described above.

Namely, the central control device 20 has: an external request receiving unit 201 for receiving requests from external; an external request sending unit 204 for sending received external requests to the other central control devices 20; other central control device's external request receiving unit 205 for receiving data from the external request sending unit 204 of the other central control device 20; a scheduler 202 for determining the control command for the data memory control device 14 regarding the reading of the continuous data from the data memory devices 12 and the control command for the communication control device 16 regarding the operation to read out the continuous data from the buffer memory device 18 and send this continuous data to the communication path; a control command sending unit 203 for sending the control commands for the data memory control devices 14 and the communication control devices 16; a control command receiving unit 206 for receiving the control commands sent from the other central control devices 20; a timer 207 for enabling the time management; a fault detection unit 208 for detecting a fault in the other central control devices 20; and a control unit 200 for controlling all these elements.

The scheduler 202 determines the operations of the data memory control devices 14 and the communication control devices which are the control targets. The requests from the external stored in the external request receiving unit 201 are input information of the scheduler 202, and the control commands for the data memory control devices 14 and the communication control devices 16 are output information of the scheduler 202.

FIG. 20 shows timings at which the control commands produced by the scheduler 202 are used by the data memory control devices 14 and the communication control devices 16. In the embodiment III, the control commands produced at a period 1 are used at a period 2.

The control command sending unit 203 sends the control commands produced by the scheduler 202 for the data memory control devices 14 and the communication control devices 16 which are the control targets according to the command from the control unit 200. FIG. 6 shows an exemplary format for the control commands.

For a plurality of central control devices 20, unique IDs are assigned in advance, so that they can be distinguished from each other. Also, among these plurality of central control devices 20, one is operated as the master central control device 20 while the remaining ones are operated as the slave central control devices 20.

Time used in the central control devices 20 are synchronized in advance. This synchronization of time can be realized by utilizing the NTP protocol, or by providing a common clock to be referred by all the central control devices 20, for example.

The control commands for the data memory control devices 14 and the communication control devices 16 are issued only by the master central control device 20, and the slave central control devices 20 are kept in a hot standby state. When the receiving of the external requests becomes impossible or the sending of the control commands to the data memory control devices 14 and the communication control devices 16 becomes impossible for some reason such as a fault in the master central control device 20, the operation is continued by changing one of the slave central control devices 20 into the master central control device 20.

A detection of a fault in the master central control device 20 is carried out by the slave central control device 20. Here, when the slave central control device 20 cannot receive the external requests or the control commands which are supposed to be sent from the master central control device 20, it is judged that a fault occurred in the master central control device 20. When it is judged that a fault occurred in the master central control device 20, one of the slave central control devices 20 takes over the role of the master central control device 20 by start receiving the external requests and issuing the control commands for the data memory control devices 14 and the communication control devices 16.

Next, the operation of the master central control device 20 in this embodiment III will be described.

The external request receiving unit 201 has a queue for storing received requests, and continually receives requests from external and stored the received external requests in the queue, independently from the other parts of the master central control device 20. The external requests stored in the queue are sent to the other slave central control devices 20 and given to the scheduler 202 according to a command from the control unit 200.

The external request sending unit 204 sends the external requests stored in the queue of the external request receiving unit 201 to all the other slave central control devices 20 along with a uniquely defined ID. FIG. 5 shows an exemplary format for the external requests. Note that, when there is no external request received in one period, an empty external request is sent. Here, the sending of the external requests can be carried out for each slave central control device 20 separately, or for all the slave central control devices 20 at once by using the broadcast function of UDP, for example.

The control command receiving unit 206 receives the control commands issued by the other central control devices 20, and notifies the receiving of the control commands to the control unit 200. Here, a number of control commands issued by one operation determination processing by the scheduler 202 can be one or plural, and in a case of issuing a plurality of control commands, the notification to the control unit 200 is made after all the control commands are received.

The timer 207 sends a notice to the control unit 200 by means such as an interruption when a prescribed time is reached, so as to start the operation of the central control device 20. A setting of a time in the timer 207 is carried out by the control unit 200.

The control unit 200 carries out the control of the master central control device 20 as a whole.

Next, the operation of the slave central control device 20 will be described. Here, the configuration of the slave central control device 20 is obviously identical to that of the master central control device 20.

The timer 207 sends a notice to the fault detection unit 208 by means such as an interruption when a prescribed time is reached, so as to activate the fault detection unit 208. A setting of an activation time of the fault detection unit 208 in the timer 207 is carried out by the control unit 200.

The external request receiving unit 201 gives the external requests piled in the queue to the scheduler 202 according to a command from the control unit 200 similarly as in a case of the master central control device 20, but the sending of the external requests to the other central control devices 20 is not carried out.

The other central control device's external request receiving unit 205 receives the external request sent from the master central control device 20, and stores this external request in the queue of the external request receiving unit 201, while notifying the received time to the fault detection unit 208.

The control command receiving unit 206 monitors the control command for the data memory control devices 14 and the communication control device 16 sent by the master central control device 20, and after confirming the sending of the control command from the master central control device 20, notifies the issue of the control command to the fault detection unit 208.

The fault detection unit 208 monitors the other central control device's external request receiving unit 205 and the control command receiving unit 206, and in response to an inquiry from the control unit 200, returns an information as to whether the external request and control commands are received or not.

The control unit 200 carries out the control of the slave central control device 20 as a whole.

FIG. 28 to FIG. 34 show flow charts for the operations of the master central control device 20 and the slave central control devices 20.

A prescribed initial value is set in the timer 207 so that a notice from the timer 207 will be received at each constant period (step S1101), and the timestamp is initialized to 0 (step S1102). Then, whether a notice from the timer 207 is received or not is checked (step S1103), and a value of the timestamp is incremented by 1 when a notice from the timer 207 is received (step S1104).

Next, whether this central control device is the master central control device or not is checked (step S1105 and when it is the master central control device (step S1105 YES), the control command sending unit 203 is commanded to send the control command produced by the scheduler 202 (step S1110). Then, whether the control command is issued by the other slave central control device or not is checked (step S1111).

When the control command is issued by the other slave central control device (step S1111 YES), a transition to the slave central control device mode is made by this central control device (step S1130), the external request received within this period is invalidated (step S1131), and the operation returns to the step S1103.

When the control command is not issued by the other slave central control device (step S1111 NO), the external request receiving unit 201 is activated to send the external request (step S1112). Then, whether the other slave central control device is changed to the master central control device or not is checked (step S1113).

When no slave central control device is changed to the master central control device (step S1113 NO), the scheduler 202 is commanded to produce the control commands for one period with respect to the data memory control devices 14 and the communication control devices 16 (step S1121), and the operation returns to the step S1103.

When the other slave central control device is changed to the master central control device (step S1113 YES), a transition to the slave central control device mode is made by this central control device (step S1130), the external request received within this period is invalidated (step S1131), and the operation returns to the step S1103.

When this central control device is the slave central control device (step S1005 NO), the timer 207 is set so that a notice from the timer 207 will be received at a time t1 later (step S1140). Then whether a notice from the timer 207 is received or not is checked (step S1141), and when a notice from the timer 207 is received, whether the control command is issued by the master central control device or not is checked (step S1142). When the control command is issued by the master central control device (step S1142 YES), the timer 207 is set so that a notice from the timer 207 will be received at time t2 later (step S1143). Then whether a notice from the timer 207 is received or not is checked (step S1144), and when a notice from the timer 207 is received, whether the external request is received from the master central control device or not is checked (step S1145).

When the external request is received (step S1145 YES), whether the other slave central control device is changed to the master central control device or not is checked (step S1160). When no slave central control device is changed to the master central control device (step S1160 NO), the scheduler 202 is commanded to produce the control commands for one period with respect to the data memory control devices 14 and the communication control devices 16 (step S1121), and the operation returns to the step S1103. When the other slave central control device is changed to the master central control device (step S1160 YES), the external request received within this period is invalidated in order to maintain the consistency regarding the external request (step S1161). Then, the scheduler 202 is commanded to produce the control commands for one period with respect to the data memory control devices 14 and the communication control devices 16 (step S1121), and the operation returns to the step S1103.

When the control command is not issued by the master central control device (step S1142 NO), it is judged that a fault occurred in the master central control device, and whether this central control device has the smallest ID among the slave central control devices or not is checked (step S1150). When this central control device has the smallest ID (step S1150 YES), the change of the master central control device to this central control device is notified to the other central control devices (step S1151), and a transition to the master central control device mode is made by this central control device (step S1152). Then, the control command sending unit 203 is commanded to send the control command produced by the scheduler 202 (step S1153), and the setting is changed so that the external request will be received by this central control device (step S1154). Then, the scheduler 202 is commanded to produce the control commands for one period, assuming that there is no external request (step S1121), and the operation returns to the step S1103. When this central control device does not have the smallest ID (step S1150 NO), the scheduler 202 is commanded to produce the control commands for one period, assuming that there is no external request (step S1121), and the operation returns to the step S1103.

When the external request is not received from the master central control device (step S1145 NO), it is judged that a fault occurred in the master central control device, and whether this central control device has the smallest ID among the slave central control devices or not is checked (step S1170). When this central control device has the smallest ID (step S1170 YES), the change of the master central control device to this central control device is notified to the other central control devices (step S1171), and a transition to the master central control device mode is made by this central control device (step S1172). Then, the setting is changed so that the external request will be received by this central control device (step S1173). Then, the scheduler 202 is commanded to produce the control commands for one period, assuming that there is no external request (step S1121), and the operation returns to the step S1103. When this central control device does not have the smallest ID (step S1170 NO), the scheduler 202 is commanded to produce the control commands for one period, assuming that there is no external request (step S1121), and the operation returns to the step S1103.

In this manner, only one slave central control device can be changed into the master central control device when a fault occurs in the master central control device 20.

According to this embodiment III, the master central control device 20 periodically repeats the prescribed processing starting from the step S1103 and returning to the step S1103 in the flow charts of FIG. 28 to FIG. 34, but the internal state of every slave central control device 20 coincides with the internal state of the master central control device 20 within this period, so that when the fault detection unit 208 of the slave central control device 20 detects a fault in the master central control device 20, it is possible to hand over the processing to be carried out within that period by changing one of the slave central control devices 20 into the master central control device 20, and therefore the continuity of the continuous data service can be guaranteed.

(Embodiment IV)

Now, the embodiment IV of the present invention will be described in detail.

This embodiment IV is directed to a modification of the embodiment II described above, in which a reliability of a transmission path is not guaranteed and a possibility for an occurrence or an error in transmission is assumed and dealt with.

In this embodiment IV, the configuration of the central control device 20 is the same as that shown in FIG. 2 described above.

Namely, the central control device 20 has: an external request receiving unit 201 for receiving requests from external an external request sending unit 204 for sending received external requests to the other central control devices 20; other central control device's external request receiving unit 205 for receiving data from the external request sending unit 204 of the other central control device 20; a scheduler 202 for determining the control command for the data memory control device 14 regarding the reading of the continuous data from the data memory devices 12 and the control command for the communication control device 16 regarding the operation to read out the continuous data from the buffer memory device 18 and send this continuous data to the communication path; a control command sending unit 203 for sending the control commands for the data memory control devices 14 and the communication control devices 16; a control command receiving unit 206 for receiving the control commands sent from the other central control devices 20; a timer 207 for enabling the time management; a fault detection unit 208 for detecting a fault in the other central control devices 20; and a control unit 200 for controlling all these elements.

The scheduler 202 determines the operations of the data memory control devices 14 and the communication control devices which are the control targets. The requests from the external stored in the external request receiving unit 201 are input information of the scheduler 202, and the control commands for the data memory control devices 14 and the communication control devices 16 are output information of the scheduler 202. The scheduler 202 has a function to produce the control commands for two periods according to the input information. The control commands for how many periods should be produced is specified by the control unit 200, and the scheduler 202 produces the control commands for a necessary number of periods accordingly.

FIG. 20 shows timings at which the control commands produced by the scheduler 202 are used by the data memory control devices 14 and the communication control devices 16. In the embodiment IV, when the control commands for one period are produced at a period 1, these control commands are used at a period 3, and when the control commands for two periods a re produced at a period 1, these control commands are used at a period 2 and a period 3.

The control command sending unit 203 sends the control commands produced by the scheduler 202 for the data memory control devices 14 and the communication control devices 16 which are the control targets according to the command from the control unit 200. FIG. 21 shows an exemplary format for the control commands. Each control target executes the control command received at a period indicated by "period for using control commands".

For a plurality of central control devices 20, unique IDs are assigned in advance, so that they can be distinguished from each other. Also, among these plurality of central control devices 20, one is operated as the master central control device 20 while the remaining ones are operated as the slave central control devices 20.

Time used in the central control devices 20 are synchronized in advance. This synchronization of time can be realized by utilizing the NTP protocol, or by providing a common clock to be referred by all the central control devices 20, for example.

The control commands for the data memory control devices 14 and the communication control devices 16 are issued only by the master central control device 20, and the slave central control devices 20 are kept in a hot standby state. When the receiving of the external requests becomes impossible or the sending of the control commands to the data memory control devices 14 and the communication control devices 16 becomes impossible for some reason such as a fault in the master central control device 20, the operation is continued by changing one of the slave central control devices 20 into the master central control device. 20. A detection of a fault in the master central control device 20 is carried out by the slave central control device 20. Here, when the slave central control device 20 cannot receive the external requests or the control commands which are supposed to be sent from the master central control device 20, it is judged that a fault occurred in the master central control device 20. When it is judged that a fault occurred in the master central control device 20, one of the slave central control devices 20 takes over the role of the master central control device 20 by start receiving the external requests and issuing the control commands for the data memory control devices 14 and the communication control devices 16.

Next, the operation of the master central control device 20 in this embodiment IV will be described.

The external request receiving unit 201 has a queue for storing received requests, and continually receives requests from external and stored the received external requests in the queue, independently from the other parts of the master central control device 20. The external requests stored in the queue are sent to the other slave central control devices 20 and given to the scheduler 202 according to a command from the control unit 200.

The external request sending unit 204 sends the external requests stored in the queue of the external request receiving unit 201 to all the other slave central control devices 20 along with a uniquely defined ID. FIG. 5 shows an exemplary format for the external requests. Note. that, when there is no external request received in one period, an empty external request is sent. Here, the sending of the external requests can be carried out for each slave central control device 20 separately, or for all the slave central control devices 20 at once by using the broadcast function of UDP, for example.

The control command receiving unit 206 receives the control commands issued by the other central control devices 20, and notifies the receiving of the control commands to the control unit 200. Here, a number of control commands issued by one operation determination processing by the scheduler 202 can be one or plural, and in a case of issuing a plurality of control commands, the notification to the control unit 200 is made after all the control commands are received.

The timer 207 sends a notice to the control unit 200 by means such as an interruption when a prescribed time is reached, so as to start the operation of the central control device 20. A setting of a time in the timer 207 is carried out by the control unit 200.

The control unit 200 carries out the control of the master central control device 20 as a whole.

Next, the operation of the slave central control device 20 will be described. Here, the configuration of the slave central control device 20 is obviously identical to that of the master central control device 20.

The timer 207 sends a notice to the fault detection unit 208 by means such as an interruption when a prescribed time is reached, so as to activate the fault detection unit 208. A setting of an-activation time of the fault detection unit 208 in the timer 207 is carried out by the control unit 200.

The external request receiving unit 201 gives the external requests piled in the queue to the scheduler 202 according to a command from the control unit 200 similarly as in a case of the master central control device 20, but the sending of the external requests to the other central control devices 20 is not carried out.

The other central control device's external request receiving unit 205 receives the external request sent from the master central control device 20, and stores this external request in the queue of the external request receiving unit 201, while notifying the received time to the fault detection unit 208.

The control command receiving unit 206 monitors the control command for the data memory control devices 14 and the communication control device 16 sent by the master central control device 20, and after confirming the sending of the control command from the master central control device 20, notifies the issue of the control command to the fault detection unit 208.

The fault detection unit 208 monitors the other central control device's external request receiving unit 205 and the control command receiving unit 206, and in response to an inquiry from the control unit 200, returns an information as to whether the external request and control commands are received or not.

The control unit 200 carries out the control of the slave central control device 20 as a whole.

FIG. 35 to FIG. 41 show flow charts for the operations of the master central control device 20 and the slave central control devices 20.

A prescribed initial value is set in the timer 207 so that a notice from the timer 207 will be received at each constant period (step S1201), and the timestamp is initialized to 0 (step S1202). Then, whether a notice from the timer 207 is received or not is checked (step S1203), and a value of the timestamp is incremented by 1 when a notice from the timer 207 is received (step S1204).

Next, whether this central control device is the master central control device or not is checked (step S1205), and when it is the master central control device (step S1205 YES), the control command sending unit 203 is commanded to send the control command produced by the scheduler 202 (step S1210). Then, whether the control command is issued by the other slave central control device or not is checked (step S1211).

When the control command is not issued by the other slave central control device (step S1211 NO), the external request receiving unit 201 is activated to send the external request (step S1212). Then, whether the other slave central control device is changed to the master central control device or not is checked (step S1213).

When no slave central control device is changed to the master central control device (step S1213 NO), whether each one of the data memory control devices 14 and the communication control devices 16 already holds the control commands for two periods or not is checked (step S1220). When each one of the data memory control devices 14 and the communication control devices 16 already holds the control commands for two periods (step S1220 YES), the scheduler 202 is commanded to produce the control commands to be executed at a next next period (step S1221), whereas otherwise (step S1220 NO) the scheduler 202 is commanded to produce the control commands to be executed at a next period and the control commands to be executed at a next next period (step S1222), and the operation returns to the step S1203.

When the control command is issued by the other slave central control device (step S1211 YES), a transition to the slave central control device mode is made by this central control device (step S1230), the external request received within this period is invalidated in order to maintain the consistency regarding the external request (step S1231), and the operation returns to the step S1203, When the other slave central control device is changed to the master central control device (step S1213 YES), a transition to the slave central control device mode is made by this central control device (step S1230), the external request received within this period is invalidated in order to maintain the consistency regarding the external request (step S1231), and the operation returns to the step S1203.

When this central control device is the slave central control device (step S1205 NO), thethater 207 is set so that a notice from the timer 207 will be received at a time t1 later (step S1240). Then whether a notice from the timer 207 is received or not is checked (step S1241), and when a notice from the timer 207 is received, whether the control command is issued by the master central control device or not is checked (step S1242). When the control command is issued by the master central control device (step S1242 YES), the timer 207 is set so that a notice from the timer 207 will be received at time t2 later (step S1243). Then whether a notice from the timer 207 is received or not is checked (step S1244), and when a notice from the timer 207 is received, whether the external request is received from the master central control device or not is checked (step S1245).

When the external request is received (step S1245 YES), whether the other slave central control device is changed to the master central control device or not is checked (step S1260). When no slave central control device is changed to the master central control device (step S1260 NO), whether each one of the data memory control devices 14 and the communication control devices 16 already holds the control commands for two periods or not is checked (step S1220). When each one of the data memory control devices 14 and the communication control devices 16 already holds the control commands for two periods (step S1220 YES), the scheduler 202 is commanded to produce the control commands to be executed at a next next period (step S1221), whereas otherwise (step S1220 NO) the scheduler 202 is commanded to produce the control commands to be executed at a next period and the control commands to be executed at a next next period (step S1222), and the operation returns to the step S1203.

When the other slave central control device is changed to the master central control device (step S1160 YES), the external request received within this period is invalidated in order to maintain the consistency regarding the external request (step S1261). Then, when each one of the data memory control devices 14 and the communication control devices 16 already holds the control commands for two periods (step S1220 YES), the scheduler 202 is commanded to produce the control commands to be executed at a next next period (step S1221), whereas otherwise (step S1220 NO) the scheduler 202 is commanded to produce the control commands to be executed at a next period and the control commands to be executed at a next next period (step S1222), and the operation returns to the step S1203.

When the control command is not issued by the master central control device (step S1242 NO), it is judged that a fault occurred in the master central control device, and whether this central control device has the smallest ID among the slave central control devices or not is checked (step S1250). When this central control device has the smallest ID (step S1250 YES), the change of the master central control device to this central control device is notified to the other central control devices (step S1251), and a transition to the master central control device mode is made by this central control device (step S1252). Then, the control command sending unit 203 is commanded to send the control command produced by the scheduler 202 (step S1253), and the setting is changed so that the external request will be received by this central control device (step S1254). Then, whether each one of the data memory control devices 14 and the communication control devices 16 already holds the control commands for two periods or not is checked (step S1220). When each one of the data memory control devices 14 and the communication control devices 16 already holds the control commands for two periods (step S1220 YES), the scheduler 202 is commanded to produce the control commands to be executed at a next next period (step S1221), whereas otherwise (step S1220 NO) the scheduler 202 is commanded to produce the control commands to be executed at a next period and the control commands to be executed at a next next period (step S1222), and the operation returns to the step S1203.

When this central control device does not have the smallest ID (step S1250 NO), whether each one of the data memory control devices 14 and the communication control devices 16 already holds the control commands for two periods or not is checked (step S1220). When each one of the data memory control devices 14 and the communication control devices 16 already holds the control commands for two periods (step S1220 YES), the scheduler 202 is commanded to produce the control commands to be executed at a next next period (step S1221), whereas otherwise (step S1220 NO) the scheduler 202 is commanded to produce the control commands to be executed at a next period and the control commands to be executed at a next next period (step S1222), and the operation returns to the step S1203.

When the external request is not received from the master central control device (step S1245 NO), it is judged that a fault occurred in the master central control device, and whether this central control device has the smallest ID among the slave central control devices or not is checked (step S1270). When this central control device has the smallest ID (step S1270 YES), the change of the master central control device to this central control device is notified to the other central control devices (step S1271), and a transition to the master central control device mode is made by this central control device (step S1272). Then, the setting is changed so that the external request will be received by this central control device (step S1273). Then, whether each one of the data memory control devices 14 and the communication control devices 16 already holds the control commands for two periods or not is checked (step S1220). When each one of the data memory control devices 14 and the communication control devices 16 already holds the control commands for two periods (step S1220 YES), the scheduler 202 is commanded to produce the control commands to be executed at a next next period (step S1221), whereas otherwise (step S1220 NO) the scheduler 202 is commanded to produce the control commands to be executed at a next period and the control commands to be executed at a next next period (step S1222), and the operation returns to the step S1203.

When this central control device does not have the smallest ID (step S1270 NO), whether each one of the data memory control devices 14 and the communication control devices 16 already holds the control commands for two periods or not is checked (step S1220). When each one of the data memory control devices 14 and the communication control devices 16 already holds the control commands for two periods (step S1220 YES), the scheduler 202 is commanded to produce the control commands to be executed at a next next period (step S1221), whereas otherwise (step S1220 NO) the scheduler 202 is commanded to produce the control commands to be executed at a next period and the control commands to be executed at a next next period (step S1222), and the operation returns to the step S1203.

In this manner, only one slave central control device can be changed into the master central control device when a fault occurs in the master central control device 20.

According to this embodiment IV, the master central control device 20 periodically repeats the prescribed processing starting from the step S1203 and returning to the step S1203 in the flow charts of FIG. 35 to FIG. 41, but the internal state of every slave central control device 20 coincides with the internal state of the master central control device 20 within this period, so that when the fault detection unit 208 of the slave central control device 20 detects a fault in the master central control device 20, it is possible to hand over the processing to be carried out within that period by changing one of the slave central control devices 20 into the master central control device 20.

In addition, the scheduler of the central control device has a function for issuing the control commands for two consecutive periods with respect to the data memory control devices and the communication control devices, and the control commands are issued so that each one of the data memory control devices and the communication control devices holds the control commands for two periods. Consequently, in this embodiment IV, even though the change of the master central control device takes place at a next period of the period at which the fault occurred in the master central control device, as the data memory control devices and the communication control devices can continue their operations by using the control commands held therein, and therefore the continuity of the continuous data service can be guaranteed.

(Embodiment V)

Now, the embodiment V of the present invention will be described in detail.

This embodiment V is directed to a case in which a possibility of a transmission error between the central control devices is assumed, the control command is used for a fault detection, and the operations of the control targets in a next next period are determined by the control commands in stationary states.

In short, in this embodiment V, the central control device which is changed to the master central control device issues the stationary control command at a period at which a fault is detected (as illustrated by a control command A in FIG. 68B and a control command A in FIG. 69B). Then, a transition to the master central control device mode is made by a next period of the period at which the fault is detected, and at a next period of the period at which the transition is made, the control command for determining the operations of the control targets in a next period and the control command for determining the operations of the control targets at a next next period are issued (as illustrated by control commands B and C in FIG. 68B, and control commands B and C in FIG. 69B). Also, a disconnection or the change to the slave central control device of the original master central control device is commanded (an operation mode indicating unit).

Also, in this embodiment V, the external request sent from the master to the slave has an information on a period at which it becomes valid. When a confirmation of an exchange of the external request between the master and the slave is carried out and the input information is not transmitted to some slave, the master carries out a re-transmission or a cancellation of the external request before a period at which this external request becomes valid (a response sending unit and a response receiving unit).

According to this embodiment V, in a case where the slave becomes the master after detecting a fault, when the operation as a stationary master cannot be carried out at a next period of the period at which the fault is detected, even if a transmission of the control command for determining the operations of the control targets at a next next next period of the period at which the fault is detected is delayed until a next next period of the period at which the fault is detected, the control command can be surely transmitted by a period immediately before the period at which the control targets uses the transmitted control command.

FIG. 42 shows a configuration of the central control device 20 in the continuous data server apparatus of this embodiment V.

This central control device 20 of FIG. 42 has: an external request receiving unit 201 for receiving requests from external; an external request sending unit 204 for sending received external requests to the other central control devices 20; other central control device's external request receiving unit 205 for receiving data from the external request sending unit 204 of the other central control device 20; a scheduler 202 for determining the control command for the data memory control device 14 regarding the reading of the continuous data from the data memory devices 12 and the control command for the communication control device 16 regarding the operation to read out the continuous data from the buffer memory device 18 and send this continuous data to the communication path; a control command sending unit 203 for sending the control commands for the data memory control devices 14 and the communication control devices 16; a control command receiving unit 206 for receiving the control commands sent from the other central control devices 20; a timer 207 for enabling the time management; a fault detection unit 208 for detecting a fault in the other central control devices 20; an operation mode indicating unit 209 for changing this central control device 20 into the master, changing this central control device 20 into the slave, or disconnecting this central control device 20 from the system, when a fault occurs in one of the central control devices 20; a response receiving unit 210 for receiving responses from the control targets and the slave central control devices 20; a response sending unit 211 for returning a response regarding whether the external request is received correctly or not, to the master central control device; and a control unit 200 for controlling all these elements.

The scheduler 202 determines the operations of the data memory control devices 14 and the communication control devices which are the control targets. The requests from the external stored in the external request receiving unit 201 are input information of the scheduler 202, and the control commands for the data memory control devices 14 and the communication control devices 16 are output information of the scheduler 202. The scheduler 202 has a function to produce the control commands for two periods according to the input information which becomes valid at that period among the input information from the external request receiving unit 201. The control commands for how many periods should be produced is specified by the control unit 200, and the scheduler 202 produces the control commands for a necessary number of periods accordingly.

FIG. 20 shows timings at which the control commands produced by the scheduler 202 are used by the data memory control devices 14 and the communication control devices 16. In the embodiment V, when the control commands for one period are produced at a period 1, these control commands are used at a period 3, and when the control commands for two periods are produced at a period 1, these control commands are used at a period 2 and a period 3.

The control command sending unit 203 sends the control commands produced by the scheduler 202 for the data memory control devices 14 and the communication control devices 16 which are the control targets according to the command from the control unit 200. FIG. 21 shows an exemplary format for the control commands. Each control target executes the control command received at a period indicated by "period for using control commands".

For a plurality of central control devices 20, unique IDs are assigned in advance, so that they can be distinguished from each other. Also, among these plurality of central control devices 20, one is operated as the master central control device 20 while the remaining ones are operated as the slave central control devices 20.

Time used in the central control devices 20 are synchronized in advance. This synchronization of time can be realized by utilizing the NTP protocol, or by providing a common clock to be referred by all the central control devices 20, for example.

The control commands for the data memory control devices 14 and the communication control devices 16 are issued only by the master central control device 20, and the slave central control devices 20 are kept in a hot standby state. When the receiving of the external requests becomes impossible or the sending of the control commands to the data memory control devices 14 and the communication control devices 16 becomes impossible for some reason such as a fault in the master central control device 20, the operation is continued by changing one of the slave central control devices 20 into the master central control device 20.

A detection of a fault in the master central control device 20 is carried out by the slave central control device 20. Here, when the slave central control device 20 cannot receive the control commands which are supposed to be sent from the master central control device 20, it is judged that a fault occurred in the master central control device 20. When it is judged that a fault occurred in the master central control device 20, one of the slave central control devices 20 takes over the role of the master central control device 20 by start receiving the external requests and issuing the control commands for the data memory control devices 14 and the communication control devices 16.

Next, the operation of the master central control device 20 in this embodiment V will be described.

The external request receiving unit 201 has a queue for storing received requests, and continually receives requests from external and stored the received external requests in the queue, independently from the other parts of the master central control device 20. The external requests stored in the queue are sent to the other slave central control devices 20 and given to the scheduler 202 according to a command from the control unit 200.

The external request sending unit 204 sends the external requests stored in the queue of the external request receiving unit 201 to all the other slave central control devices 20 along with a uniquely defined ID and a period information regarding a period from which these external requests become valid. FIG. 43 shows an exemplary format for the external requests. Note that, when there is no external request received in one period, an empty external request is sent. Here, the sending of the external requests can be carried out for each slave central control device 20 separately, or for all the slave central control devices 20 at once by using the broadcast function of UDP, for example.

The control command receiving unit 206 receives the control commands issued by the other central control devices 20, and notifies the receiving of the control commands to the control unit 200. Here, a number of control commands issued by one operation determination processing by the scheduler 202 can be one or plural, and in a case of issuing a plurality of control commands, the notification to the control unit 200 is made after all the control commands are received.

The timer 207 sends a notice to the control unit 200 by means such as an interruption when a prescribed time is reached, so as to start the operation of the central control device 20. A setting of a time in the timer 207 is carried out by the control unit 200.

The operation mode indicating unit 209 holds an indication information indicating the operation mode of the master central control device, and gives this indication information to the control unit 200 according to a request from the control unit 200.

The operation mode indicating units 209 of the central control devices 20 are connected through one or a plurality of transmission path, so that the operation mode can be indicated each other. Here, the operation mode includes "master" used at a time of operating as the master central control device, "slave" used at a time of operating as the slave central control device, and "disconnect" used at a time where a fault occurs in this central control device.

At a time of initialization, the operation mode indicated by the operation mode indicating unit 209 is set to "master" for the master central control device 20 and to "slave" for the slave central control devices 20.

The response receiving unit 210 receives responses from the data memory control devices 14, the communication control devices 16, and the slave central control devices 20, and sends them to the control unit 200.

The control unit 200 carries out the control of the master central control device 20 as a whole.

Next, the operation of the slave central control device 20 will be described. Here, the configuration of the slave central control device 20 is obviously identical to that of the master central control device 20.

The timer 207 sends a notice to the fault detection unit 208 by means such as an interruption when a prescribed time is reached, so as to activate the fault detection unit 208. A setting of an activation time of the fault detection unit 208 in the timer 207 is carried out by the control unit 200.

The external request receiving unit 201 gives the external requests piled in the queue to the scheduler 202 according to a command from the control unit 200 similarly as in a case of the master central control device 20, but the sending of the external requests to the other central control devices 20 is not carried out.

The other central control device's external request receiving unit 205 receives the external request sent from the master central control device 20, and stores this external request in the queue of the external request receiving unit 201, while notifying the received time to the fault detection unit 208.

The control command receiving unit 206 monitors the control command for the data memory control devices 14 and the communication control device 16 sent by the master central control device 20, and after confirming the sending of the control command from the master central control device 20, notifies the issue of the control command to the fault detection unit 208.

The fault detection unit 208 monitors the other central control device's external request receiving unit 205, the control command receiving unit 206, and the response receiving unit 210, and in response to an inquiry from the control unit 200, returns an information as to whether the external request and control commands are received or not.

The response receiving unit 210 receives the responses from the data memory control devices 14 and the communication control devices 16, and sends them to the control unit 200.

The response sending unit 211 returns a response regarding whether the external request is received correctly or not, to the master central control device, according to the command from the control unit 200.

The control unit 200 carries out the control of the slave central control device 20 as a whole.

Figure 44:
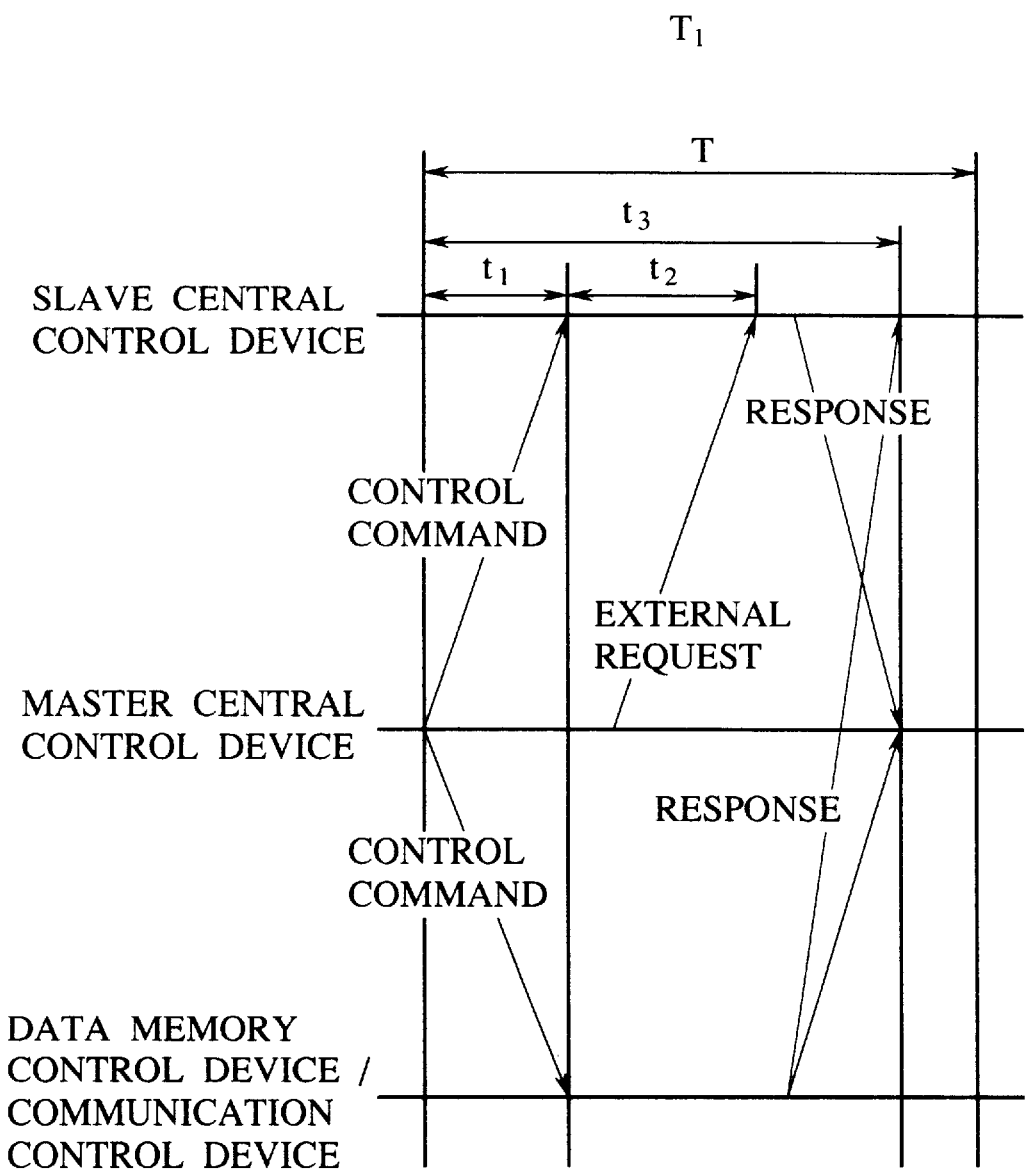
FIG. 44 to FIG. 46 are timing charts for the operations in the continuous data server apparatus of FIG. 1 according to the embodiment V for three different cases.
Figure 45:
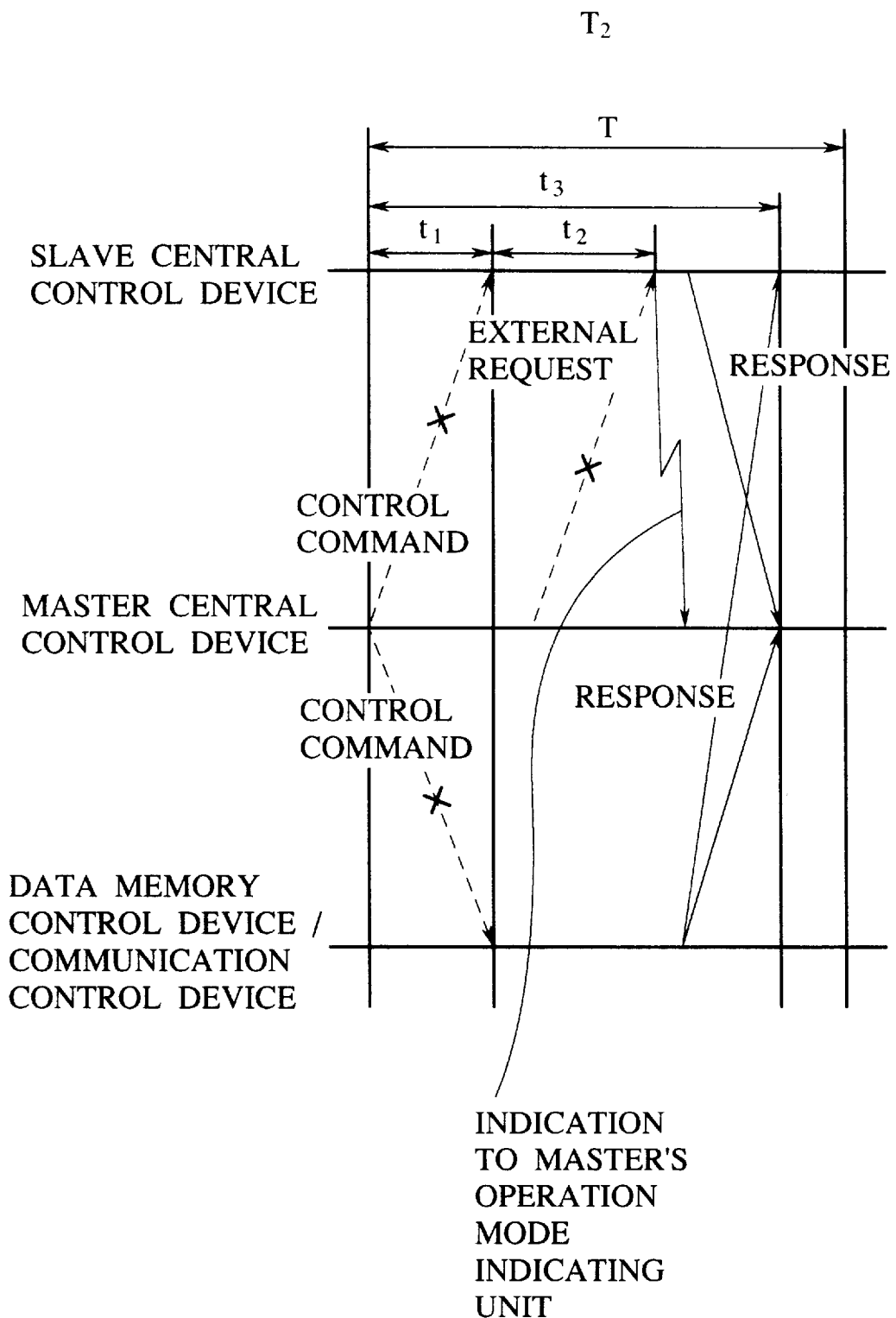
Figure 46:
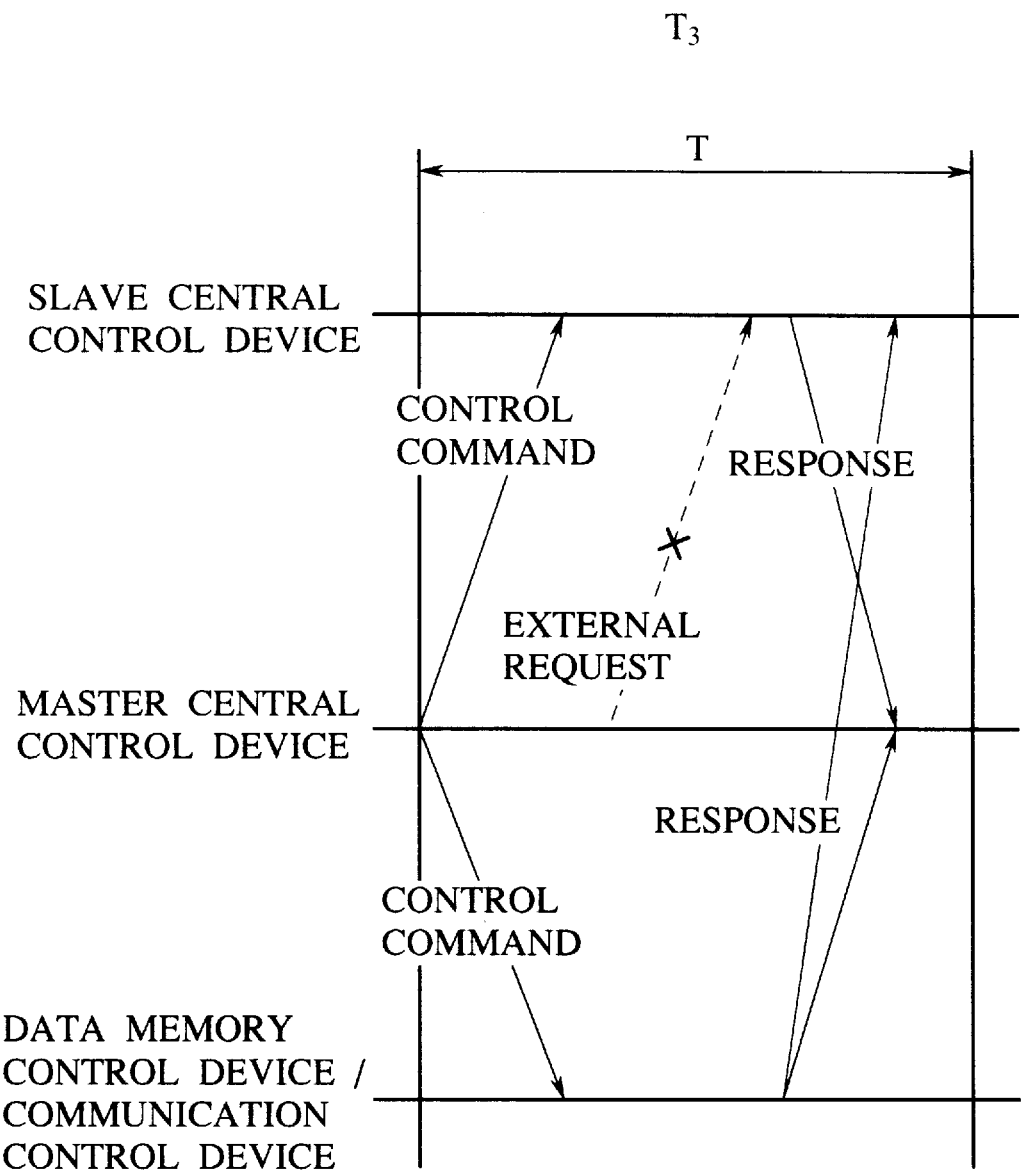
Figure 47:
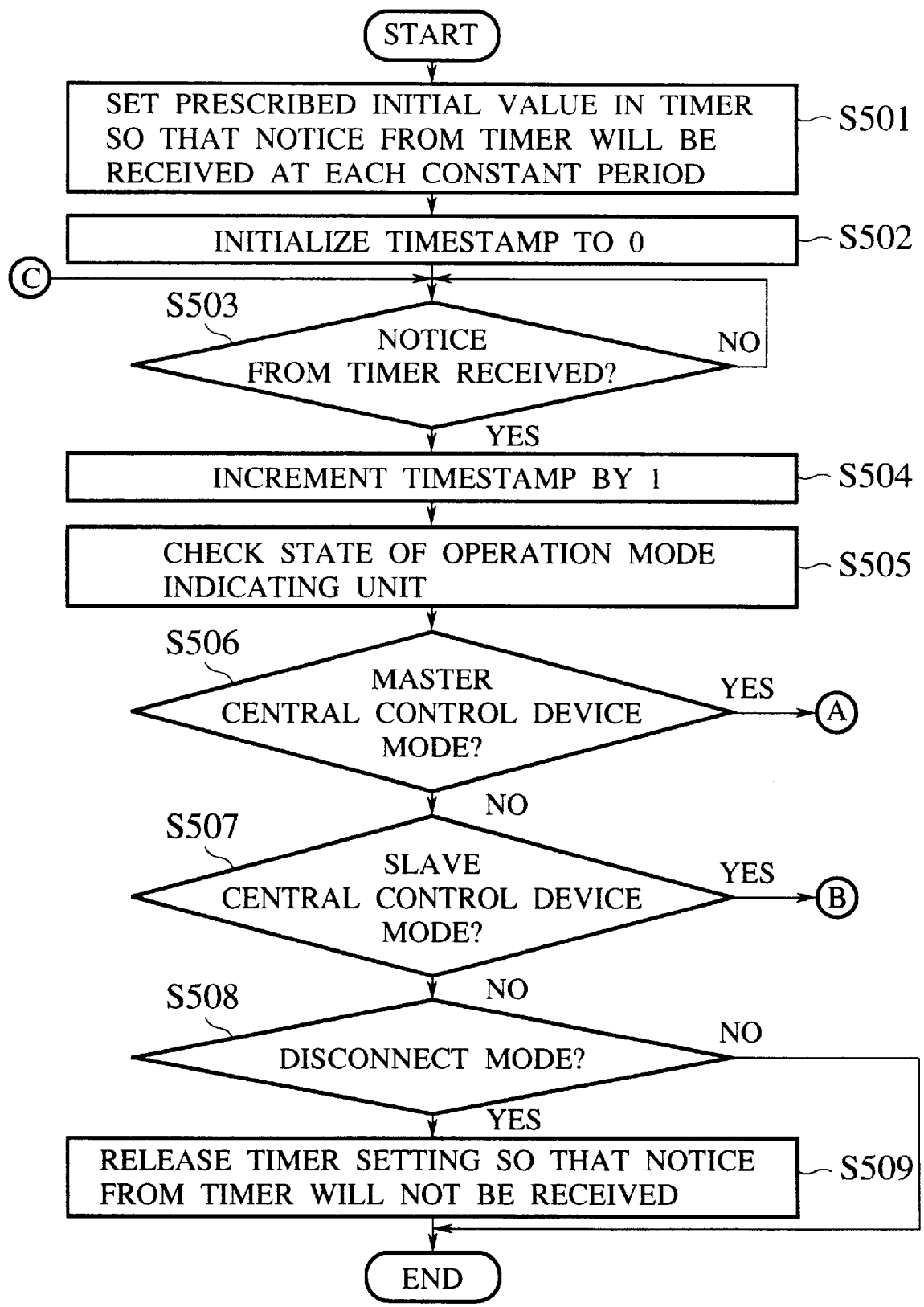
FIG. 47 to FIG. 52 are a flow chart for the operations of a master central control device and slave central control devices in the continuous data server apparatus of FIG. 1 according to the embodiment V.
Figure 48:
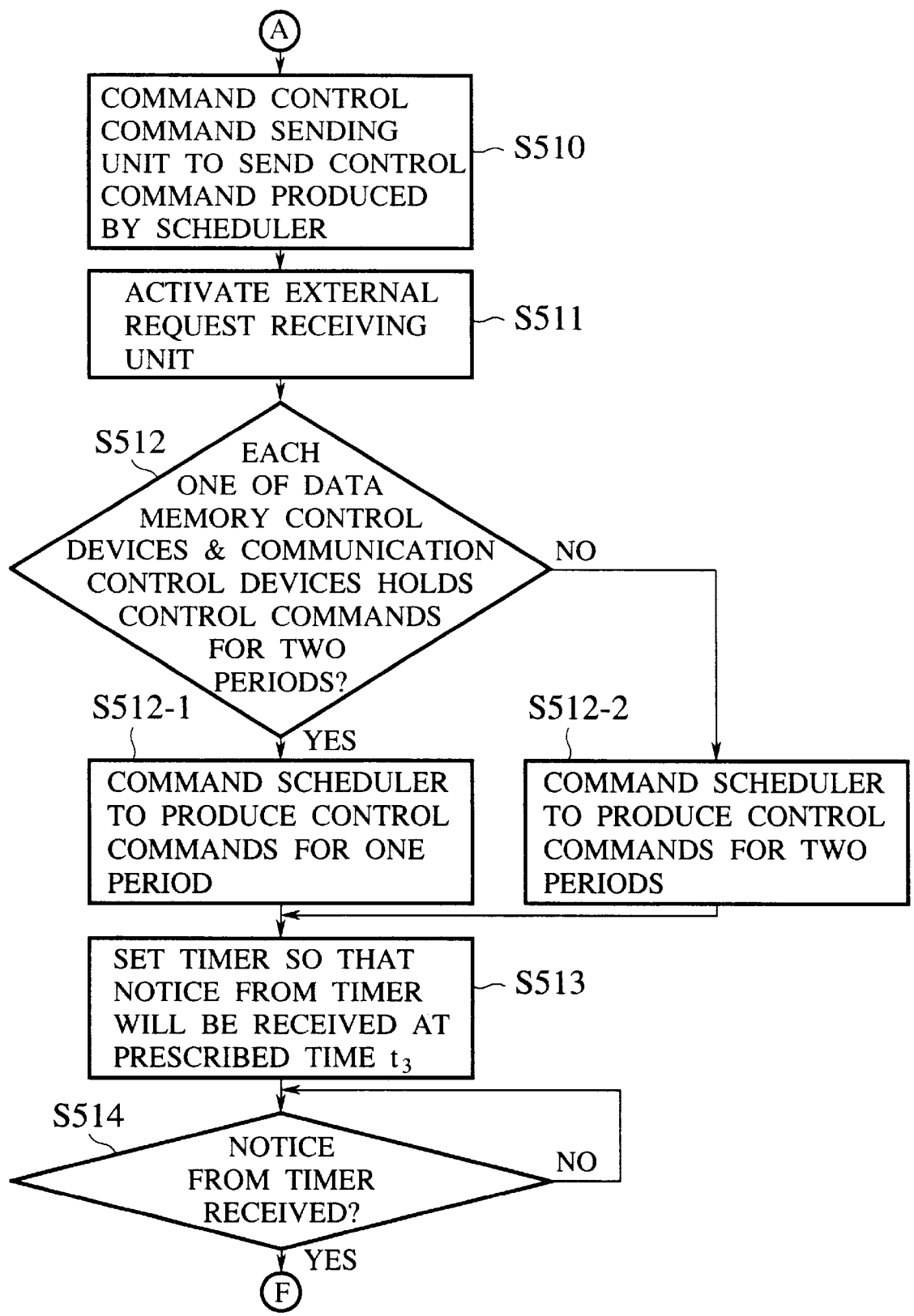
Figure 49:
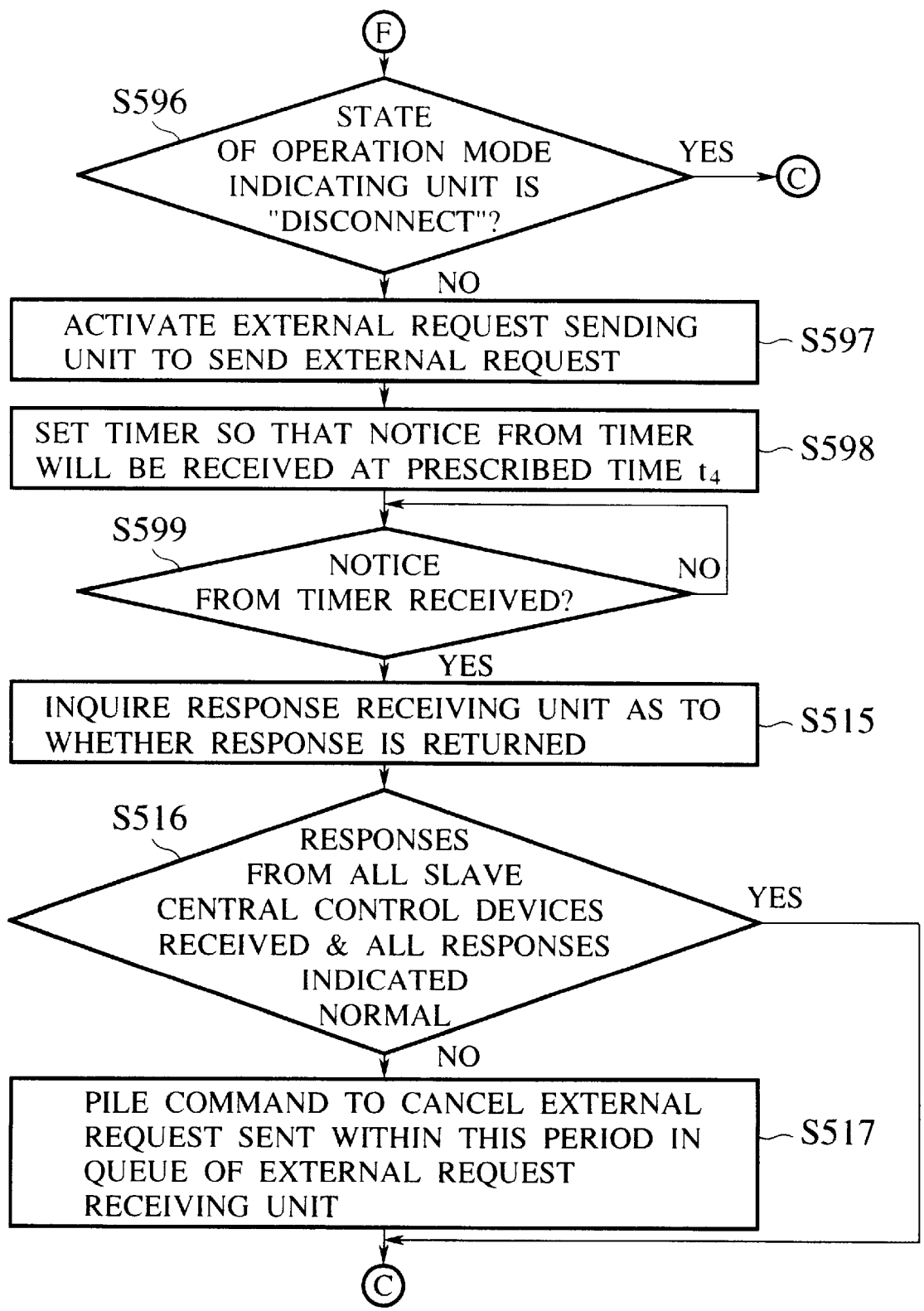
Figure 50:
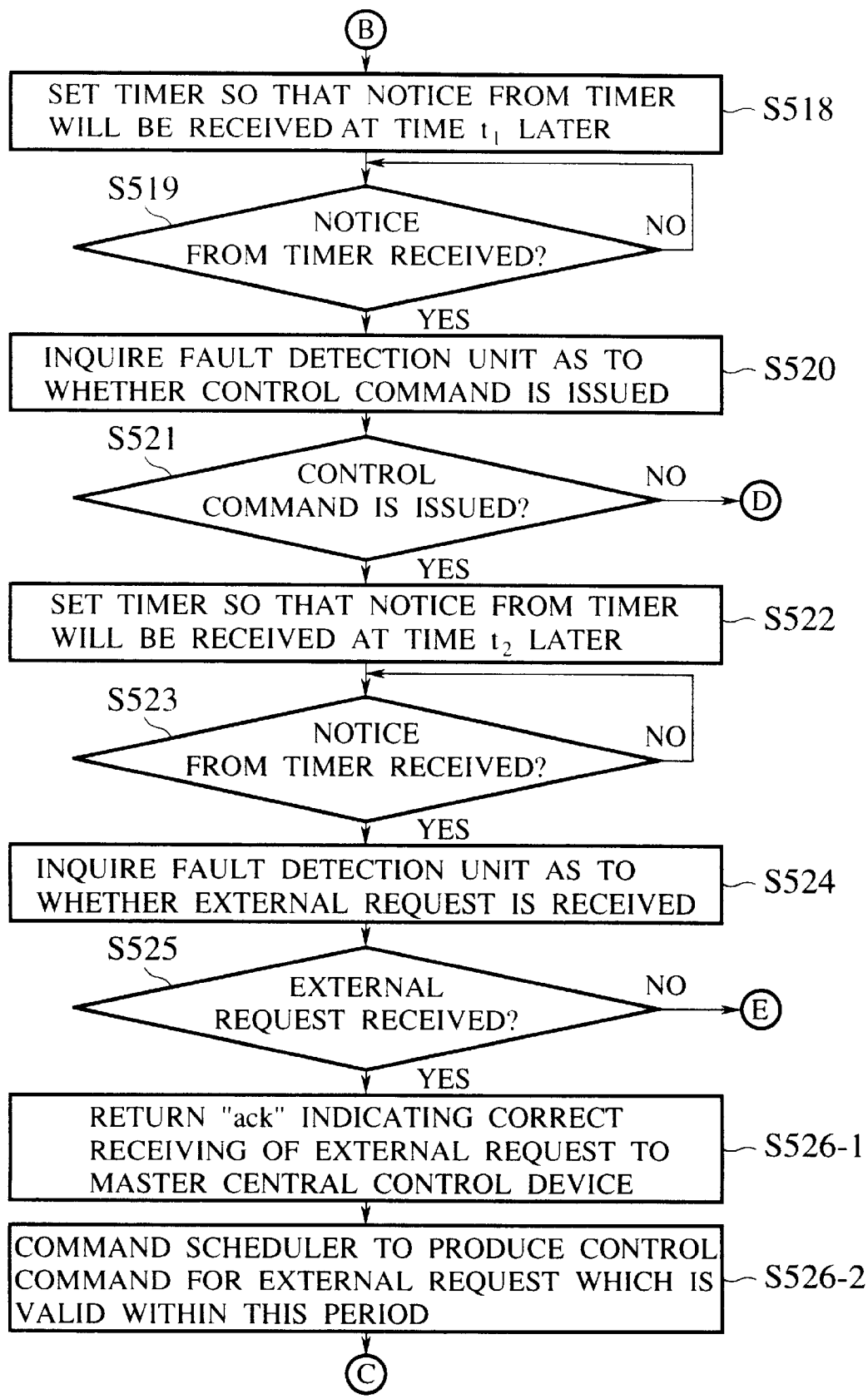
Figure 51:
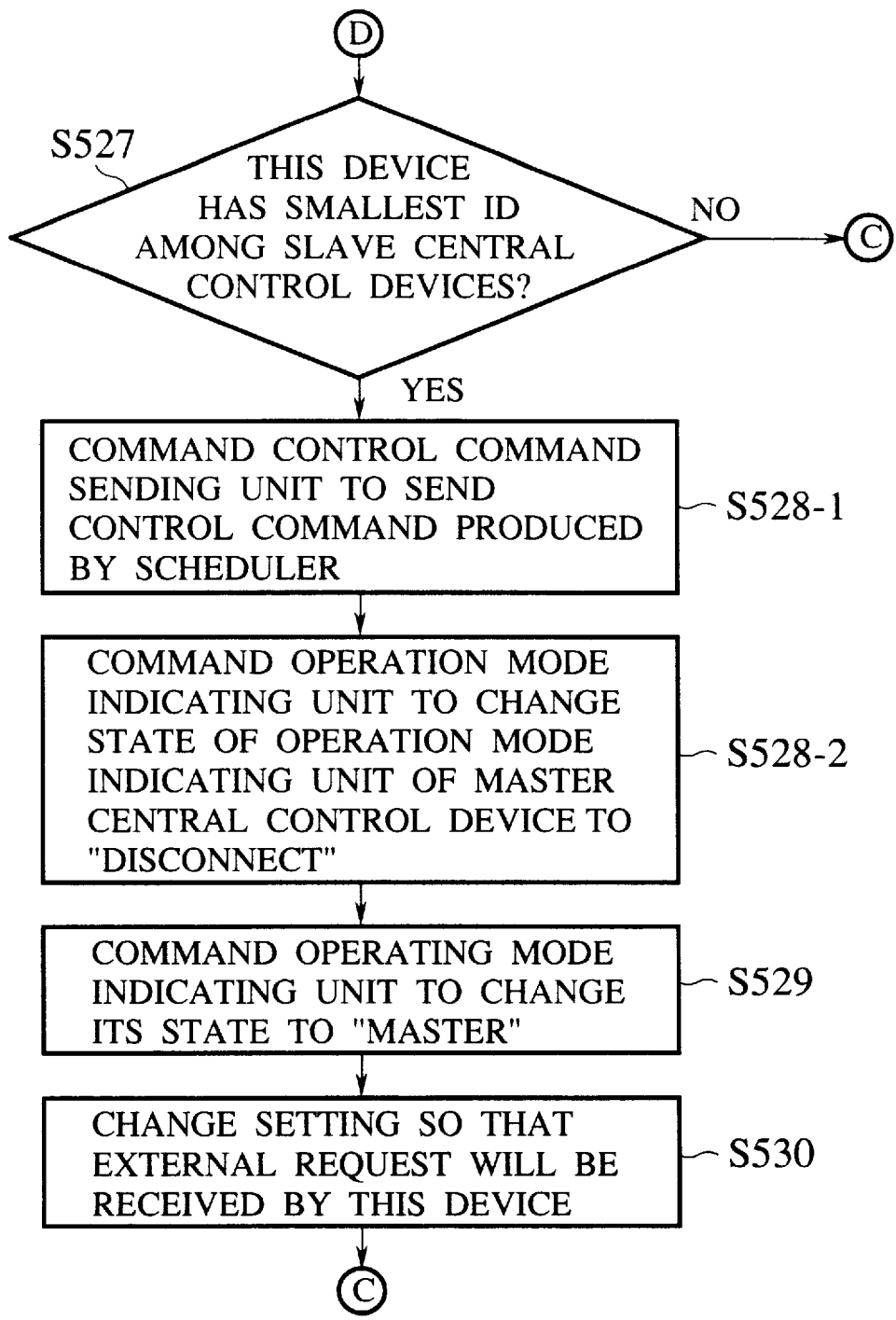
Figure 52:
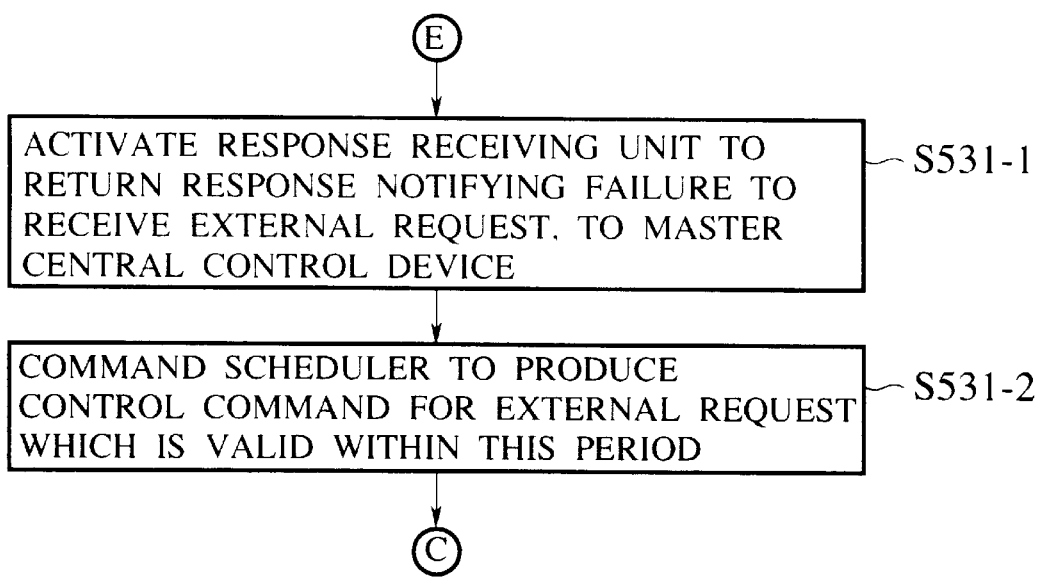

FIG. 44 to FIG. 46 show timing charts for the operations of the master central control device, the slave central control device, the data memory control devices, and the communication control devices. Each device repeats the same operation at a prescribed period T.

In FIG. 44, the period T1 shows a case in which the continuous data server apparatus is operating normally. By a prescribed time t1 within the period, the master central control device 20 issues the control commands with respect to the slave central control devices 20, the data memory control devices 14 and the communication control devices 16. Next, by a prescribed time t1+t2 within the period, the master central control device 20 sends the received external requests to the slave central control devices. Then, by a prescribed time t3 within the period, the slave central control devices 20, the data memory control devices 14 and the communication control devices 16 return appropriate responses to the master central control device 20 according to the received control commands and external requests.

In FIG. 45, the period T2 shows a case in which a fault occurred in the master central control device 20 of the continuous data server apparatus. In this case, the control commands and the external requests are not sent by a prescribed time t1 and a prescribed time t1+t2 within the period, so that the slave central control devices 20 can detect an occurrence of some fault in the master central control device 20. In this case, after the change of the operation mode to "disconnect" is indicated to the operation mode indicating unit 209 of the master central control device 20, a response indicating that the slave central control device 20 is going to operate as the master central control device is returned to the master central control device 20.

In FIG. 46, the period T3 shows a case in which the external request from the master central control device 20 did not reach to the slave central control devices 20 for a reason such as a temporal problem in a transmission path. In this case, the fact that the external request was not received is notified to the master central control device 20 by a response from the slave central control device 20. When this response is received, a command for invalidating the external request sent at that period is issued by the master central control device 20 at a next period so as to make the internal states of the slave central control devices 20 identical to the internal state of the master central control device 20.

FIG. 47 to FIG. 52 show flow charts for the operations of the master central control device 20 and the slave central control device 20.

A prescribed initial value is set in the timer 207 so that a notice from the timer 207 will be received at each constant period (step S501), and the timestamp is initialized to 0 (step S502). Then, whether a notice from the timer 207 is received or not is checked (step S503), and when a notice from the timer 207 is received, a value of the timestamp is incremented by 1 (step S504), and a state of the operation mode indicating unit 209 is checked (step S505).

When the operation mode is "master" (step S506 YES), the control command sending unit 203 is commanded to send the control command produced by the scheduler 202 (step S510), and the external request receiving unit 201 is activated (step S511). When each one of the data memory control devices 14 and the communication control devices 16 already holds the control commands for two periods (step S512 YES), the scheduler 202 is commanded to produce the control commands to be executed at a next next period (step S512-1), whereas otherwise (step S512 NO) the scheduler 202 is commanded to produce the control commands to be executed at a next next period and the control commands to be executed at a next next next period (step S512-2).

Then, the timer 207 is set so that a notice from the timer 207 will be received at a prescribed time t3 later (step S513). Then whether a notice from the timer 207 is received or not is checked (step S514), and when a notice from the timer 207 is received, whether the state of the operation mode indicating unit 209 is "disconnect" or not is checked (step S596). When it is "disconnect", the operation returns to the step S503, whereas when it is not "disconnect", the the external request sending unit 204 is activated to send the external request (step S597).

Then, the timer 207 is set so that a notice from the timer 207 will be received at a prescribed time t4 later (step S598). Then whether a notice from the timer 207 is received or not is checked (step S599), and when a notice. from the timer 207 is received, whether the responses from the data memory control devices 14, the communication control devices 16 and the other slave central control devices 20 are returned or not is inquired to the response receiving unit 210 (step S515). When the responses from all the slave central control devices are received and all these responses indicated the normal reception (step S516 YES), the operation returns to the step S503. When the response from some slave central control device is not received, or indicated a failure of the normal reception (step S516 NO), a command for cancelling the external request sent within this period is piled in the queue of the external request receiving unit 201 (step S517), and the operation returns to the step S503.

When the operation mode is "slave" (step S507 YES), the timer 207 is set so that a notice from the timer 207 will be received at a time t1 later (step S518). Then whether a notice from the timer 207 is received or not is checked (step S519), and when a notice from the timer 207 is received, whether the control command is issued or not is inquired to the fault detection unit 208 (step S520).

When the control command is issued (step S521 YES), the timer 207 is set so that a notice from the timer 207 will be received at a time t2 later (step S522). Then whether a notice from the timer 207 is received or not is checked (step S523), and when a notice from the timer 207 is received, whether the external request is received or not is inquired to the fault detection unit 208 (step S524). When the external request is received (step S525 YES), a response "ack" indicating that the external response is received correctly is returned to the master central control device (step S526-1), the scheduler 202 is commanded to produce the control command for the external request which is valid within this period (step S526-2), and the operation returns to the step S503. Here, at the step S526-2, the production of the control commands for as many periods as necessary is commanded similarly as in the steps S512, S512-1 and S512-2 described above.

When the control command is not issued (step S521 NO), it is judged that a fault occurred in the master central control device, and whether this central control device has the smallest ID among the slave central control devices or not is checked (step S527). When this central control device has the smallest ID (step S527 YES), the control command sending unit 203 is commanded to send the control command produced by the scheduler 202 (step S528-1), and the operation mode indicating unit 209 is commanded to change the state of the operation mode indicating unit 209 of the master central control device to "disconnect" (step S528-2). Then, the operation mode indicating unit 209 is commanded to change its state to "master" (step S529), the setting is changed so that the external request will be received by this central control device (step S530), and the operation returns to the step S503. When this central control device does not have the smallest ID (step S527 NO), the operation returns to the step S503.

When the external request is not received (step S525 NO), the response sending unit 211 is activated to return a response notifying a failure to receive the external request to the master central control device, so as to have the external response received in this period invalidated (step S531-1). Then, the scheduler 202 is commanded to produce the control command for the external request which is valid within this period (step S531-2), and the operation returns to the step S503. Here, at the step S5312, the production of the control commands for as many periods as necessary is commanded similarly as in the steps S512, S512-1 and S512-2 described above.

In this manner, only one slave central control device can be changed into the master central control device when a fault occurs in the master central control device 20.

According to this embodiment V, the master central control device 20 periodically repeats the prescribed processing starting from the step S503 and returning to the step S503 in the flow charts of FIG. 47 to FIG. 52, but the internal state of every slave central control device 20 coincides with the internal state of the master central control device 20 within this period, so that when the fault detection unit 208 of the slave central control device 20 detects a fault in the master central control device 20, it is possible to hand over the processing to be carried out within that period by changing one of the slave central control devices 20 into the master central control device 20.

In addition, the scheduler of the central control device has a function for issuing the control commands for two consecutive periods with respect to the data memory control devices and the communication control devices, and the control commands are issued so that each one of the data memory control devices and the communication control devices holds the control commands for two periods. Consequently, in this embodiment V, even though the change of the master central control device takes place at a next period of the period at which the fault occurred in the master central control device, as the data memory control devices and the communication control devices can continue their operations by using the control commands held therein, and therefore the continuity of the continuous data service can be guaranteed.

Moreover, even when the control commands from the master central control device to the data memory control devices and the communication control devices for one period are lost for a reason such as a temporal problem in a transmission path, because each one of the data memory control devices and the communication control devices holds the control commands for two periods, the data memory control devices and the communication control devices can continue their operations by using the control commands held therein, and therefore the continuity of the continuous data service can be guaranteed.

Note that, in the embodiment V described above, when the control command is not issued at the step S521, the slave central control device having the smallest ID commands the operation mode indicating unit 209 to change the state of the operation mode indicating unit 209 of the master central control device to "disconnect" at the step S528, but instead it is also possible to change the state of the operation mode indicating unit 209 of the master central control device to "slave" at this point.

Also, in the embodiment V described above, when there exists the slave to which the external request did not reach, a cancellation of the corresponding external request (before the period for using that external request) is notified to the slaves to which this external request was sent, but instead of that, it is also possible to re-transmit that external request (before the period for using that external request) to the slave to which this external request did not reach.

(Embodiment VI)

Now, the embodiment VI of the present invention will be described in detail.

This embodiment VI is directed to a case in which a possibility of a transmission error between the central control devices is assumed, the control command is used for a fault detection, and the operations of the control targets in a next period are determined by the control commands in stationary states.

In short, in this embodiment VI, when a fault in the master is detected, a prescribed one of the slaves issues the control command at a period at which a fault is detected, and a transition to the master central control device mode is made. Then, at a next period of the period at which the fault is detected, the control command for determining the operations of the control targets in a next period is issued. Also, a disconnection or the change to the slave central control device of the original master central control device is commanded (an operation mode indicating unit).

Also, in this embodiment VI, the external request sent from the master to the slave has an information on a period at which it becomes valid. When a confirmation of an exchange of the external request between the master and the slave is carried out and the input information is not transmitted to some slave, the master carries out a re-transmission or a cancellation of the external request before a period at which this external request becomes valid (a response sending unit and a response receiving unit).

Figure 53:
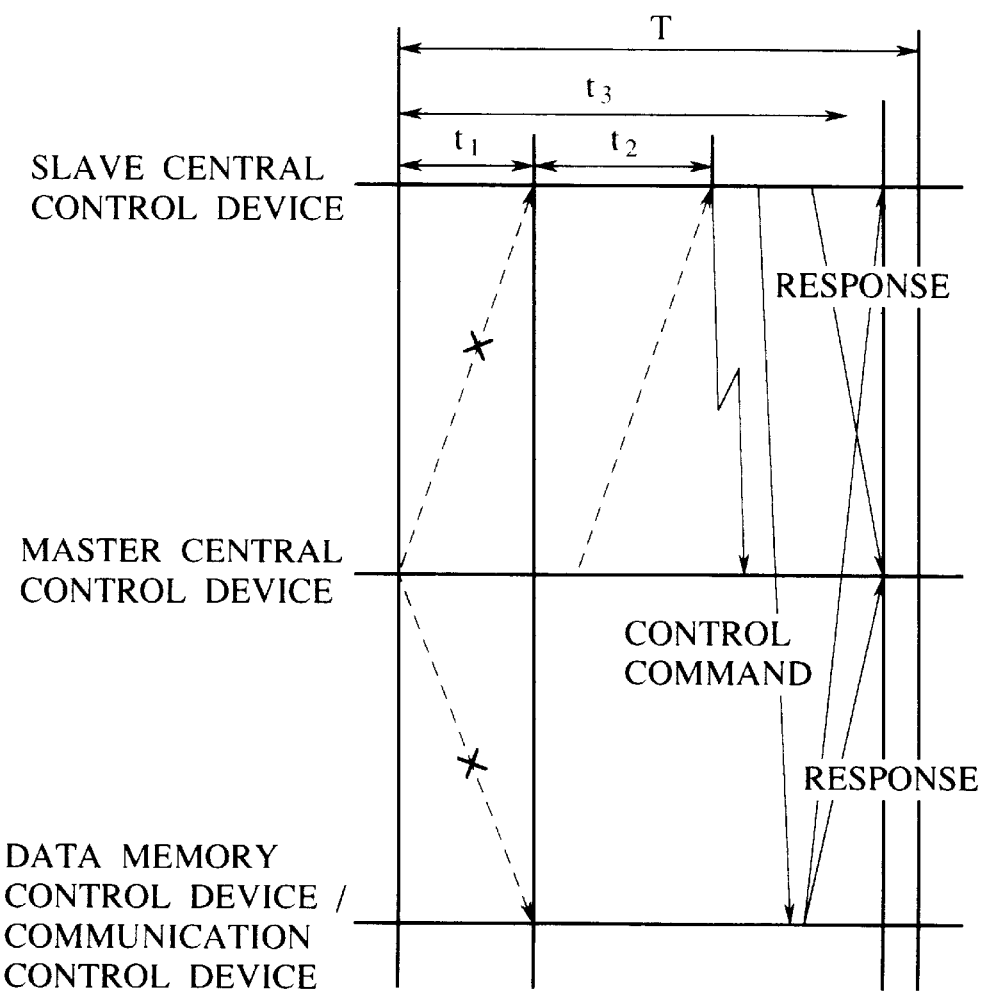
FIG. 53 is a timing chart for the operations in the continuous data server apparatus of FIG. 1 according to the embodiment VI.
Figure 54:
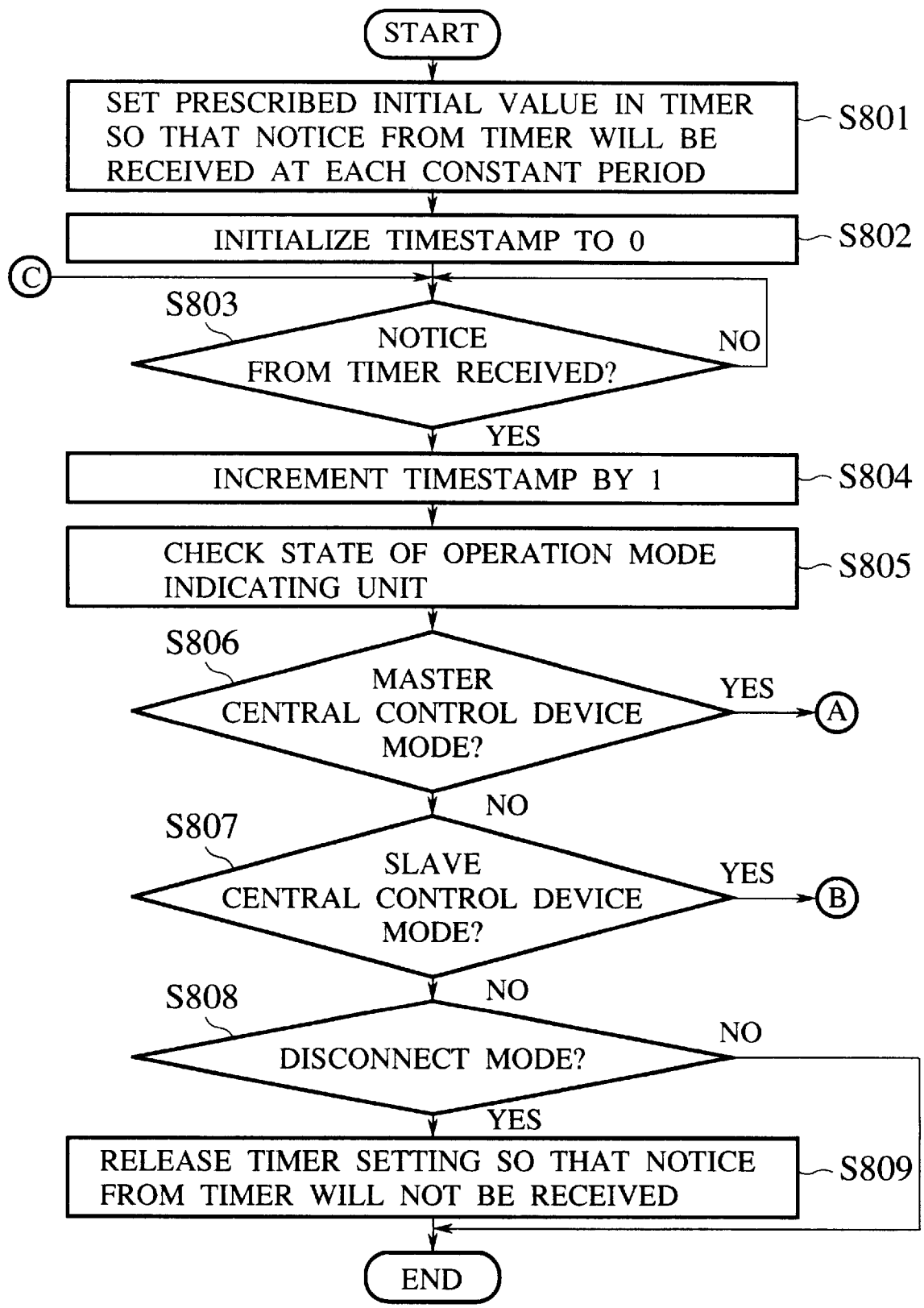
FIG. 54 to FIG. 59 are a flow chart for the operations of a master central control device and slave central control devices in the continuous data server apparatus of FIG. 1 according to the embodiment VI.
Figure 55:
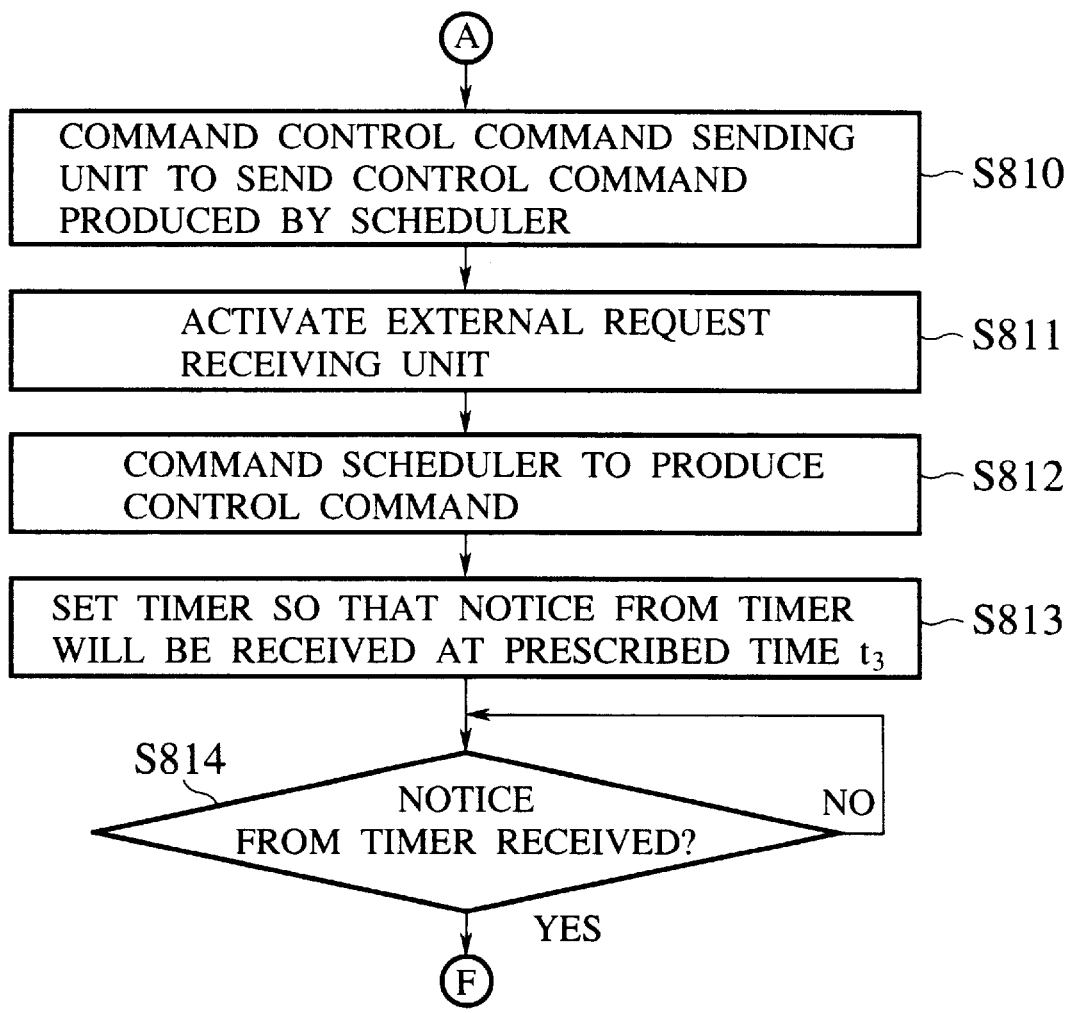
Figure 56:
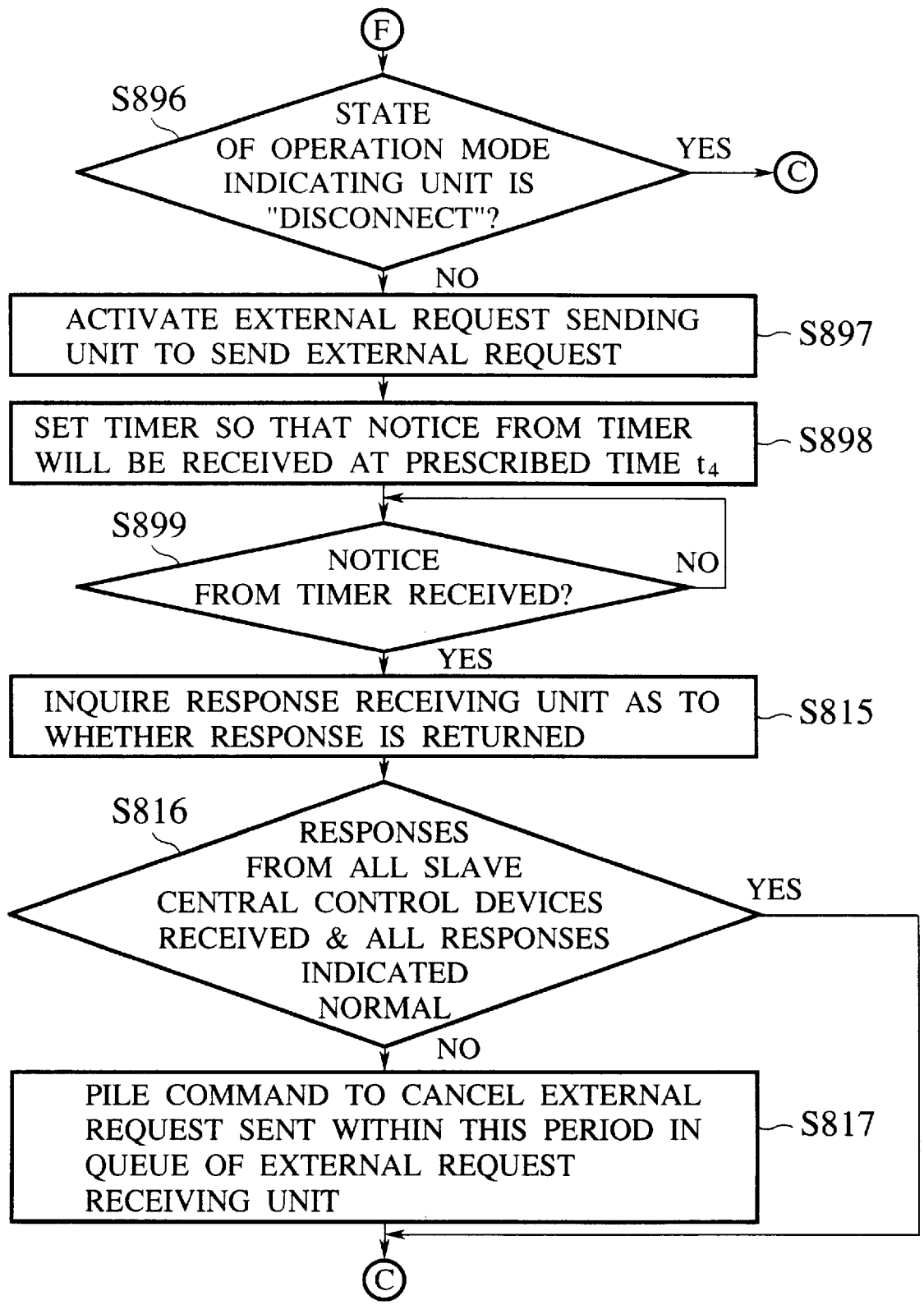
Figure 57:
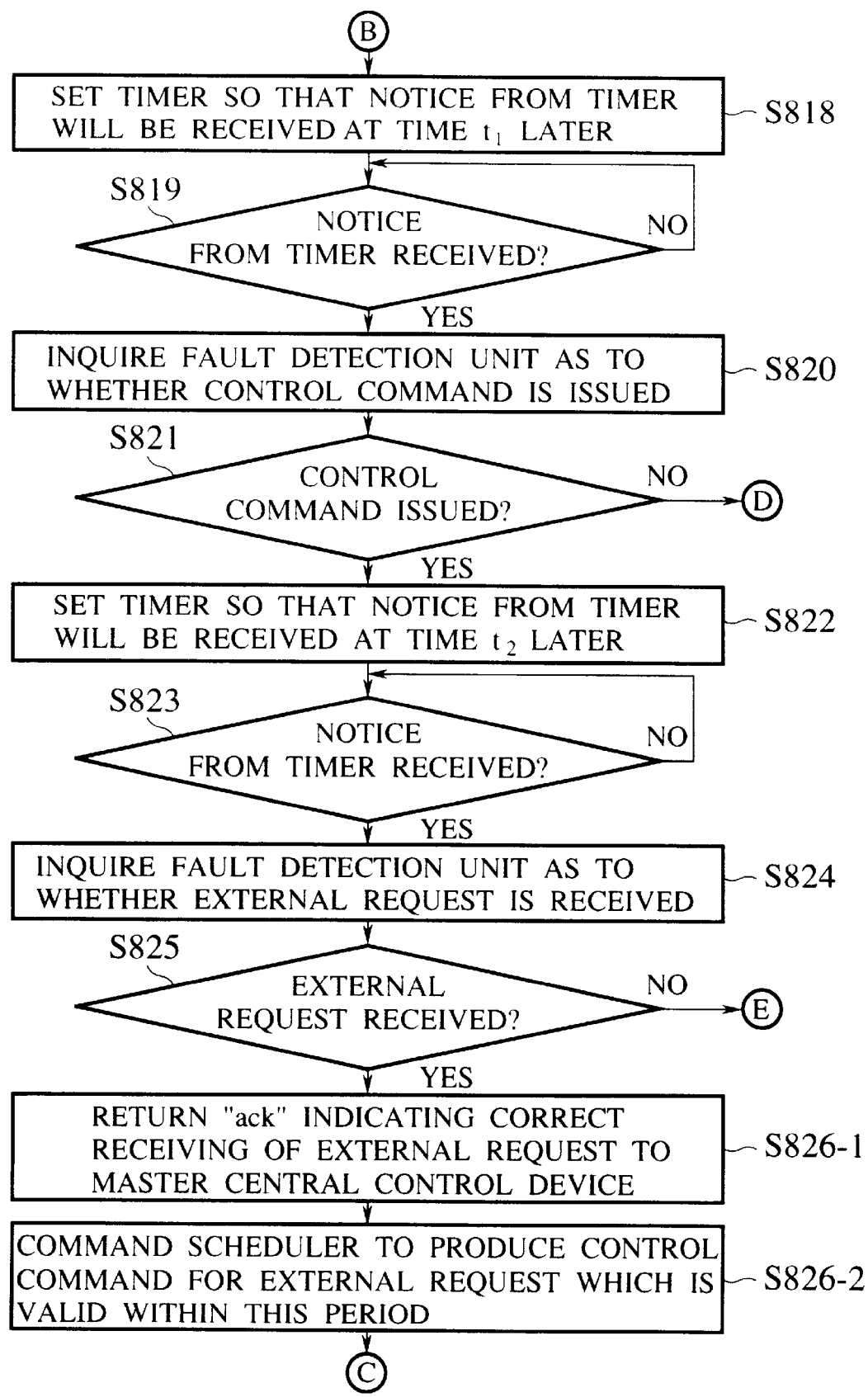
Figure 58:
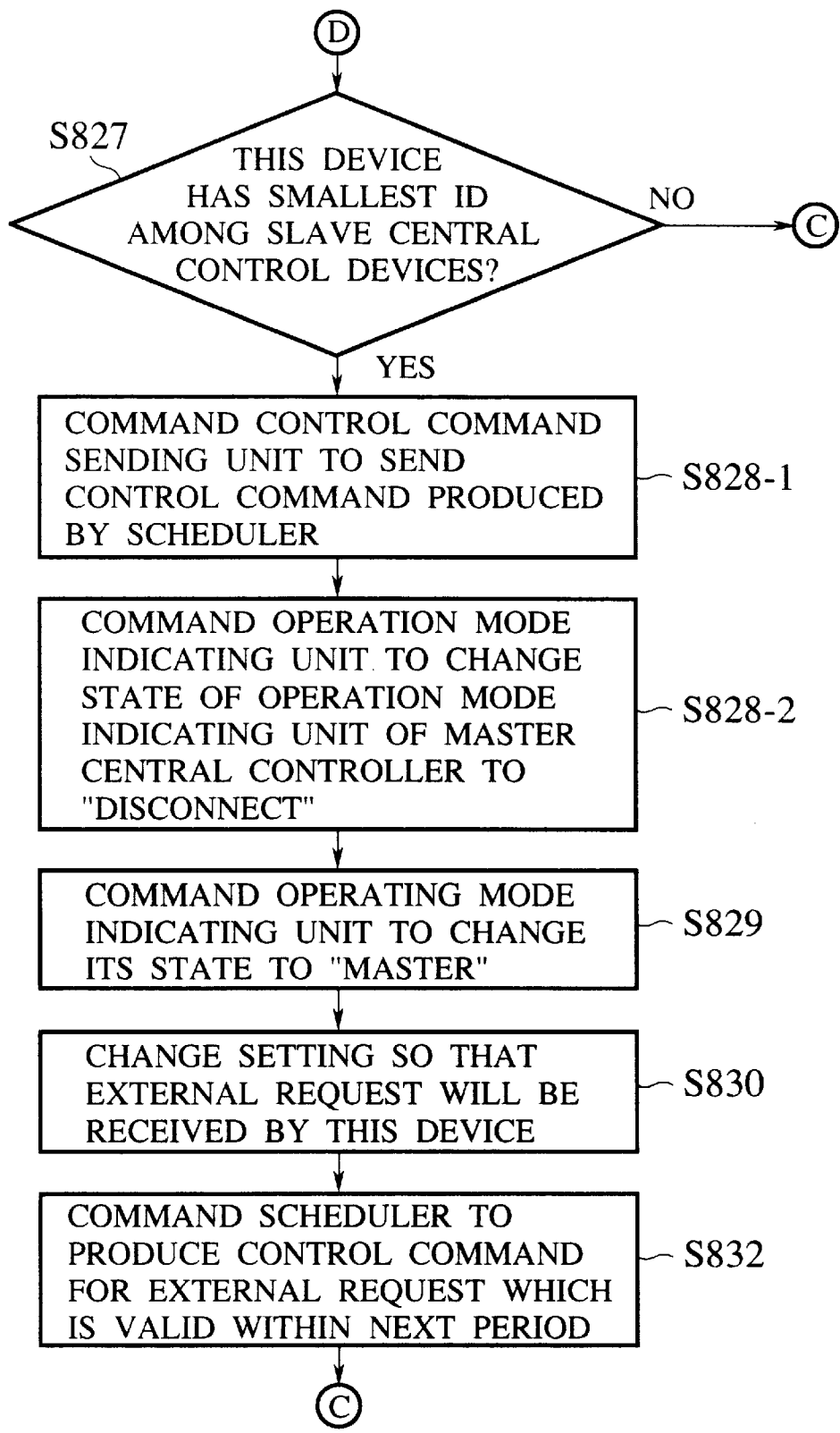
Figure 59:
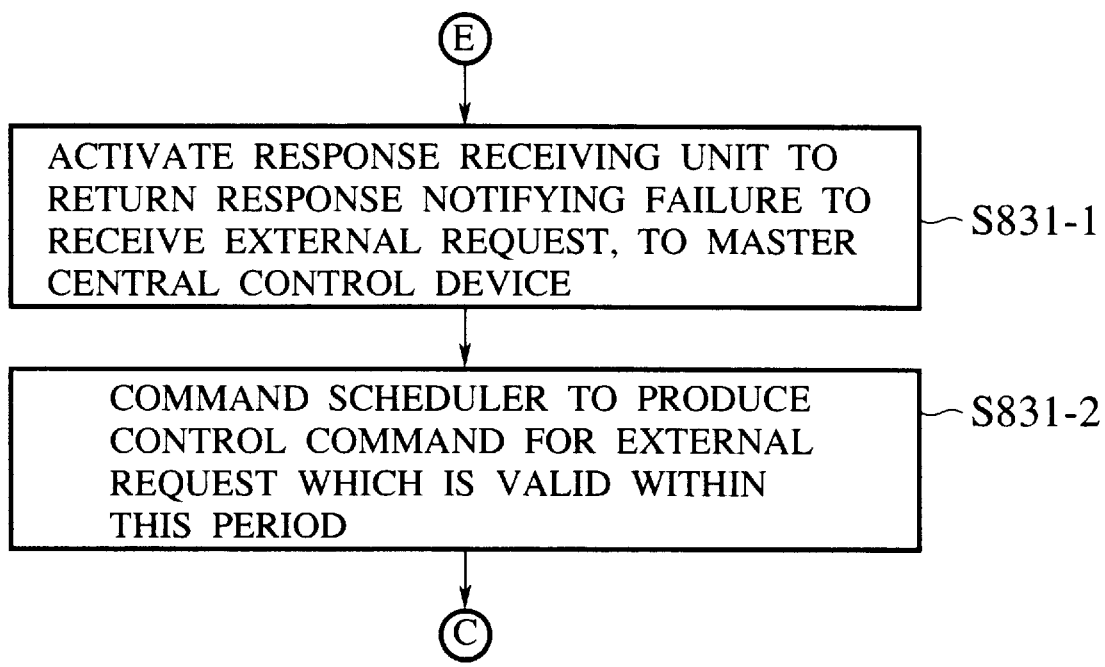

Now, in the embodiment V described above, when a fault occurred in the master central control device, a timing for changing one of the slave central control devices to the master central control device is a next period of the period at which the fault is detected, but in this embodiment VI, one of the slave central control devices is changed to the master central control device at a period at which the fault is detected. FIG. 53 shows a timing chart for this embodiment VI.

In FIG. 53, the control commands and the external requests are not sent by a prescribed time t1 and a prescribed time t1+t2 within the period, so that the slave central control devices 20 can detect an occurrence of some fault in the master central control device 20. In this case, after the change of the operation mode to "disconnect" is indicated to the operation mode indicating unit 209 of the master central control device 20, the control command prepared in advance is issued with respect to the data memory control devices 14 and the communication control devices 16, and a response indicating that the slave central control device 20 is going to operate as the master central control device is returned to the master central control device 20.

In this embodiment VI, the configuration of the central control device 20 is the same as that shown in FIG. 42 described above.

Namely, the central control device 20 has: an external request receiving unit 201 for receiving requests from external; an external request sending unit 204 for sending received external requests to the other central control devices 20; other central control device's external request receiving unit 205 for receiving data from the external request sending unit 204 of the other central control device 20; a scheduler 202 for determining the control command for the data memory control device 14 regarding the reading of the continuous data from the data memory devices 12 and the control command for the communication control device 16 regarding the operation to read out the continuous data from the buffer memory device 18 and send this continuous data to the communication path; a control command sending unit 203 for sending the control commands for the data memory control devices 14 and the communication control devices 16; a control command receiving unit 206 for receiving the control commands sent from the other central control devices 20; a timer 207 for enabling the time management; a fault detection unit 208 for detecting a fault in the other central control devices 20; an operation mode indicating unit 209 for changing this central control device 20 into the master, changing this central control device 20 into the slave, or disconnecting this central control device 20 from the system, when a fault occurs in one of the central control devices 20; a response receiving unit 210 for receiving responses from the control targets and the slave central control devices 20; a response sending unit 211 for returning a response regarding whether the external request is received correctly or not, to the master central control device; and a control unit 200 for controlling all these elements.

The scheduler 202 determines the operations of the data memory control devices 14 and the communication control devices which are the control targets. The requests from the external stored in the external request receiving unit 201 are input information of the scheduler 202, and the control commands for the data memory control devices 14 and the communication control devices 16 are output information of the scheduler 202. In this embodiment VI, the scheduler 202 produces the control command according to the input information which becomes valid at that period among the input information from the external request receiving unit 201.

FIG. 20 shows timings at which the control commands produced by the scheduler 202 are used by the data memory control devices 14 and the communication control devices 16. In the embodiment VI, the control commands produced at a period 1 are used at a period 2.

The control command sending unit 203 sends the control commands produced by the scheduler 202 for the data memory control devices 14 and the communication control devices 16 which are the control targets according to the command from the control unit 200. FIG. 6 shows an exemplary format for the control commands.

For a plurality of central control devices 20, unique IDs are assigned in advance, so that they can be distinguished from each other. Also, among these plurality of central control devices 20, one is operated as the master central control device 20 while the remaining ones are operated as the slave central control devices 20.

Time used in the central control devices 20 are synchronized in advance. This synchronization of time can be realized by utilizing the NTP protocol, or by providing a common clock to be referred by all the central control devices 20, for example.

The control commands for the data memory control devices 14 and the communication control devices 16 are issued only by the master central control device 20, and the slave central control devices 20 are kept in a hot standby state. When the receiving of the external requests becomes impossible or the sending of the control commands to the data memory control devices 14 and the communication control devices 16 becomes impossible for some reason such as a fault in the master central control device 20, the operation is continued by changing one of the slave central control devices 20 into the master central control device 20.

A detection of a fault in the master central control device 20 is carried out by the slave central control device 20. Here, when the slave central control device 20 cannot receive the control commands which are supposed to be sent from the master central control device 20, it is judged that a fault occurred in the master central control device 20. When it is judged that a fault occurred in the master central control device 20, one of the slave central control devices 20 takes over the role of the master central control device 20 by start receiving the external requests and issuing the control commands for the data memory control devices 14 and the communication control devices 16.

Next, the operation of the master central control device 20 in this embodiment VI will be described.

The external request receiving unit 201 has a queue for storing received requests, and continually receives requests from external and stored the received external requests in the queue, independently from the other parts of the master central control device 20. The external requests stored in the queue are sent to the other slave central control devices 20 and given to the scheduler 202 according to a command from the control unit 200.

The external request sending unit 204 sends the external requests stored in the queue of the external request receiving unit 201 to all the other slave central control devices 20 along with a uniquely defined ID and a period information regarding a period from which these external requests become valid. FIG. 43 shows an exemplary format for the external requests. Note that, when there is no external request received in one period, an empty external request is sent. Here, the sending of the external requests can be carried out for each slave central control device 20 separately, or for all the slave central control devices 20 at once by using the broadcast function of UDP, for example.

The control command receiving unit 206 receives the control commands issued by the other central control devices 20, and notifies the receiving of the control commands to the control unit 200. Here, a number of control commands issued by one operation determination processing by the scheduler 202 can be one or plural, and in a case of issuing a plurality of control commands, the notification to the control unit 200 is made after all the control commands are received.

The timer 207 sends a notice to the control unit 200 by means such as an interruption when a prescribed time is reached, so as to start the operation of the central control device 20. A setting of a time in the timer 207 is carried out by the control unit 200.

The operation mode indicating unit 209 holds an indication information indicating the operation mode of the master central control device, and gives this indication information to the control unit 200 according to a request from the control unit 200.

The operation mode indicating units 209 of the central control devices 20 are connected through one or a plurality of transmission path, so that the operation mode can be indicated each other. Here, the operation mode includes "master" used at a time of operating as the master central control device, "slave" used at a time of operating as the slave central control device, and "disconnect" used at a time where a fault occurs in this central control device.

At a time of initialization, the operation mode indicated by the operation mode indicating unit 209 is set to "master" for the master central control device 20 and to "slave" for the slave central control devices 20.

The response receiving unit 210 receives responses from the data memory control devices 14, the communication control devices 16, and the slave central control devices 20, and sends them to the control unit 200.

The control unit 200 carries out the control of the master central control device 20 as a whole.

Next, the operation of the slave central control device 20 will be described. Here, the configuration of the slave central control device 20 is obviously identical to that of the master central control device 20.

The timer 207 sends a notice to the fault detection unit 208 by means such as an interruption when a prescribed time is reached, so as to activate the fault detection unit 208. A setting of an activation time of the fault detection unit 208 in the timer 207 is carried out by the control unit 200.

The external request receiving unit 201 gives the external requests piled in the queue to the scheduler 202 according to a command from the control unit 200 similarly as in a case of the master central control device 20, but the sending of the external requests to the other central control devices 20 is not carried out.

The other central control device's external request receiving unit 205 receives the external request sent from the master central control device 20, and stores this external request in the queue of the external request receiving unit 201, while notifying the received time to the fault detection unit 208.

The control command receiving unit 206 monitors the control command for the data memory control devices 14 and the communication control device 16 sent by the master central control device 20, and after confirming the sending of the control command from the master central control device 20, notifies the issue of the control command to the fault detection unit 208.

The fault detection unit 208 monitors the other central control device's external request receiving unit 205, the control command receiving unit 206, and the response receiving unit 210, and in response to an inquiry from the control unit 200, returns an information as to whether the external request and control commands are received or not.

The response receiving unit 210 receives the responses from the data memory control devices 14 and the communication control devices 16, and sends them to the control unit 200.

The response sending unit 211 returns a response regarding whether the external request is received correctly or not, to the master central control device, according to the command from the control unit 200.

The control unit 200 carries out the control of the slave central control device 20 as a whole.

FIG. 54 to FIG. 59 show flow charts for the operations of the master central control device 20 and the slave central control device 20.

A prescribed initial value is set in the timer 207 so that a notice from the timer 207 will be received at each constant period (step S801), and the timestamp is initialized to 0 (step S802). Then, whether a notice from the timer 207 is received or not is checked (step S803), and when a notice from the timer 207 is received, a value of the timestamp is incremented by 1 (step S804), and a state of the operation mode indicating unit 209 is checked (step S805).

When the operation mode is "master" (step S806 YES), the control command sending unit 203 is commanded to send the control command produced by the scheduler 202 (step S810), and the external request receiving unit 201 is activated (step S811). Then, the scheduler 202 is commanded to produce the control command to be executed at a next period with respect to the data memory control devices 14 and the communication control devices 16 (step S812).

Then, the timer 207 is set so that a notice from the timer 207 will be received at a prescribed time t3 later (step S813). Then whether a notice from the timer 207 is received or not is checked (step S814), and when a notice from the timer 207 is received, whether the state of the operation mode indicating unit 209 is "disconnect" or not is checked (step S896). When it is "disconnect", the operation returns to the step S803, whereas when it is not "disconnect", the the external request sending unit 204 is activated to send the external request (step S897).

Then, the timer 207 is set so that a notice from the timer 207 will be received at a prescribed time t4 later (step S898). Then whether a notice from the timer 207 is received or not is checked (step S899), and when a notice from the timer 207 is received, whether the responses from the data memory control devices 14, the communication control devices 16 and the other slave central control devices 20 are returned or not is inquired to the response receiving unit 210 (step S815). When the responses from all the slave central control devices are received and all these responses indicated the normal reception (step S816 YES), the operation returns to the step S803. When the response from some slave central control device is not received, or indicated a failure of the normal reception (step S816 NO), a command for cancelling the external request sent within this period is piled in the queue of the external request receiving unit 201 (step S817), and the operation returns to the step S803.

When the operation mode is "slave" (step S807 YES), the timer 207 is set so that a notice from the timer 207 will be received at a time t1 later (step S818). Then whether a notice from the timer 207 is received or not is checked (step S819), and when a notice from the timer 207 is received, whether the control command is issued or not is inquired to the fault detection unit 208 (step S820).

When the control command is issued (step S821 YES), the timer 207 is set so that a notice from the timer 207 will be received at a time t2 later (step S822). Then whether a notice from the timer 207 is received or not is checked (step S823), and when a notice from the timer 207 is received, whether the external request is received or not is inquired to the fault detection unit 208 (step S824). When the external request is received (step S825 YES), a response "ack" indicating that the external response is received correctly is returned to the master central control device (step S826-1), the scheduler 202 is commanded to produce the control command for the external request which is valid within this period (step S826-2), and the operation returns to the step S803.

When the control command is not issued (step S821 NO), it is judged that a fault occurred in the master central control device, and whether this central control device has the smallest ID among the slave central control devices or not is checked (step S827). When this central control device has the smallest ID (step S827 YES), the control command sending unit 203 is commanded to send the control command produced by the scheduler 202 (step S828-1), and the operation mode indicating unit 209 is commanded to change the state of the operation mode indicating unit 209 of the master central control device to "disconnect" (step S828-2). Then, the operation mode indicating unit 209 is commanded to change its state to "master" (step S829), and the setting is changed so that the external request will be received by this central control device (step S830). Then, the scheduler 202 is commanded to produce the control command to be executed at a next period by the data memory control devices 14 and the communication control devices 16 according to the external request which is valid within the next period (step S832), and after the produced control command is sent, the operation returns to the step S803. When this central control device does not have the smallest ID (step S827 NO), the operation returns to the step S803.

When the external request is not received (step S825 NO), the response sending unit 211 is activated to return a response notifying a failure to receive the external request to the master central control device, so as to have the external response received in this period invalidated (step S831-1). Then, the scheduler 202 is commanded to produce the control command for the external request which is valid within this period (step S831-2), and the operation returns to the step S803.

In this manner, only one slave central control device can be changed into the master central control device at a period at which the fault is detected when a fault occurs in the master central control device 20.

According to this embodiment VI, the master central control device 20 periodically repeats the prescribed processing starting from the step S803 and returning to the step S803 in the flow charts of FIG. 54 to FIG. 59, but the internal state of every slave central control device 20 coincides with the internal state of the master central control device 20 within this period, so that when the fault detection unit 208 of the slave central control device 20 detects a fault in the master central control device 20, it is possible to hand over the processing to be carried out within that period by changing one of the slave central control devices 20 into the master central control device 20.

Note that, in the embodiment VI described above, when the control command is not issued at the step S821, the slave central control device having the smallest ID commands the operation mode indicating unit 209 to change the state of the operation mode indicating unit 209 of the master central control device to "disconnect" at the step S828, but instead it is also possible to change the state of the operation mode indicating unit 209 of the master central control device to "slave" at this point.

Also, in the embodiment VI described above, when there exists the slave to which the external request did not reach, a cancellation of the corresponding external request (before the period for using that external request) is notified to the slaves to which this external request was sent, but instead of that, it is also possible to re-transmit that external request (before the period for using that external request) to the slave to which this external request did not reach.

Figure 60:
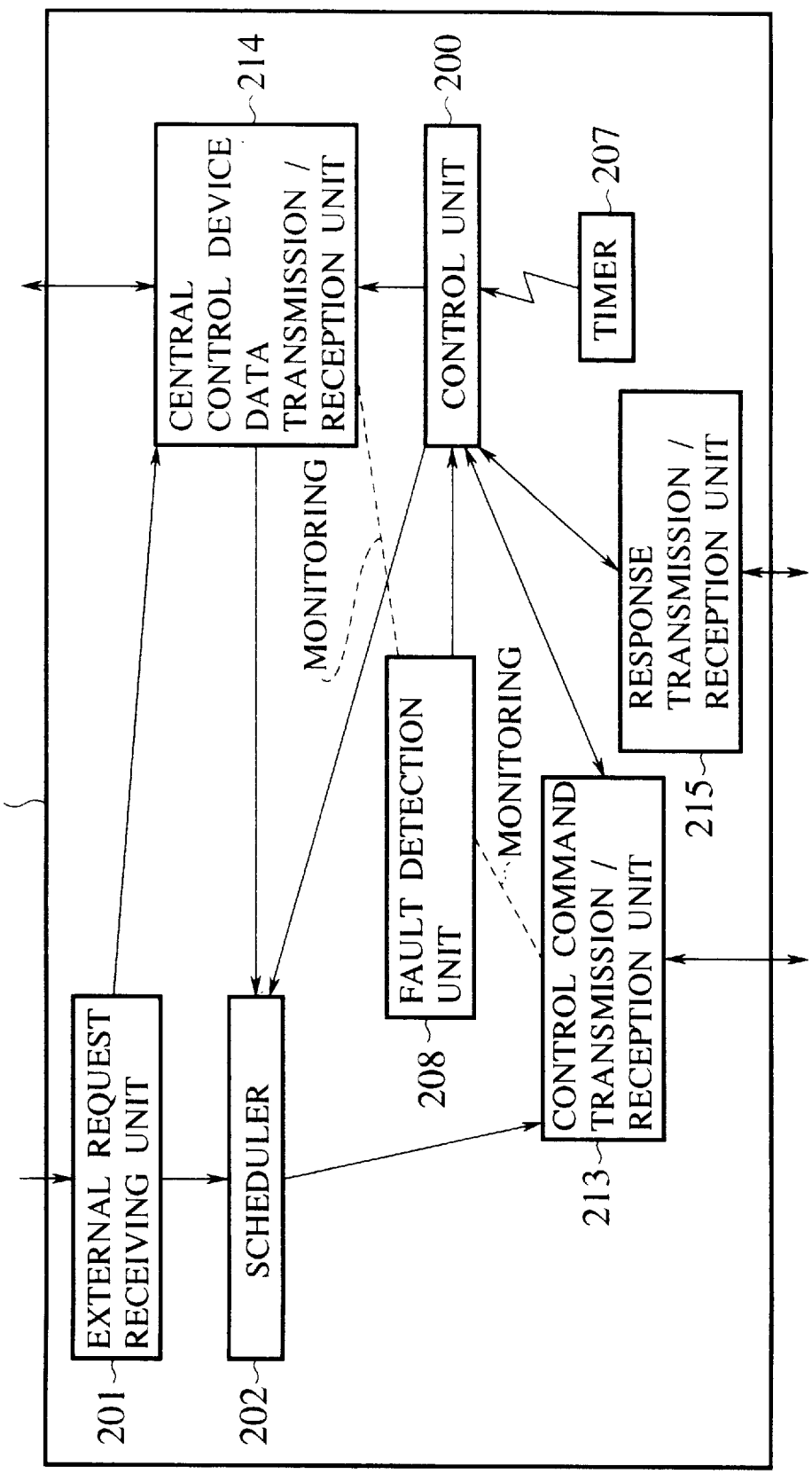
FIG. 60 is a block diagram showing one possible modification in a configuration of the central control device of FIG. 42.

Now, as a possible modified configuration of the central control device 20 for the embodiments V and VI, it is possible to use a configuration shown in FIG. 60, where the other central control device's external request receiving unit 205 and the external request sending unit 204 of FIG. 42 are unified into an other control device data transmission/reception unit 214, while the control command sending unit 203 and the control command receiving unit 206 of FIG. 42 are unified into a control command transmission/reception unit 213, and the response receiving unit 210 and the response sending unit 211 of FIG. 42 are unified into a response transmission/reception unit 215.

Moreover, it is also possible to use a configuration similar to that shown in FIG. 15 in which the other control device data transmission/reception unit 214, the control command transmission/reception unit 213, and the response transmission/reception unit 215 of FIG. 60 are further unified into a data transmission/reception unit 223 for handling all data input/output.

Figure 61:
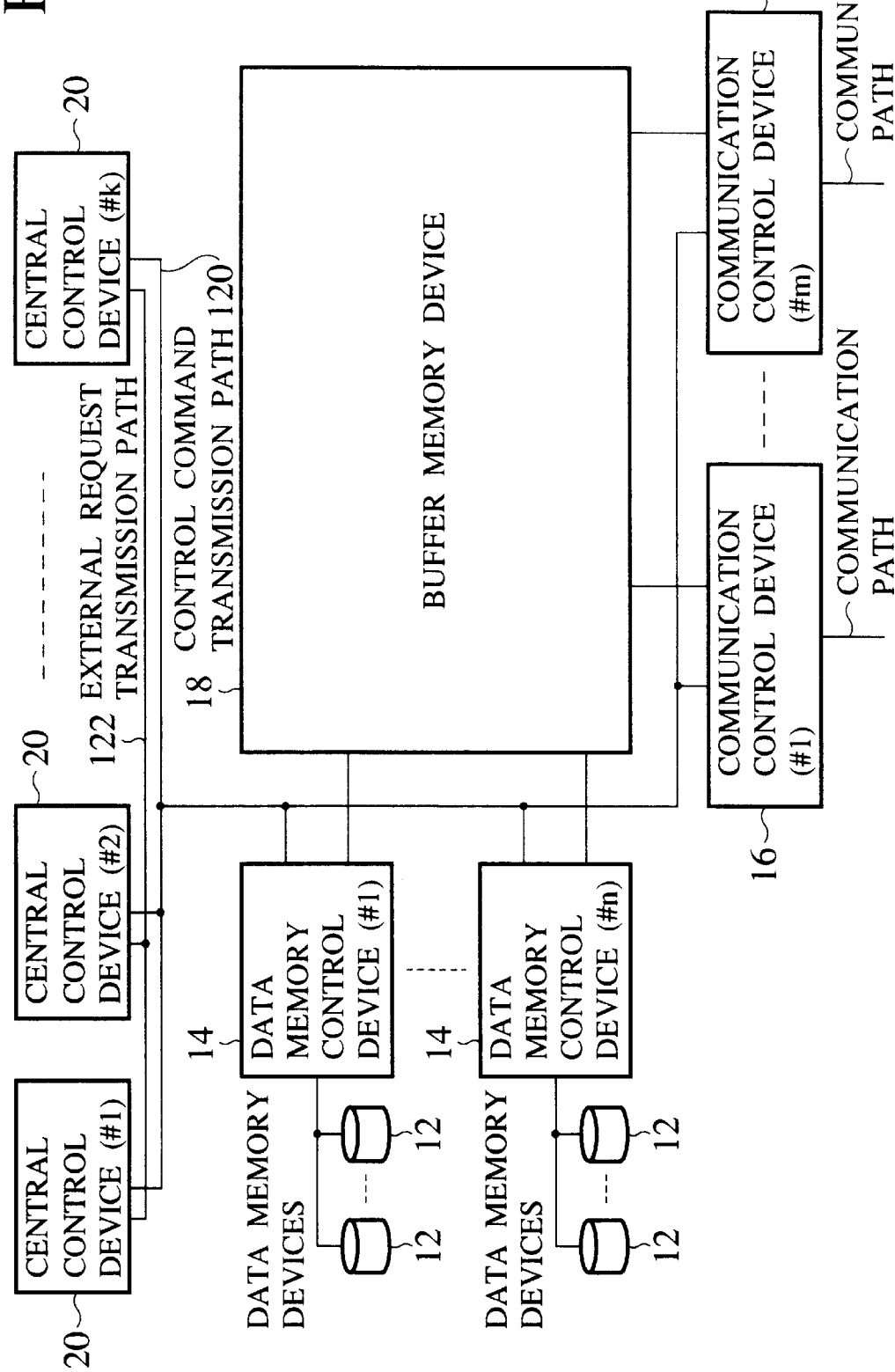
FIG. 61 is a block diagram showing one possible modification in a configuration of the continuous data server apparatus of FIG. 1.

On the other hand, as another possible modified configuration of the central control device 20 for the embodiments V and VI, it is possible to use a configuration shown in FIG. 61, where a transmission path 120 for transmitting the control command and a transmission path 122 for transmitting the external requests are separately provided. In this case, the external request in the similar format as described above is used, and after the correct transmission/reception of this external request between the master central control device and the slave central control devices is confirmed by using the external request transmission path 122, a command for commanding the slave central control devices to account for this external request in their internal states is sent from the master central control device to the slave central control devices by using the control command transmission path 120, so that it becomes possible to make the internal states identical among the central control devices similarly as in the above, and it becomes possible to change only one slave central control device into the master central control device when a fault occurs in the master central control device 20.

Note that, in the embodiments II, IV and V, the slave which is changed to the master transmits the stationary control command (the control command for determining the operations of the control targets at a next next period (x+2)) at a period (x) at which the fault is detected.

However, at this period (x), the control targets are already given the control command for determining the operations at a next period (x+1), so that it is also possible to modify these embodiments in such a manner that, at a next period (x+1) of the period (x) at which the fault is detected, the control commands for determining the operations of the control targets at its next period (x+2) and its next next period (x+3)

are transmitted by the slave instead of transmitting the stationary control command at the period (x).

Note also that, in the embodiments I to VI described above, the issuing of the control commands and the sending of the external requests with respect to the slave central control devices are carried out at respective different timings, but it is also possible to collect these control commands and external requests together into one data, and transmit this one data at once. In this case, the control command for each control device can be identified by assigning a uniquely identifiable ID to each one of the central control devices 20, the data memory control devices 14 and the communication control devices 16, and attaching an ID of a destination control device to each one of the control commands and the external requests.

Note also that, in the embodiments I to VI described above, the sending of the external requests from the master central control device to the slave central control devices is carried out only once, but when this sending or a corresponding receiving fails, it is also possible to carry out a re-transmission of the external requests for one or more times between the master central control device and the slave central control devices. In this case, when the re-transmission succeeds before a prescribed time within the period, the same situation as in a case of succeeding the sending of the external requests in the above embodiments will be realized, whereas when the re-transmission fails, the processing for a case of a failure of the sending of the external requests in the above embodiments can be carried out at each of the master central control device and the slave central control devices.

Note also that, in the embodiments I to VI described. above, the control command in the stationary state determined the operations of the control targets at a next period or a next next period of the period at which the control command is issued, but it is also possible to use the control command in the stationary state which determines the operations of the control targets at a period later than a next next period.

(Embodiment VII)

Now, the embodiment VII of the present invention will be described in detail.

This embodiment VII is directed to a case in which a function for adding the central control device is provided in the central control device so that it becomes possible to add the central control device without stopping the operation of the continuous data server apparatus itself.

FIG. 62 shows a configuration of the central control device 20 in the continuous data server apparatus of this embodiment VII.

This central control device 20 of FIG. 62 has: an external request receiving unit 201 for receiving requests from external; an external request sending unit 204 for sending received external requests to the other central control devices 20; other central control device's external request receiving unit 205 for receiving data from the external request sending unit 204 of the other central control device 20; a scheduler 202 for determining the control command for the data memory control device 14 regarding the reading of the continuous data from the data memory devices 12 and the control command for the communication control device 16 regarding the operation to read out the continuous data from the buffer memory device 18 and send this continuous data to the communication path; a control command sending unit 203 for sending the control commands for the data memory control devices 14 and the communication control devices 16; a control command receiving unit 206 for receiving the control commands sent from the other central control devices 20; a timer 207 for enabling the time management; a fault detection unit 208 for detecting a fault in the other central control devices 20; a central control device addition request receiving unit 330 for receiving a request for addition of the central control device 20; an internal state sending unit 331 for sending an internal state which is necessary in adding the central control device 20; an ID management unit 332 for managing IDs of all the central control devices 20 in the continuous data server apparatus; and a control unit 200 for controlling all these elements.

Here, the external request receiving unit 201, the external request sending unit 204, the other central control device's external request receiving unit 205, the scheduler 202, the control command sending unit 203, the control command receiving unit 206, the timer 207, the fault detection unit 208, and the control unit 200 are similar to those in the embodiments I to VI described above.

The ID management unit 332 holds an information concerning IDs of all the central control devices 20 in the continuous data server apparatus. When a command for ID assignment is received from the control unit 200, an ID is assigned by avoiding an overlap with any already existing ID.

In a case of newly adding the central control device 20 while the continuous data server apparatus is operating, for some reason such as a recovery of the central control. device 20 from a fault, the internal state of the central control device 20 in operation is transferred to the central control device 20 to be added so as to realize the consistency in the internal state. In this embodiment VII, the central control device 20 which transfers its internal state is assumed to be the master central control device 20.

Figure 63:
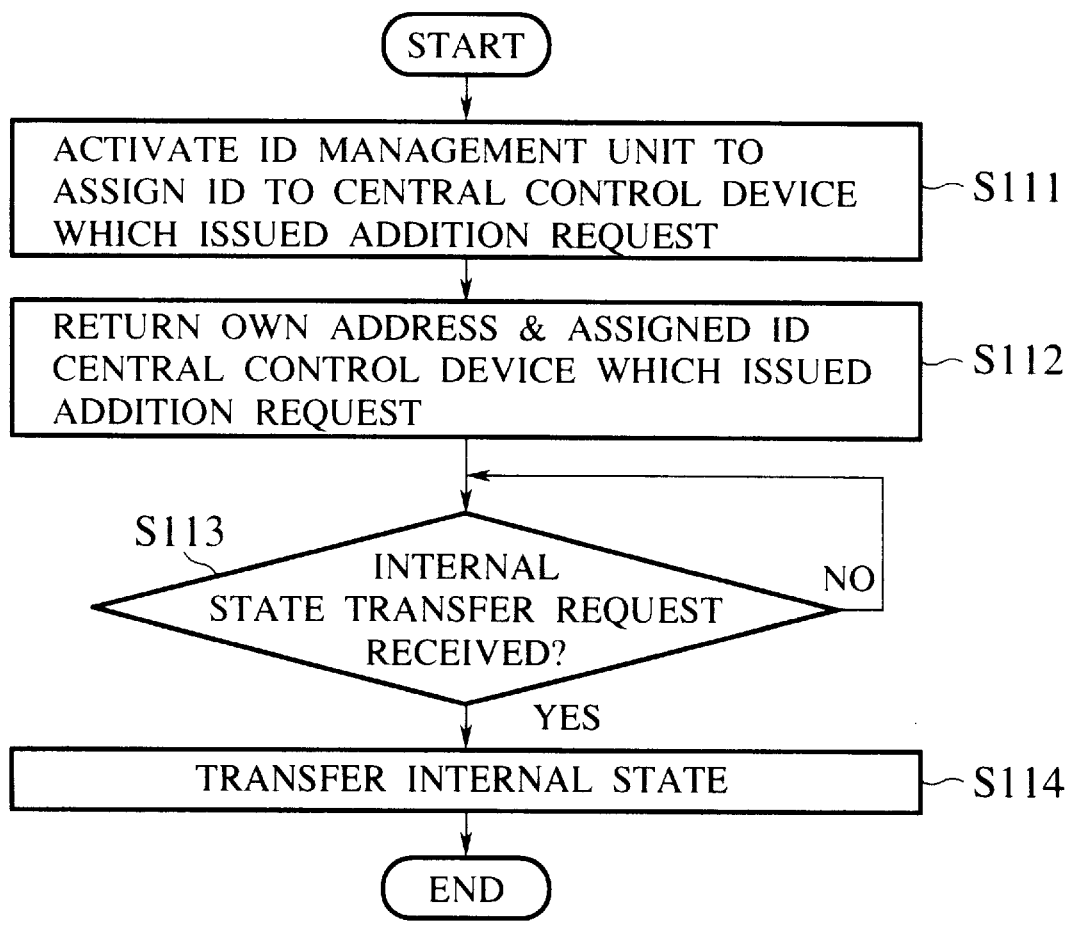
FIG. 63 is a flow chart for the operation of a master central control device in the continuous data server apparatus of FIG. 1 according to the embodiment VII.
Figure 64:
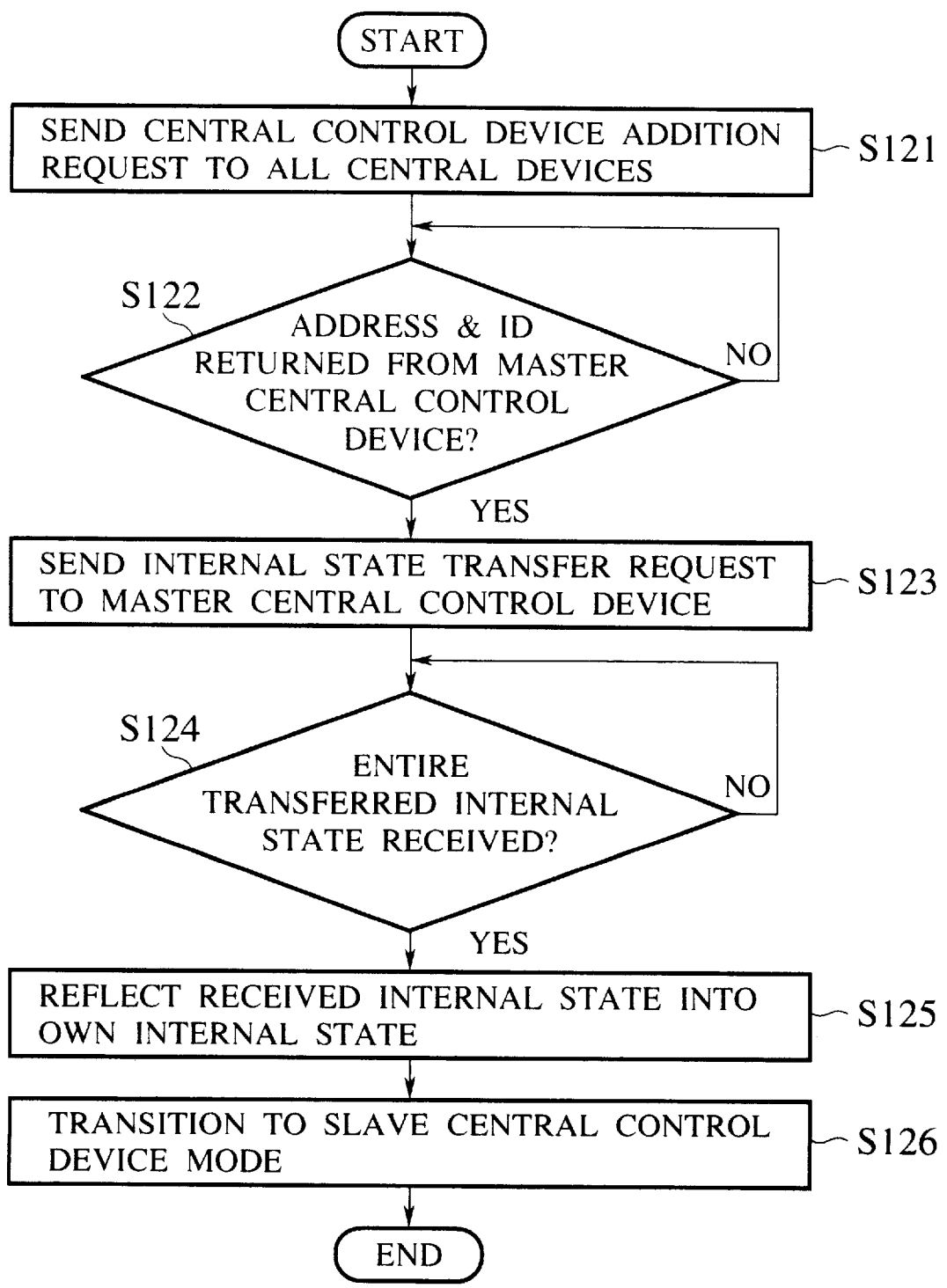
FIG. 64 is a flow chart for the operation of a central control device to be added in the continuous data server apparatus of FIG. 1 according to the embodiment VII.

FIG. 63 shows a flow chart for the operation of the master central control device 20, while FIG. 64 shows a flow chart for the operation of the central control device 20 to be added.

When a request for addition of the central control device 20 from the central control device 20 to be added is received at the central control device addition request receiving unit 330, the master central control device 20 activates the ID management unit 332 to assign an ID to the central control device 20 to be added which issued the addition request (step S111), and returns its own address and an assigned ID to the central control device 20 to be added which issued the addition request through the internal state sending unit 331 (step S112).

Then, when an internal state transfer request is received from the central control device 20 to be added (step S113 YES), the internal state of the master central control device 20 is transferred to the central control device 20 to be added (step S114). Here, the internal state includes a number of the data memory control devices 14, a number of the communication control devices 16, the received external requests, the internal state of the scheduler 202, etc.

The central control device 20 to be added sends the central control device addition request to all the central control devices 20 first (step S121). Here, the sending of the central control device addition request can be carried out by using the broadcast function of UDP, for example. When the address of the master central control device 20 and the assigned ID are returned from the master central control device 20 (step S122 YES), the internal state transfer request is sent to the master central control device 20 next (step S123).

Then, when the entire transferred internal state is received (step S124 YES), the received internal state is reflected into its own internal state (step S125), and a transition to the slave central control device mode is made so as to standby as the slave central control device 20 (step S126).

In the above, the internal state is transferred by the master central control device 20, but it is also possible to adopt a scheme in which the internal state is transferred from the central control device 20 which returned the quickest response to the request from the central control device to be added.

Figure 65:
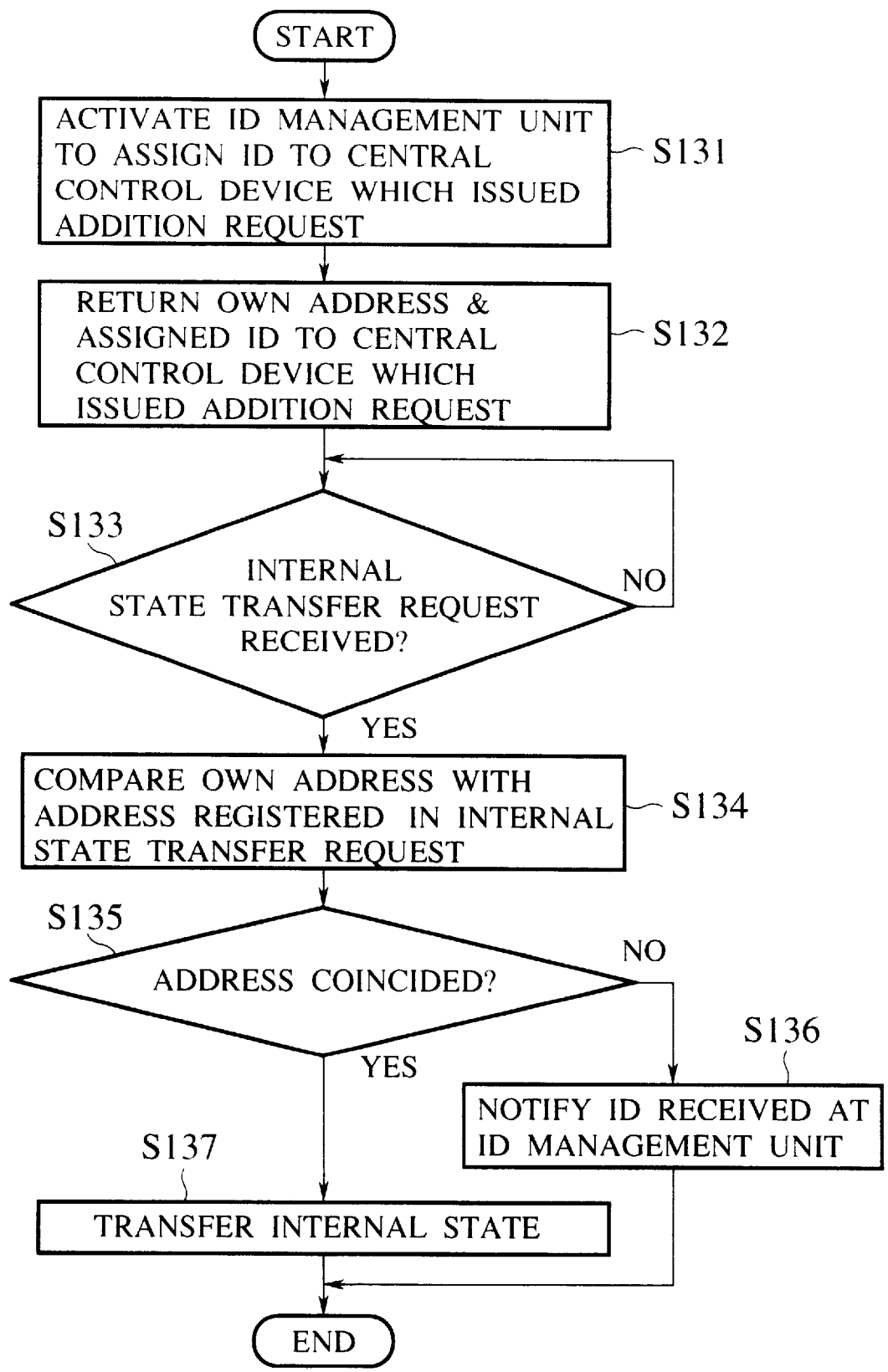
FIG. 65 is a flow chart for the operation of an already operating central control device in the continuous data server apparatus of FIG. 1 according to a modified case of the embodiment VII.

FIG. 65 shows a flow chart for the operation of the central control device 20 which transfers its internal state in this case.

When a request for addition of the central control device 20 from the central control device 20 to be added is received at the central control device addition request receiving unit 330, this central control device 20 activates the ID management unit 332 to assign an ID to the central control device 20 to be added which issued the addition request (step S131), and returns its own address and an assigned ID to the central control device 20 to be added which issued the addition request through the internal state sending unit 331 (step S132).

Then, when an internal state transfer request is received from the central control device 20 to be added (step S133 YES), the own address is compared with an address of the central control device registered in the internal state transfer request (step S134). When these addresses coincided (step S135 YES), the own internal state is transferred (step S137). When these addresses did not coincide (step S135 NO), an ID of the central control device to be added which is contained in the received internal state transfer request is notified to the ID management unit 332 (step S136).

Figure 66:
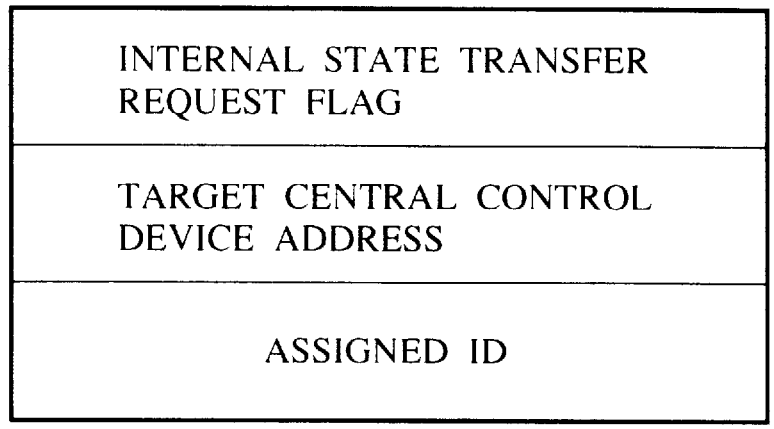
FIG. 66 is a diagram showing an exemplary configuration of an internal state transfer request that can be used in the continuous data server apparatus of FIG. 1 according to a modified case of the embodiment VII.

FIG. 66 shows an exemplary configuration of the internal state transfer request to be used in this case.

Figure 67:
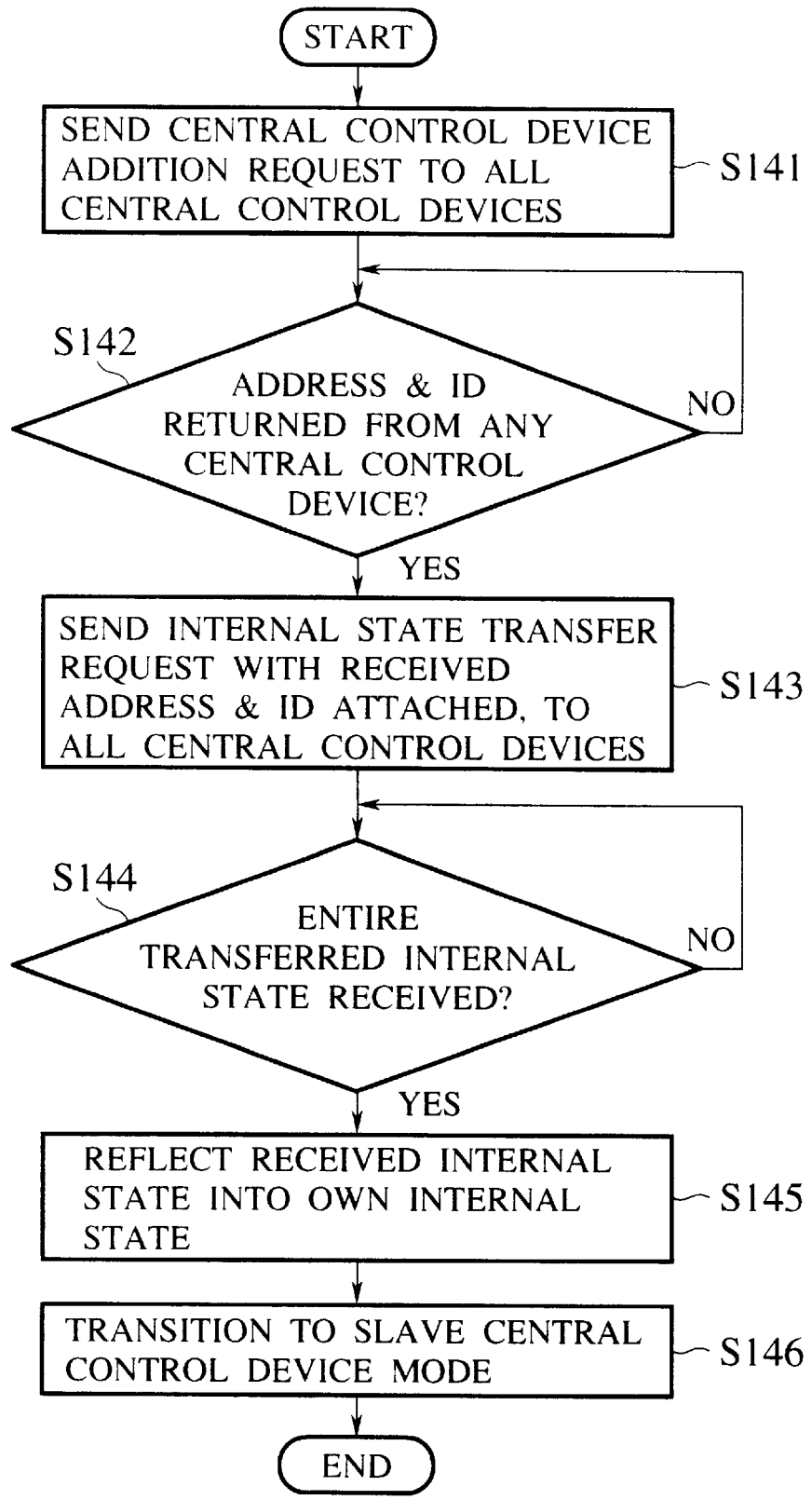
FIG. 67 is a flow chart for the operation of a central control device to be added in the continuous data server apparatus of FIG. 1 according to a modified case of the embodiment VII.

FIG. 67 shows a flow chart for the operation of the central control device 20 to be added in this case.

The central control device 20 to be added sends the central control device addition request to all the central devices 20 first (step S141). When the address of the central control device 20 and the assigned ID are returned from some central control device 20 (step S142 YES), the internal state transfer request shown in FIG. 66 is sent to all the central control devices 20 next, by attaching the received address and ID (step S143).

Then, when the entire transferred internal state is received (step S144 YES), the received internal state is reflected into its own internal state (step S145), and a transition to the slave central control device mode is made so as to standby as the slave central control device 20 (step S146).

According to this embodiment VII, by providing the central control device with a function to add the central control device, it becomes possible to add the central control device without stopping the operation of the continuous data server apparatus itself, and therefore the reliability of the continuous data server apparatus can be increased.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for controlling a continuous data server, comprising the steps of:

operating one control device as a master control device for actually controlling operations of the continuous data server which transfers continuous data stored in data memory to a communication path according to external requests; and operating at least one control device other than the master control device as a slave control device for monitoring the master control device and taking over a function of the master control device when a fault is detected in the master control devices;

wherein the master control device is operated to repeat an operation to obtain an output information for determining future operations of control targets by carrying out a prescribed processing according to an input information, and transmit the output information to the slave control device and the control targets, and the slave control device is operated to execute an operation to detect the fault in the master control device according to a transmission state of the output information from the master control device, obtain the output information by carrying out the prescribed processing according to the input information, and transmit the output information to the control targets when the fault in the master control device is detected.

2. The method of claim 1, wherein each slave control device transmits the output information to the control targets while notifying a change of said each slave control device into the master control device to other control devices, when the fault in the master control device is detected and a prescribed condition is satisfied.

3. The method of claim 2, wherein at a time of notifying the change of said each slave control device into the master control device to the other control devices, each slave control device changes said one control device operating as the master control device into the slave control device, or disconnect said one control device operating as the master control device.

4. The method of claim 1, wherein the output information determines operations of the control targets at a next period of a period at which the output information is transmitted, and the slave control device transmits the output information to the control targets at a period at which the fault in the master control device is detected.

5. The method of claim 1, wherein the output information transmitted while the fault in the master control device is not detected determines operations of the control targets at a next next period of a period at which the output information is transmitted, and the slave control device transmits the output information to the control targets by a period immediately before a period at which the output information should be used by the control targets in determining operations of the control targets.

6. The method of claim 5, wherein each control device transmits the output information by attaching an information for identifying a period at which the output information should be used in determining operations of the control targets.

7. The method of claim 1, wherein the master control device also transmits the input information to the slave control device, and the slave control device obtains the output information by carrying out the prescribed processing according to the input information transmitted from the master control device, and detects the fault in the master control device also according to a transmission state of the input information from the master control device, and when the fault in the master control device is detected according to the transmission state of the input information from the master control device, the slave control device obtains the output information by carrying out the prescribed processing under an assumption of an absence of the input information.

8. The method of claim 7, wherein each slave control device sends a notice indicating a change of said each slave control device into the master control device to other control devices at a period at which the fault in the master control device is detected when a prescribed condition is satisfied, the master control device also transmits the input information to the slave control device when the notice is not received from another control device, and each slave control device invalidates the input information transmitted from the master control device at a period at which the notice is received from another control device.

9. The method of claim 1, wherein the master control device also transmits the input information to the slave control device, and each slave control device obtains the output information by carrying out the prescribed processing according to the input information transmitted from the master control device, detects the fault in the master control device also according to a transmission state of the input information from the master control device, and sends a notice indicating the transmission state of the input information from the master control device, to the master control device, and when the notice received by the master control device indicates a failure of receiving some input information at some slave control device, the master control device re-transmits said some input information to the slave control device, or commands a cancellation of said some input information to any other slave control device other than said some slave control device.

10. The method of claim 9, wherein the master control device transmits the input information by attaching a validity information indicating a period at which the input information is valid, the slave control device obtains the output information by carrying out the prescribed processing according to the input information which is valid according to the validity information among the input information transmitted from the master control device, and the master control device re-transmits said some input information or commands a cancellation of said some input information before a period at which said some input information becomes valid.

11. The method of claim 9, wherein each slave control device sends a notice indicating a change of said each slave control device into the master control device to other control devices at a period at which the fault in the master control device is detected when a prescribed condition is satisfied, and the master control device also transmits the input information to the slave control device when the notice is not received from another control device.

12. The method of claim 1, wherein each control device transmits the output information by attaching an information for identifying a timing at which the output information is transmitted.

13. The method of claim 1, wherein the control devices receive the input information which indicates the external requests received by the continuous data server within a prescribed period of time.

14. The method of claim 1, wherein the control devices control the control targets which include data memory control devices for accessing the data memory, and communication control device for transferring the continuous data to the communication path.

15. The method of claim 1, wherein the control devices transmit the output information which indicates control commands for controlling operations of the control targets.

16. The method of claim 1, wherein the control devices carry out the prescribed processing which produces control commands for controlling operations of the control targets from the external requests.

17. The method of claim 1, wherein all the control devices are operated to maintain an identical internal state.

18. The method of claim 1, further comprising the steps of:
adding a new control device to the continuous data server; and
operating the new control device as the slave control device.

19. The method of claim 18, wherein the adding step includes the steps of:
requesting an addition of the new control device, from the new control device to one already operating control device;
transferring an internal state of said one already operating control device to the new control device; and
setting an internal state of the new control device identical to the internal state of said one already operating control device.

20. An apparatus for controlling a continuous data server, comprising:
one control device operating as a master control device for actually controlling operations of the continuous data server which transfer continuous data stored in data memory to a communication path according to external requests; and
at least one control device other than the master control device operating as a slave control device for monitoring the master control device and taking over a function of the master control device when a fault is detected in the master control device;
wherein each control device has:
means for repeating an operation to obtain an output information for determining future operations of control targets by carrying out a prescribed processing according to an input information, and transmit the output information to the slave control device and the control targets, in a case of operating as the master control device; and
means for executing an operation to detect the fault in the master control device according to a transmission state of the output information from the master control device, obtain the output information by carrying out the prescribed processing according to the input information, and transmit the output information to the control targets when the fault in the master control device is detected, in a case of operating as the slave control device.

21. The apparatus of claim 20, wherein each slave control device transmits the output information to the control targets while notifying a change of said each slave control device into the master control device to other control devices, when the fault in the master control device is detected and a prescribed condition is satisfied.

22. The apparatus of claim 21, wherein the prescribed condition is satisfied when said each slave control device judges that said each slave control device is allowed to be changed into the master control device according to an identifier of said each slave control device.

23. The apparatus of claim 21, wherein the prescribed condition is satisfied when said each slave control device did not receive any notice notifying a change of another slave control device into the master control device.

24. The apparatus of claim 21, wherein at a time of notifying the change of said each slave control device into the master control device to the other control devices, each slave control device changes said one control device operating as the master control device into the slave control device, or disconnect said one control device operating as the master control device.

25. The apparatus of claim 20, wherein the output information determines operations of the control targets at a next period of a period at which the output information is transmitted, and the slave control device transmits the output information to the control targets at a period at which the fault in the master control device is detected.

26. The apparatus of claim 21, wherein the output information transmitted while the fault in the master control device is not detected determines operations of the control targets at a next next period of a period at which the output information is transmitted, and the slave control device transmits the output information to the control targets by a period immediately before a period at which the output information should be used by the control targets in determining operations of the control targets.

27. The apparatus of claim 26, wherein the slave control device transmits the output information to the control targets at a period at which the fault in the master control device is detected according to the transmission state of the output information from the master control device, and when the slave control device takes over the function of the master control device, the slave control device first transmits the output information for determining operations of the control targets at a next period of a period at which the output information is transmitted, and the output information for determining operations of the control targets at a next next period of a period at which the output information is transmitted.

28. The apparatus of claim 26, wherein the slave control device does not transmit the output information to the control targets at a period at which the fault in the master control device is detected according to the transmission state of the output information from the master control device, and when the slave control device takes over the function of the master control device, the slave control device first transmits the output information for determining operations of the control targets at a next period of a period at which the output information is transmitted, and the output information for determining operations of the control targets at a next next period of a period at which the output information is transmitted.

29. The apparatus of claim 26, wherein each control device transmits the output information by attaching an information for identifying a period at which the output information should be used in determining operations of the control targets.

30. The apparatus of claim 20, wherein the slave control device detects the fault in the master control device according to the transmission state of the output information from the master control device when the output information is not transmitted from the master control device to the slave control device before a prescribed time.

31. The apparatus of claim 30, wherein the prescribed time is a time sufficient for guaranteeing that the operations of the control targets are not interrupted when the slave control device takes over the function of the master control device and transmits the output information to the control targets.

32. The apparatus of claim 20, wherein the master control device also transmits the input information to the slave control device, and the slave control device obtains the output information by carrying out the prescribed processing according to the input information transmitted from the master control device, and detects the fault in the master control device also according to a transmission state of the input information from the master control device, and when the fault in the master control device is detected according to the transmission state of the input information from the master control device, the slave control device obtains the output information by carrying out the prescribed processing under an assumption of an absence of the input information.

33. The apparatus of claim 32, wherein when the slave control device detects the fault in the master control device according to the transmission state of the input information from the master control device, after the slave control device takes over the function of the master control device, the slave control device first transmits the output information for determining operations of the control targets at a next period of a period at which the output information is transmitted, and the output information for determining operations of the control targets at a next next period of a period at which the output information is transmitted.

34. The apparatus of claim 32, wherein the slave control device detects the fault in the master control device according to the transmission state of the input information from the master control device when the input information is not transmitted from the master control device to the slave control device before a prescribed time.

35. The apparatus of claim 34, wherein the prescribed time is a time sufficient for guaranteeing that the operations of the control targets are not interrupted when the slave control device takes over the function of the master control device and transmits the output information to the control targets.

36. The apparatus of claim 32, wherein each slave control device transmits the output information to the control targets while notifying a change of said each slave control device into the master control device to other control devices, when the fault in the master control device is detected and a prescribed condition is satisfied, and wherein before a period at which the prescribed processing should be carried out, the master control device transmits the input information from which the prescribed processing obtains the output information for determining operations at a next period.

37. The apparatus of claim 32, wherein each slave control device transmits the output information to the control targets while notifying a change of said each slave control device into the master control device to other control devices, when the fault in the master control device is detected and a prescribed condition is satisfied, and at a time of notifying the change of said each slave control device into the master control device to the other control devices, each slave control device changes said one control device operating as the master control device into the slave control device, or disconnect said one control device operating as the master control device, and wherein before a period at which the prescribed processing should be carried out, the master control device transmits the input information from which the prescribed processing obtains the output information for determining operations at a next next period, and when the slave control device takes over the function of the master control device, the slave control device first transmits the input information for obtaining the output information which determines operations at a next period.

38. The apparatus of claim 32, wherein each slave control device sends a notice indicating a change of said each slave control device into the master control device to other control devices at a period at which the fault in the master control device is detected when a prescribed condition is satisfied, the master control device also transmits the input information to the slave control device when the notice is not received from another control device, and each slave control device invalidates the input information transmitted from the master control device at a period at which the notice is received from another control device.

39. The apparatus of claim 38, wherein the prescribed condition is satisfied when said each slave control device judges that said each slave control device is allowed to be changed into the master control device according to an identifier of said each slave control device.

40. The apparatus of claim 38, wherein the prescribed condition is satisfied when said each slave control device did not receive any notice notifying a change of another slave control device into the master control device.

41. The apparatus of claim 19, wherein the master control device also transmits the input information to the slave control device, and each slave control device obtains the output information by carrying out the prescribed processing according to the input information transmitted from the master control device, detects the fault in the master control device also according to a transmission state of the input information from the master control device, and sends a notice indicating the transmission state of the input information from the master control device, to the master control device, and when the notice received by the master control device indicates a failure of receiving some input information at some slave control device, the master control device re-transmits said some input information to the slave control device, or commands a cancellation of said some input information to any other slave control device other than said some slave control device.

42. The apparatus of claim 41, wherein each slave control device transmits the output information to the control targets while notifying a change of said each slave control device into the master control device to other control devices, when the fault in the master control device is detected and a prescribed condition is satisfied, and wherein before a period at which the prescribed processing should be carried out, the master control device transmits the input information from which the prescribed processing obtains the output information for determining operations at a next period, the slave control device sends the notice indicating the transmission state of the input information from the master control device, and the master control device re-transmits said some input information or commands a cancellation of said some input information.

43. The apparatus of claim 41, wherein each slave control device transmits the output information to the control targets while notifying a change of said each slave control device into the master control device to other control devices, when the fault in the master control device is detected and a prescribed condition is satisfied, and at a time of notifying the change of said each slave control device into the master control device to the other control devices, each slave control device changes said one control device operating as the master control device into the slave control device, or disconnect said one control device operating as the master control device, and wherein before a period at which the prescribed processing should be carried out, the master control device transmits the input information from which the prescribed processing obtains the output information for determining operations at a next next period, the slave control device sends the notice indicating the transmission state of the input information from the master control device, and the master control device re-transmits said some input information or commands a cancellation of said some input information.

44. The apparatus of claim 41, wherein the master control device transmits the input information by attaching a validity information indicating a period at which the input information is valid, the slave control device obtains the output information by carrying out the prescribed processing according to the input information which is valid according to the validity information among the input information transmitted from the master control device, and the master control device re-transmits said some input information or commands a cancellation of said some input information before a period at which said some input information becomes valid.

45. The apparatus of claim 41, wherein each slave control device sends a notice indicating a change of said each slave control device into the master control device to other control devices at a period at which the fault in the master control device is detected when a prescribed condition is satisfied, and the master control device also transmits the input information to the slave control device when the notice is not received from another control device.

46. The apparatus of claim 45, wherein the prescribed condition is satisfied when said each slave control device judges that said each slave control device is allowed to be changed into the master control device according to an identifier of said each slave control device.

47. The apparatus of claim 45, wherein the prescribed condition is satisfied when said each slave control device did not receive any notice notifying a change of another slave control device into the master control device.

48. The apparatus of claim 20, wherein each control device transmits the output information by attaching an information for identifying a timing at which the output information is transmitted.

49. The apparatus of claim 20, wherein the control devices receive the input information which indicates the external requests received by the continuous data server within a prescribed period of time.

50. The apparatus of claim 20, wherein the control devices control the control targets which include data memory control devices for accessing the data memory, and communication control device for transferring the continuous data to the communication path.

51. The apparatus of claim 20, wherein the control devices transmit the output information which indicates control commands for controlling operations of the control targets.

52. The apparatus of claim 20, wherein the control devices carry out the prescribed processing which produces control commands for controlling operations of the control targets from the external requests.

53. The apparatus of claim 20, wherein all the control devices are operated to maintain an identical internal state.

54. The apparatus of claim 20, wherein each control device has an addition function to add a new control device to be operated as the slave control device, to the continuous data server.

55. The apparatus of claim 54, wherein the addition function includes:

means for transferring an internal state of said each control device to the new control device, in response to a request from the new control device, so that an internal state of the new control device is set identical to the internal state of said each control device.

* * * * *